United States Patent
Milliron

(10) Patent No.: US 6,608,631 B1
(45) Date of Patent: Aug. 19, 2003

(54) METHOD, APPARATUS, AND COMPUTER PROGRAM PRODUCT FOR GEOMETRIC WARPS AND DEFORMATIONS

(75) Inventor: Timothy S. Milliron, Berkeley, CA (US)

(73) Assignee: Pixar Amination Studios, Emeryville, CA (US)

( * ) Notice: Subject to any disclaimer, the term of this patent is extended or adjusted under 35 U.S.C. 154(b) by 0 days.

(21) Appl. No.: 09/563,660

(22) Filed: May 2, 2000

(51) Int. Cl.$^7$ .................................................. G06K 9/36

(52) U.S. Cl. ...................... 345/647; 345/619; 345/646; 345/648; 345/649; 345/660

(58) Field of Search ................................ 345/647, 629, 345/639, 640, 649, 660, 648, 646, 619

(56) References Cited

U.S. PATENT DOCUMENTS

| | | | |
|---|---|---|---|
| 5,175,808 A | * 12/1992 | Sayre | 345/647 |
| 5,796,400 A | * 8/1998 | Atkinson et al. | 345/420 |
| 5,818,452 A | * 10/1998 | Atkinson et al. | 345/420 |
| 5,892,691 A | * 4/1999 | Fowler | 345/619 |
| 5,995,110 A | * 11/1999 | Litwinowicz | 345/848 |
| 6,064,393 A | * 5/2000 | Lengyel et al. | 345/419 |
| 6,072,496 A | * 6/2000 | Guenter et al. | 345/419 |
| 6,236,403 B1 | * 5/2001 | Chaki et al. | 345/419 |
| 6,271,847 B1 | * 8/2001 | Shum et al. | 345/418 |

OTHER PUBLICATIONS

Barr, Alan H., "Global and Local Deformations of Solid Primitives", *Computer Graphics*, 18(3), 21–30 (Jul. 1984).
Bechmann, Dominique, "Space Deformation Models Survey", *Computers and Graphics*, 18(4), 571–586 (1994).
Beier, Thaddeus et al., "Feature–Based Image Metamorphosis", *Computer Graphics*, 26(2), 35–42 (Jul. 1992).
Borrel, Paul et al., "Simple Constrained Deformations for Geometric Modeling and Interactive Design", *ACM Transactions on Graphics*, 13(2), 137–155 (Apr. 1994).
Cohen–Or, Daniel et al., "Three–Dimensional Distance Field Metamorphosis", *ACM Transactions on Graphics*, 17(2), 116–141 (Apr. 1998).
Coquillart, Sabine, "Extended Free–Form Deformation: A Sculpturing Tool for 3D Geometric Modeling", *Computer Graphics*, 24(4), 187–196 (Aug. 1990).
Correa, Wagner Toledo et al., "Texture Mapping for Cel Animation", *Computer Graphics Proceedings, Annual Conference Series*, 435–446 (1998).
Decaudin, Philippe, "Geometric Deformation by Merging a 3D–Object With a Simple Shape", *Graphics Interface '96*, 55–60 (1996).
Forsey, David R. et al., "Hierarchical B–Spline Refinement", *Computer Graphics*, 22(4), 205–212 (Aug. 1988).
Griessmair, Josef et al., "Deformation of Solids with Trivariate B–Splines", *Eurographics '89*, 137–148 (1989).

(List continued on next page.)

Primary Examiner—Jeffery Brier
Assistant Examiner—Daniel J Chung
(74) Attorney, Agent, or Firm—Arent Fox Kintner Plotkin & Kahn, PLLC

(57) ABSTRACT

Techniques for geometric deformations in computer graphics are described, including a flexible and general modular methodology for constructing, analyzing, and evaluating geometric warps and deformations. Described techniques include establishing a set of source/target features (and related information) or parameter set for controlling deformation of a graphical model; a set of strength fields are established for controlling how strongly the transformation caused by the mapping of source feature to target feature will be applied to model points. A set of weighting fields modulates the influence of multiple source/target feature mappings on model points. Also described are variations on this technique that allow achieving results similar to conventional methods and additional functionality.

20 Claims, 41 Drawing Sheets

OTHER PUBLICATIONS

Hsu, William M. et al., "Direct Manipulation of Free–Form Deformations", *Computer Graphics*, 26, 177–184 (Jul. 1992).

Kobbelt, Leif et al., "Interactive Multi–Resolution Modeling on Arbitrary Meshes", *Computer Graphics Proceedings, Annual Conference Series*, 105–114 (1998).

Lazarus, Francis et al., "Axial deformations: an intuitive deformation technique", *Computer–Aided Design*, 26(8), 607–613 (Aug. 1994).

Lee, Seung–Yong et al., "Image Morphing Using Deformation Techniques", *The Journal of Visualization and Computer Animation*, 7, 3–23 (1996).

Lee, Seung–Yong et al., "Image Metamorphosis Using Snakes and Free–Form Deformations", *Computer Graphics Proceedings, Annual Conference Series*, 439–448 (1995).

Lee, Seungyong et al., "Image Metamorphosis with Scattered Feature Constraints", *IEEE Transactions on Visualization and Computer Graphics*, 2(4), 337–354 (Dec. 1996).

Lerios, Apostolos et al., "Feature–Based Volume Metamorphosis", *Computer Graphics Proceedings, Annual Conference Series*, 449–456 (1995).

Litwinowicz, Peter et al., "Animating Images with Drawings", *Computer Graphics Proceedings, Annual Conference Series*, 409–412 (1994).

MacCracken, Ron et al., "Free–Form Deformations With Lattices of Arbitrary Topology", *Computer Graphics Proceedings, Annual Conference Series*, 181–188 (1996).

Sederberg, Thomas W. et al., "Free–Form Deformation of Solid Geometric Models", *Computer Graphics*, 20(4), 151–160 (Aug. 1986).

Singh, Karan et al., "Wires: A Geometric Deformation Technique"l, *Computer Graphics Proceedings, Annual Conference Series*, 405–414 (1998).

Stalpers, M.G.J.R. et al., "Deforming Geometric Models Based on a Polygonal Skeleton Mesh", *Journal of Graphics Tools*, 2(3), 1–14 (1997).

Zorin, Denis et al., "Interactive Multiresolution Mesh Editing", *Computer Graphics Proceedings, Annual Conference Series*, 259–268 (1997).

* cited by examiner

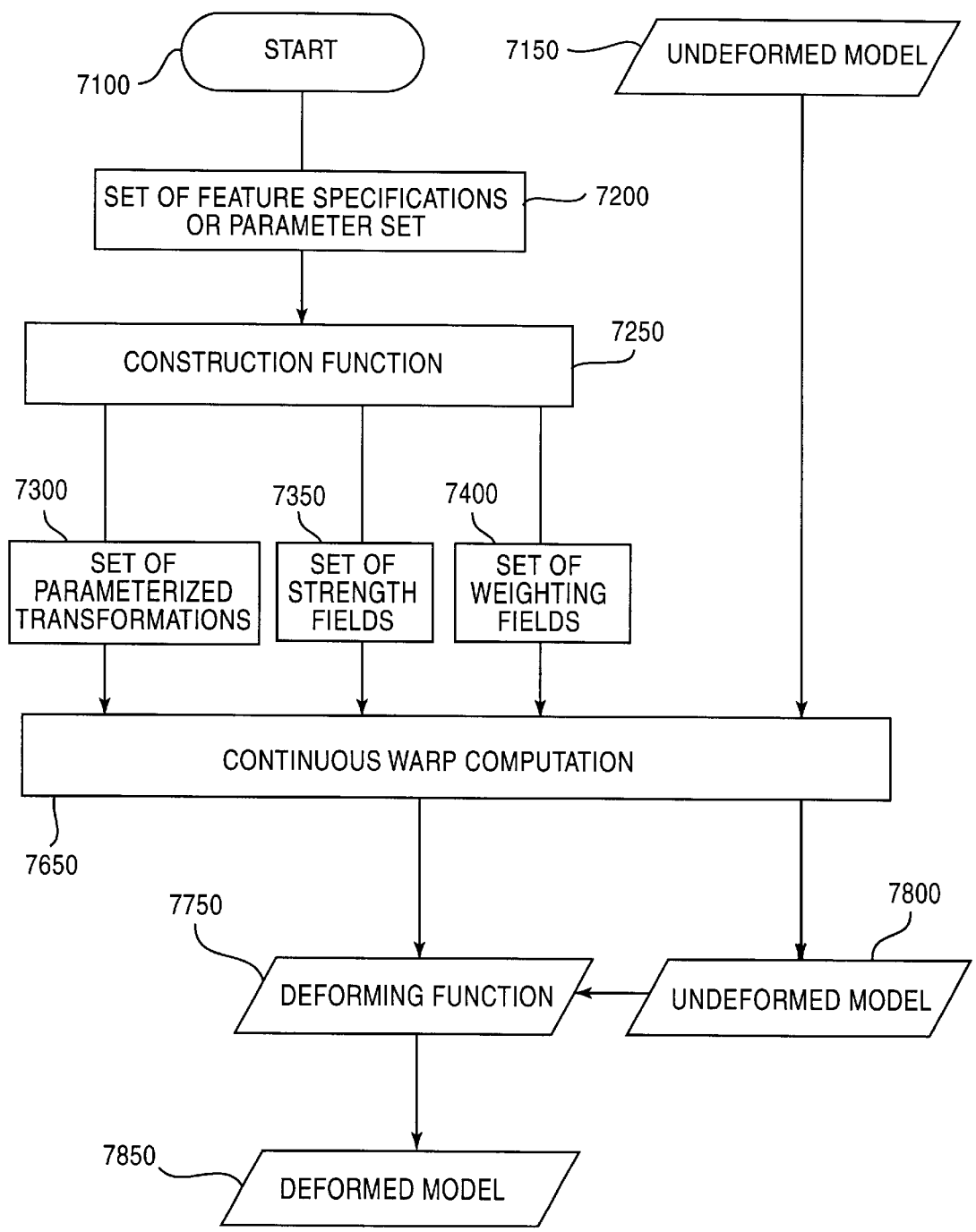

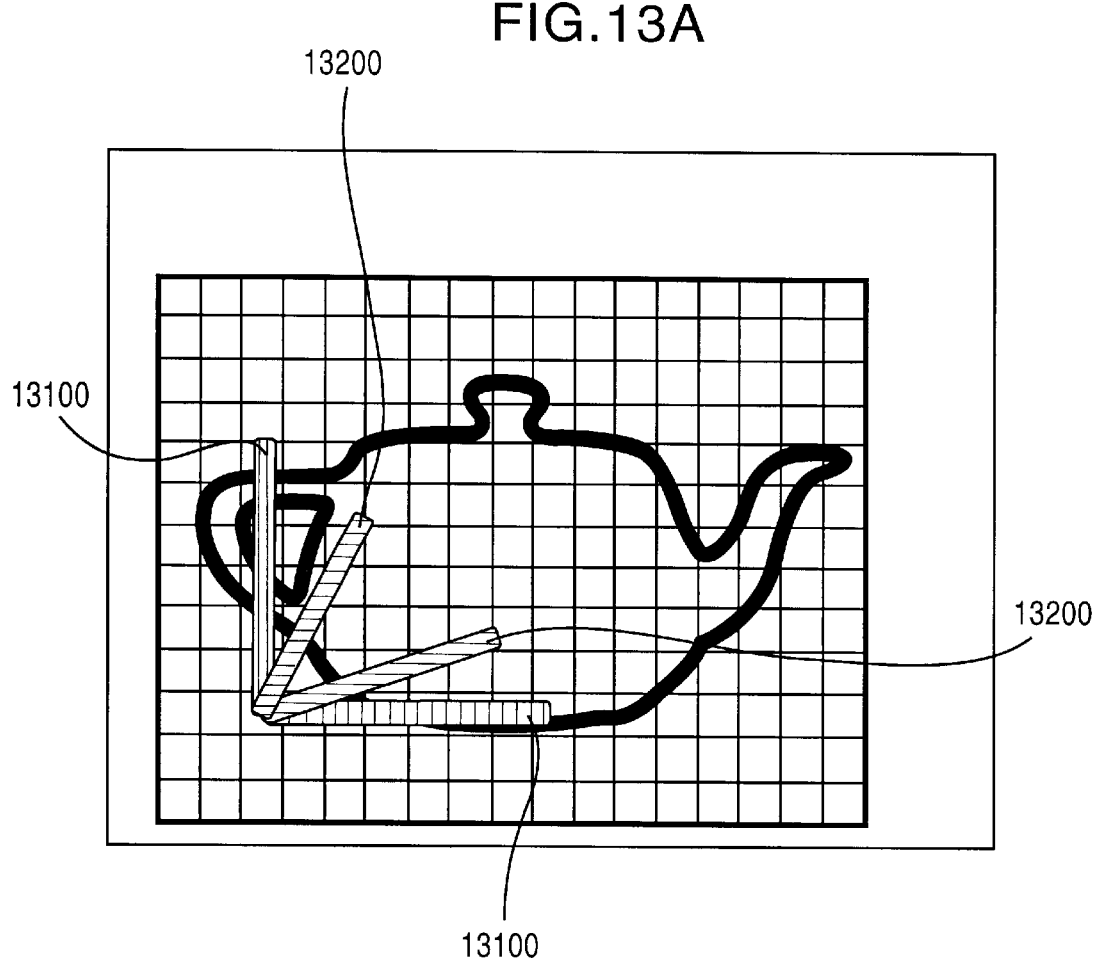

METHOD, APPARATUS, AND COMPUTER PROGRAM PRODUCT FOR GEOMETRIC WARPS AND DEFORMATIONS

FIELD

The invention relates generally to computer graphics and animation and more particularly to techniques for deforming or warping graphical objects.

BACKGROUND

Warping or deforming (the terms are used interchangeably) graphical models is an important operation in many areas of computer graphics. Deformation of planar curves is a basic operation in 2-D cartoon animation as well as in digital publishing. Surface and solid warping find widespread application solid and geometric model manipulation as well as 3-D animation. Many significant industries such as portions the entertainment industry and the medical imaging industry rely heavily on suites of computer graphics tools that include warping techniques.

There are many computer-implemented wraping techniques known in the art. Indeed, the literature is heavily populated with niche solutions to seemingly separate sets of problems. There is a need for a warping technique that addresses the general problems encountered in warp design and provides a general solution framework flexible enough, not only for warp designers to rapidly develop new warps, but also for them to achieve warp results comparable to the existing niche solutions when desired. Such a general solution technique would facilitate the comparison of warps, make key aspects of warps easier for the warp designer to understand, and allow a warp designer to increase his or her efficiency by more readily integrating existing solutions for particular aspects of a warp. Ideally, such a general solution technique would not compromise on the warp designer's ability to achieve the same warp results as could be obtained with conventional solutions. Still further, it would be desirable for such a general solution technique to enable warp results unobtainable with conventional solutions. Also it would be desirable for such a general solution technique to modify existing warping techniques to add new functionality. Additionally it would be desirable for such a general solution technique to faciliate analysis of warps for ascertaining desirable mathematical properties.

One such exemplary conventional solution are free form deformations ("FFD"s). Typically FFDs are manipulated by editing of positions of control points in a uniform 3-D lattice imposed on a parallelepiped volume. While this technique yields some desirable mathematical properties, it is can often be highly restrictive to a warp designer. For instance, with conventional FFDs, it is not practicable to create a deformation with a rotation effect centered around a single control point. To achieve such an effect with a conventional FFD, a higher resolution control lattice must typically be used; however, this too is undesirable as it complicates the deformation interface over the model. Thus it would be desirable for a warping system to exist that allowed for more complex warping effects to be easily obtained in conjunction with creating results similar to FFD-type warps.

Another exemplary conventional solution are image warps such as those described by Beier and Neely's, Feature-based image metamorphosis, *Computer Graphics* (*SIGGRAPH '92 Proceedings*) vol. 26, pages 35–42, July 1992. In Beier and Neely's disclosure, image warps are defined by line-segment features. When two (or more) line segments "squeeze" a portion of the image, the warped image may exhibit undesirable spatial buckling artifacts. These artifacts arise out of an assumption that the transformation for a line segment feature should not deform the image in a direction perpendicular to the line segment. For a single-segment, this assumption may not lead to undesirable effects, however for more complex warps, spatial buckling can arise. Accordingly it would be advantageous if a warping system were available that could eliminate spatial buckling in feature based image warps.

Still another exemplary conventional technique is the framework taught by Singh and Fume in Wires: A geometric deformation technique, *SIGGRAPH '98 Conference Proceedings*, Pages 405–414. ACM SIGGRAPH, Addison Wesely, July 1998. Wires provides an interactive deformation framework for complex geometric models based on a metaphor to a sculptor's armature, i.e., controllable curves that deform the surface of an graphical object near the curve (a "wire"). While the Wires framework provides a useful geometric deformation technique, it also can create buckling and tearing artifacts when a given wire's reference curve is shaped so that a set of points is equidistant from different parts of the curve that specify competing deformations. Therefore it would be beneficial if a warping technique existed that could provide the functionality of Wires-type techniques but in a way which enabled buckling and tearing artifacts to be eliminated.

Frequently variations on a (typically complex) surface are desired. Direct manipulation of the surface itself may be too time consuming. There are a number of conventional multiresolution editing schemes that provide some capability for efficient surface variation. However the conventional methods do allow adequate flexibility (for instance they often restrict the relationship between the fine surface model, e.g., a vertex mesh, and the control model in terms of topology or mesh connectivity). While some conventional methods do allow control models of arbitrary topology, such methods may only approximate the edited control points (rather than being interpolating). However, interpolating warps frequently can provide a more intuitive user interface. Accordingly a need exists for an interpolating warp that may be used to conveniently deform a more complex surface of arbitrary topology.

Also, warp designers commonly desire to deform a first surface by mapping regions of the first surface to regions of a second surface. For instance, in computer animation, when the first surface is impacted by the second surface, the first surface may be stretched out of shape. Some physics-based systems that implement this behavior do exist, however such systems are frequently inadequate for production of exaggerated or fictional animation effects. Thus it would be helpful for a warping technique to exist that facilitated deformations of surface regions.

SUMMARY

In order to provide solutions to these and other objectives, one aspect of the present invention are methods for generating graphical warps or deformations through feature-based transformation of an undeformed model to create a deformed model. An illustrative method includes receiving the undeformed model and a set of feature specifications each of the set of feature specifications including a source feature, a target feature, and related deformation parameters. The set of feature specifications contains elements for controlling the deformation of the undeformed model. An additional part of this illustrative method includes receiving a set of transformations corresponding to the set of feature specifications and for mapping the source feature to the target feature in each of the set of feature specifications, and receiving a set of strength fields corresponding to the set of feature specifications and defined over the undeformed model for scaling the magnitude of each of the set of transformations, establishing a set of scaled transformations.

The illustrative method also includes receiving a set of weighting fields corresponding to the set of feature specifications and defined over the undeformed model for determining the relative influence of the set of scaled transformations; computing a sum of the set of scaled transformations, weighted by the set of weighting fields, creating a deforming function for deforming the undeformed model to generate the deformed model; and returning the deformed model.

In a variation of the illustrative method, at least one of the set of feature specifications is continuous and has corresponding parameterized strength field, transformation, and weighting field. In this variation, the illustrative method also includes receiving a sampling function for discretizing the transformation and sampling strength and weighting fields and computing a discretized transformation, a sampled strength field, and a sampled weighting field with the sampling function. In this instance, the step of computing a sum of the set of scaled transformations employs the discretized transformation, the sampled strength field, and the sampled weighting field.

Still further, the set of feature specifications, the set of transformations, the set of strength fields, the set of weighting fields, and the sampling function can be received by a combined function that computes the discretized transformation, the sampled strength field, and the sampled weighting field.

It should be noted that the present invention is operable with geometric deformations in a general manner. In particular, the present invention is not limited to feature-based deformations, although it may obtain particular benefits with feature-based deformations.

The illustrative method operates with a wide variety of features and conveniently generates many useful deformations. In one version, the set of feature specifications includes a plurality of line segment features; the set of transformations corresponding to the plurality of line segment features map source coordinate frames to target coordinate frames; and the set of weighting fields corresponding to the plurality of line segment features fall off with distance. In some instances, the set of weighting fields give influence to line segment features in the plurality of line segment features in relation to their length. In some instances, the source coordinate frames include a constrained basis vector and an unconstrained basis vector and the unconstrained basis vector is selected responsive to a weighted sum of the vectors perpendicular to the constrained basis vector for each of said target coordinate frames.

In another version, the set of feature specifications includes control points in an at least two dimensional lattice. The at least two dimensional lattice has an associated local coordinate system, and the set of weighting fields corresponding to the control points include Bernstein polynomials with their arguments as points of the undeformed model represented in the local coordinate system. In a variation, oriented points are used.

In yet another version, at least one of said set of feature specifications includes a source curve and a target curve. Here, corresponding members of the set of parameterized transformations include a composition of a translation from points along the source curve to corresponding points along the target curve, a rotation taking the tangent at the points along the source curve to the tangent at the points along the target curve, and a scale centered at the points along the source curve. In addition, corresponding members of said set of strength fields include a falloff function having a domain and a range and monotonically decreasing over the range. Over at least a portion of the domain (and sometimes over the entirety), arguments of the falloff function include a distance between elements of the undeformed model and point along the source curve and a rate of falloff for the distance. Also, corresponding members of the set of weighting fields include a scaled displacement function having a domain and a range, wherein for at least a portion of the domain the scaled displacement function includes a power of the displacement of elements of said undeformed model by the corresponding members of said set of transformations.

In another version, the undeformed model includes control vertices of a fine detail model. In this instance, and at least one of the set of feature specifications may include a source position and a target position of one or more vertices of a coarse deformation mesh. The coarse deformation mesh may be configured so that deformation of the fine surface model may be obtained by deformation of the coarse deformation mesh. In addition, the set of feature specifications includes one or more sets of edges incident on the one or more vertices.

In still another version, the undeformed model includes control vertices of a surface for deformation. No representation of the surface is essential and any point valued model could be used. Source and target features are surface regions (surfaces or parts thereof) described as aa function that evaluates to tuples of a point on the feature and a vector normal to the point on the source or target surface region. The source and target suface regions need not be subsets of the suface model. Corresponding members of the set of transformations include a composition of a translation mapping points on the source region of the surface to points on the target region of the surface, and a rotation taking the vector normal to the points on the source region to the vector normal to the points on the target region of the surface. In a variation, corresponding members of the set of strength fields localize the effect of the set of transformations around the source surface region. In addition, corresponding members of the set of weighting fields decrease monotonically with corresponding members of said set of strength fields and the set of weighting fields decrease responsive to (a) a distance between control vertices of the surface for deformation and said point on said surface, (b) a range for limiting the region of the weighting field, and (c) a rate for controlling the rate of decrease of the weighting field.

Another aspect of the invention is computing machinery configured to carrying on the methods in accordance with the invention including, for instance, the above-described methods. Still another aspect is a computer program product including a computer readable medium having computer program code encoded thereon able to configure computing machinery to carry on methods in accordance with the invention.

These and other features, aspects, and advantages of the present invention will become better understood with regard to the following description, appended claims, and accompanying drawings.

BRIEF DESCRIPTION OF THE DRAWINGS

The file of this patent contains at least one drawing containing features lined for colors, such as yellow, green, red, and blue. Unless otherwise noted, in the drawings, source features are indicated with lining for red, and target features with lining for blue.

FIG. 7A depicts a flow diagram of a method for computing feature based warps in accordance with an illustrative embodiment;

FIG. 13A depicts an undeformed model with competing line segment features in an image warp;

DETAILED DESCRIPTION $$M'(u) = D(u, M)\langle M(u)\rangle \tag{1}$$

$$D(u, M) = T \tag{2}$$

$$D(u, M) = S(u, M) \cdot T \tag{3}$$

$$D(u) = \sum_{i=1}^{N} \{\hat{W}_i(u, M) \cdot (S_i(u, M) \cdot T_i)\} \tag{4}$$

$$D(u) = \sum_{i=1}^{N} \int_{v \in V_i} \hat{W}_i(v, u, M) \cdot (S_i(v, u, M) \cdot T_i(v)) dv \tag{5}$$

-continued $$D(u) = \sum_{i=1}^{N} \sum_{v_j \in V_i} \hat{W}_i(v_j, u, M) \cdot (S_i(v_j, u, M) \cdot T_i(v_j)) \tag{6}$$

$$F_{ijk} \approx \{P_{ijk}, P'_{ijk}\} \tag{7a}$$

$$T_{ijk} = P'_{ijk} - P_{ijk} \tag{7b}$$

$$S_{ijk} = 1 \forall u \tag{7c}$$

$$W_{ijk} = B_i^l(M_x(u)) B_j^m(M_y(u)) B_k^n(M_z(u)) \tag{7d}$$

$$F_i = \{L_i, L'_i, a_i, b_i, p_i\} \tag{8a}$$

$$T_i = \text{map from } f_i \to f'_i \tag{8b}$$

$$S_i(u) = 1 \forall u \tag{8c}$$

$$W_i(u) = \left(\frac{length^{p_i}}{a_i + dist}\right)^{b_i} \tag{8d}$$

$$\sum_j \left[\hat{W}_{ij}(R_j \langle N_i \rangle)\right] \text{ where } W_{ij} = \left(\frac{length^{p_j}}{(a_j + dist)(a_j + (Q_i - P_i) \cdot (Q_j - P_j))}\right)^{b_j} \tag{8e}$$

$$\text{and } \hat{W}_{ij} = \frac{W_{ij}}{\sum_{k=1}^{n} W_{ik}}$$

$$F_i = \{C_i, C'_i, f_i, r_i, x_i, m_i\} \tag{9a}$$

$$T_i(v) = T \circ R \circ S \tag{9b}$$

$$S_i(v, u) = f_i\left(\frac{\|M(u) - C_i(v)\|}{r_i}\right) \tag{9c}$$

$$S_i(v, u) = \begin{cases} f_i\left(\frac{\|M(u) - C_i(v)\|}{\|D_i^{M(u)} - C_i(v)\|}\right) & \text{if } \alpha \geq \delta_i \\ f_i\left(\frac{\|M(u) - C_i(v)\|}{Interp(\alpha)}\right) & \text{if } 0 < \alpha < \delta_i \\ f_i\left(\frac{\|M(u) - C_i(v)\|}{r_i}\right) & \text{if } \alpha \leq 0 \end{cases} \tag{9d}$$

$$W_i(v, u) = \begin{cases} 0 & \text{if } \exists c < v \text{ s.t. } \|M(u) - C_i(c)\| < \|M(u) - C_i(v)\| \\ \|(S_i(v, u, M) \cdot T_i(v))\langle M(u)\rangle - M(u)\|^{m_i} & \text{otherwise} \end{cases} \tag{9e}$$

$$W_i(v, u) = \left(f_i\left(\frac{\|M(u) - C_i(v)\|}{r_i}\right)\right)^{k_i} \tag{9f}$$

$$W_i(v, u) = \|T_i(v)\langle M(u), S_i(v, u)\rangle - M(u)\|^{m_i} \tag{9g}$$

$$W_i(v, u) = \left(f_i\left(\frac{\|M(u) - C_i(v)\|}{r_i}\right)\right)^{k_i} \tag{9h}$$

$$F_i = \{P_i, E_i, P'_i, E'_i\} \tag{10a}$$

$$T_i = A \circ T \tag{10b}$$

$$S_i(u) = 1 \forall i, u \tag{10c}$$

$$W_i(u) = f_{\alpha\beta}\left(\frac{\|M(u) - P_i\|}{\|E_{im}\|}\right)\left(\Pi_j f_{\gamma\mu}\left(\frac{(M(u) - P_i) \cdot E_{ij}}{E_{ij} \cdot E_{ij}}\right)\right) \tag{10d}$$

$$F_i = \{Surf_i, Surf'_i, \alpha_i, \beta, r_i, e_i\} \tag{11a}$$

$$T_i(v) = R \circ T \tag{11b}$$

$$S_i(v, u) = f_{\alpha_i \beta_i}(\|M(u) - Surf_i(v).pos\|) \tag{11c}$$

-continued $$W_i(v, u) = S_i(v, u) \left( \frac{1}{\varepsilon + \left( \frac{\|M(u) - Surf_i(v).pos\|}{r_i} \right)^{e_i}} \right) \quad (11d)$$

DESCRIPTION OF FIGURES

Figure 1:
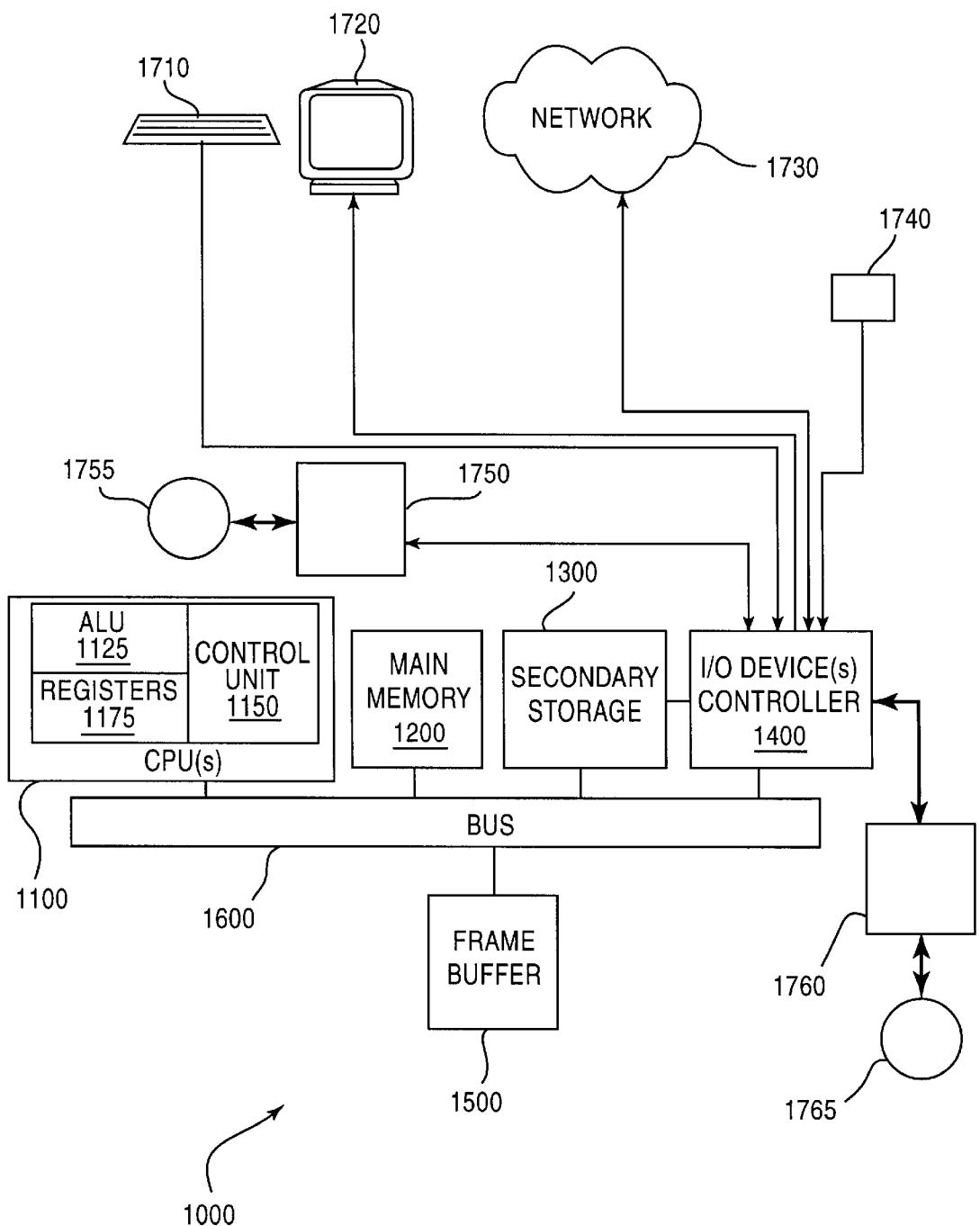
FIG. 1 depicts a computer system capable of being configured to embody aspects of the invention in accordance with an illustrative embodiment.

In preferred embodiments, methods according to the invention are computer-implemented. FIG. 1 depicts a computer system 1000 capable of implementing and embodying aspects of the invention. The computer system 1000 includes a microprocessor 1100 comprising an arithmetic logic unit 1125 for performing arithmetic and logic operations, a set of registers 1175 providing rapid operational data access and storage, and a control unit 1150 for fetching, decoding, and executing instructions. The computer system 1000 further comprises a main memory 1200 capable of storing an executing program and data used by the program, a secondary storage 1300 capable of storing more information than the main memory 1200 and which may comprise one or a collection of devices such as magnetic or optical disks, or the like. In addition, the computer system 1000 comprises a bus 1600, communicatively coupled with the microprocessor 1100, the main memory 1200, and the secondary storage 1300 capable of providing a datapath for moving data and instructions among attached devices.

The computer system 1000 also comprises an input/output device controller 1400 communicatively coupled with the bus 1600 and configured for controlling input/output from devices. The input/output device controller 1400 may operate with, for instance, a keyboard 1710, a display 1720, a data network 1730, and a pointing device 1740. In addition, the input/output device controller 1400 may operate with a media drive 1750 such as a disk drive, CD drive, or the like. The media drive 1750 may operate with a computer-usable storage medium 1755 capable of storing computer-readable program code able to configure the microprocessor 1100 to embody aspects of the invention. The input/output device controller 1400 may also operate with a graphics product writer 1760 such as a film writer, DVD writer, or the like. The graphics product writer 1760 operates with a computer graphics product 1765 such as film, DVD, etc. In some embodiments, warps are created by the computer system 1000 and written on the computer graphics product 1765 along with other images. The graphics product writer 1760 and the display 1720 typically use a frame buffer 1500. As depicted, the computer system 1000 is general purpose computing machinery. As one of skill in the art appreciates, programmed instructions may configure general purpose computing machinery to embody structures for performing functions in accordance with aspects of the invention. Programmed instructions, either in source code or compiled form ("code") may be stored on the computer-usable storage medium 1755. The computer system 1000 may also operate with a compiler (not shown) to generate executables from source code. The computer-usable storage medium 1755 having code for suitable configuring the computer system 1000 to carry on features and/or perform functions in accordance with the invention may be a made and used in any conventional way. Special purpose computing machinery may also be used, as may programmable or evolveable hardware; and the particular hardware environment is not fundamental. Rather, one skilled in the art will recognize numerous structures of programmed or programmable logic capable of being configured to embody aspects of the invention. In some illustrative versions of the invention, high performance graphics workstations such as those available from Silicon Graphics of Mountain View, Calif. are used.

In an illustrative embodiment of the invention, computer program code configures a graphics computer system such as the computer system 1000 to provide a system for geometric warps and deformations. In accordance with the illustrative embodiment, the warp acts on an undeformed model represented as a point-valued function M(u) defined on a source domain U such that:

$M(u)$=model point, for $u \in U$

Any of many conventional model representations may be used depending on the type of model being warped. In some embodiments a vertex mesh is used, in others an image is used. When a vertex mesh is used, U could be the set of n vertex indices 1 . . . n and M(u) is the vertex indexed by $u \in U$. In vertex mesh embodiments, the warp will move the vertices to new positions in space. The mesh may represent, for instance, a polygonal model or the control vertices of a smooth surface. When an image is used, U could be the 2-D plane, and M(u)=u is defined over the plane. The warp will create a mapping of pixel coordinates between the original and deformed images, for subsequent sampling of the image data. One skilled in the art having the benefit of this disclosure will readily appreciate other model representations operable with features of the invention and accordingly are within the scope and spirit of the invention.

Illustrative embodiments of invention are explicitly feature based, however this is not fundamental. Rather, the present invention is generally operable with the broader class of geometric deformations.

In accordance with an illustrative embodiment, output of a warp may be expressed as a deforming function, D(u,M), that is a transformation-valued function defined on the domain U and taking a value $u \in U$ and the model M as input. To compute the warped model M' that is a point-valued function defined on the domain U, as is M(u), the deforming function is evaluated at u and applied to the point given by evaluating the model at u. For clarification of exposition, it is helpful to denote the application of a translation T to a point p by T<p>. Notationally:

$M'(u) = D(u,M) < M(u) >$ (1)

One simple deforming function convenient in some instances is a displacement model. For instance, the output of the warp may be generated with a vector-valued function defined on the domain U. The displacement model can then be added to the undeformed model to yield the deformed model.

Further in accordance with the illustrative embodiment, a set of feature specifications is used to represent mappings from source to target features. Each of the set of feature specifications comprises a source feature, a target feature, and related deformation parameters for controlling deformation caused by the feature specification. In some instances the number of related deformation parameters may be zero. Again, as noted above, some embodiments of the invention are not feature based and, in such case, a parameter set is used for controlling the warp.

The invention is not limited to particular types of features. In preferred embodiments a warp designer selects the set of feature specifications; this aspect is limited only by the warp designer's ingenuity. Further, source and target features need not be part of the undeformed or deformed model. Frequently, however, they are indicident on model(s).

POINT FEATURES

A simple version of the invention will now be described to illustrate basic aspects of the invention. In this version the set of feature specifications consists of a single element and the single element is a point feature. The warp maps the point feature, from its source position, P, to its target position, P'. This transformation is a constant translation, T=P'−P. Equation 2 represents the resulting deforming function:

$$D(u,M)=T \qquad (2)$$

Figure 2A:
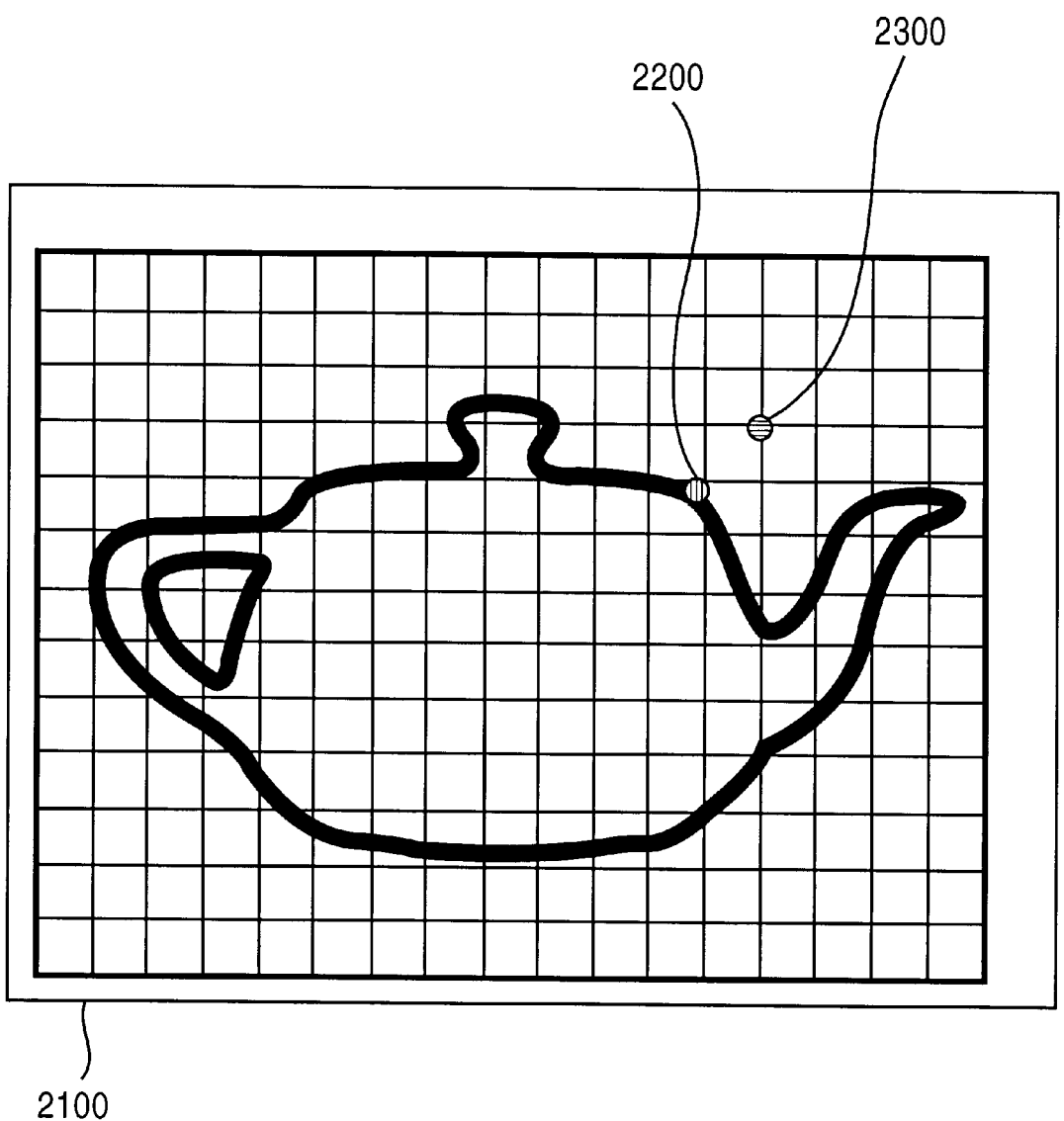
FIG. 2A depicts an undeformed model with a point feature.
Figure 2B:
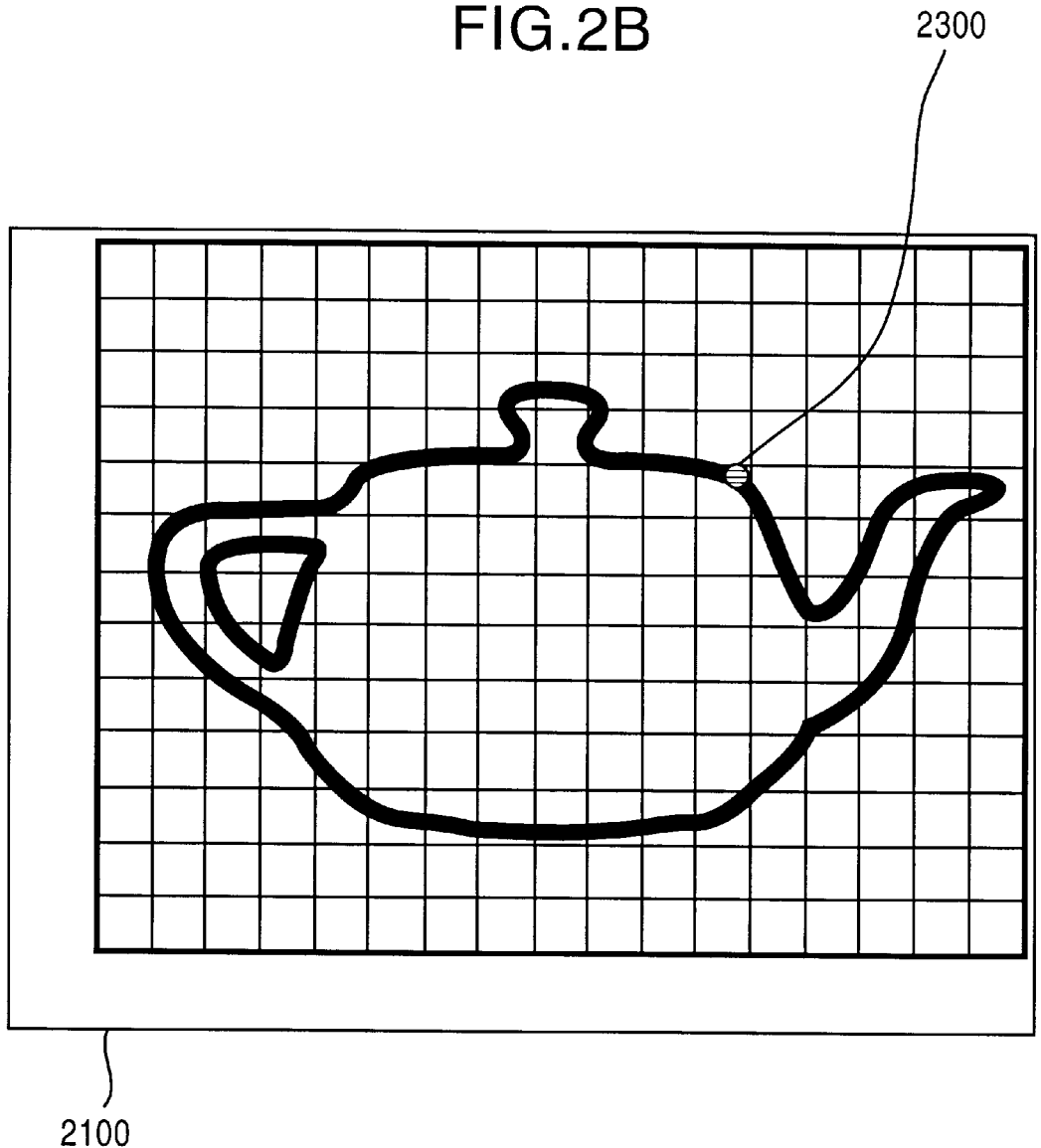
FIG. 2B depicts a deformed model for the undeformed model of FIG. 2A deformed with a simple translation.

FIG. 2A depicts an undeformed model and FIG. 2B a deformed model. The warp transforms the undeformed model to the deformed model. FIG. 2A depicts a reference box 2100, a source feature 2200 and an target feature 2300. The effects of the constant translation T can be appreciated with reference to FIG. 2B where the source feature 2200 has been mapped to the target feature 2300. The constancy of the translation across the undeformed model can be understood in view of the position of the model points relative to the reference box 2100 in FIG. 2A and FIG. 2B.

The translation described above may provide more desirable warping when its effect is varied across the undeformed model. A set of strength fields corresponding to the set of feature specifications are also defined over the undeformed model. The set of strength fields operates in computing the deformed model by scaling the magnitude of each of the set of transformations over elements of the undeformed model. Notationally, S(u,M) denotes a strength field for u in U. Strength fields are parameterized on the model M, however it may be assumed for the purposes of computing the deformation that the model is available to the set of strength fields and the simpler notation S(u) interchangeably used for clarity. In preferred versions, S(u) is a scalar-valued function taking on values in the range [0,1] for any u in U.

The multiplication of a transformation, T, by a scalar s is denoted s·T. Modifying equation (2) to include the strength field yields:

$$D(u,M)=S(u,M)\cdot T \qquad (3)$$

Figure 3A:
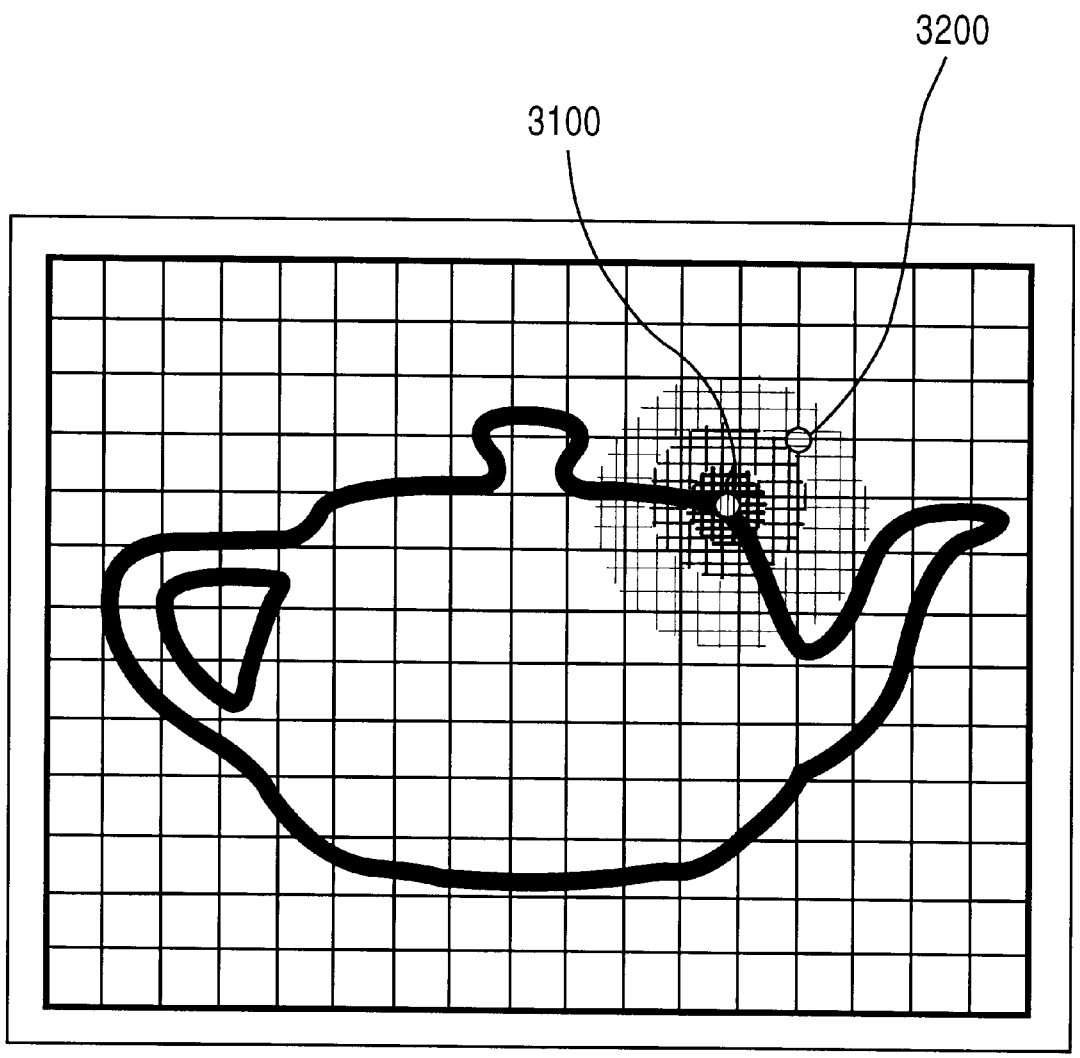
FIG. 3A depicts an undeformed model with a point feature and scaling field.

FIG. 3A depicts an undeformed model with a source feature 3100 and a target feature 3200. A strength field is also shown. The strength field is shown with lining for yellow in the accompanying figures and the transparency corresponds to value of the strength field: the greater the magnitude of the strength field, the less transparent. As illustrated in FIG. 3A, the strength field falls off radially from a value of 1 at the source feature 3100.

Figure 3B:
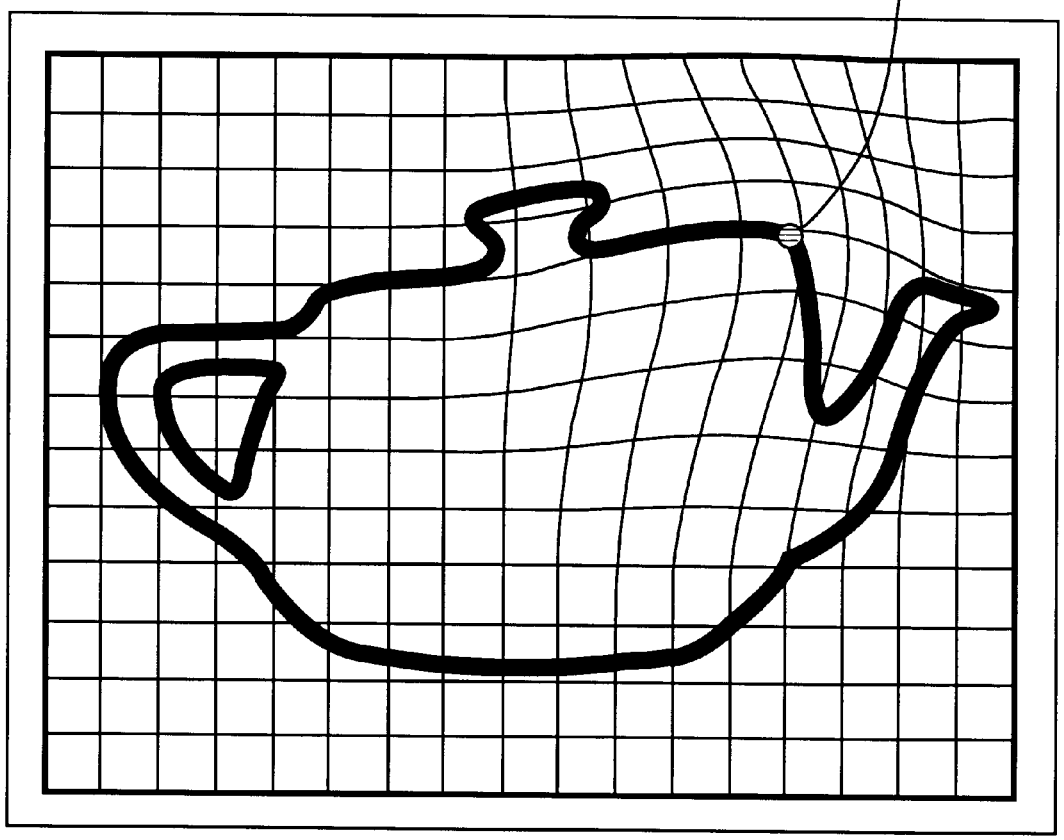
FIG. 3B depicts a deformed model for the undeformed model of FIG. 3A deformed with a simple translation scaled by the scaling field.

The effect of the strength field can be appreciated with reference to FIG. 3B that depicts the target feature 3200 in a deformed model. The deformed model corresponds to the simple translation transformation discussed in connection with FIG. 2A and FIG. 2B scaled with the strength field depicted in FIG. 3A.

More generally, aspects of this illustrative embodiment are also applicable when there are plural features. Notationally, assuming, for instance, a set point features of cardinality n indexed by i, the corresponding said set of feature specifications F may be written $F_i=\{P_i,P'_i\}$ for $1 \leq i \leq n$. Each of the set of feature specifications has a corresponding strength field in a set of strength fields that is similarly denoted $S_i(u)$. In addition, each of the set of feature specifications can be described by a translation $T_i=P'_i-P_i$ in this illustrative embodiment.

When the set of strength fields and the corresponding set of transformations contain plural elements, a set of weighting fields is introduced. The set of weighting fields corresponds to the set of feature specifications. The set of weighting fields is also defined over the undeformed model, and performs the function of determining the relative influence of a set of scaled transformations over elements in the undeformed model. A scalar value weighting field is conveniently denoted $W_i(u,M)$. As with $S_i(u,M)$ the weighting field is parameterized on the model M, however it may be assumed for the purposes of computing the deformed model that the model is available to the set of weighting fields and the set of strength fields in evaluating model points M(u).

The set of weighting fields may be included in the equation for computing the deforming function at each model-domain point u in U as a weighted averaged of the scaled transformations as shown in Equation 4:

$$D(u) = \sum_{i=1}^{N} \{\hat{W}_i(u, M) \cdot (S_i(u, M) \cdot T_i)\} \qquad (4)$$

In preferred versions, normalized weights are used for the set of weighting fields and (using the simpler notation)

$$\hat{W}_i(u, M) = \begin{cases} \dfrac{W_i(u, M)}{\sum_{j=1}^{n} W_j(u, M)} & \text{if } W_j(u, M) \neq 0 \text{ for some } j \\ 0 & \text{if } W_j(u, M) = 0 \text{ for all } j \end{cases}$$

Figure 4A:
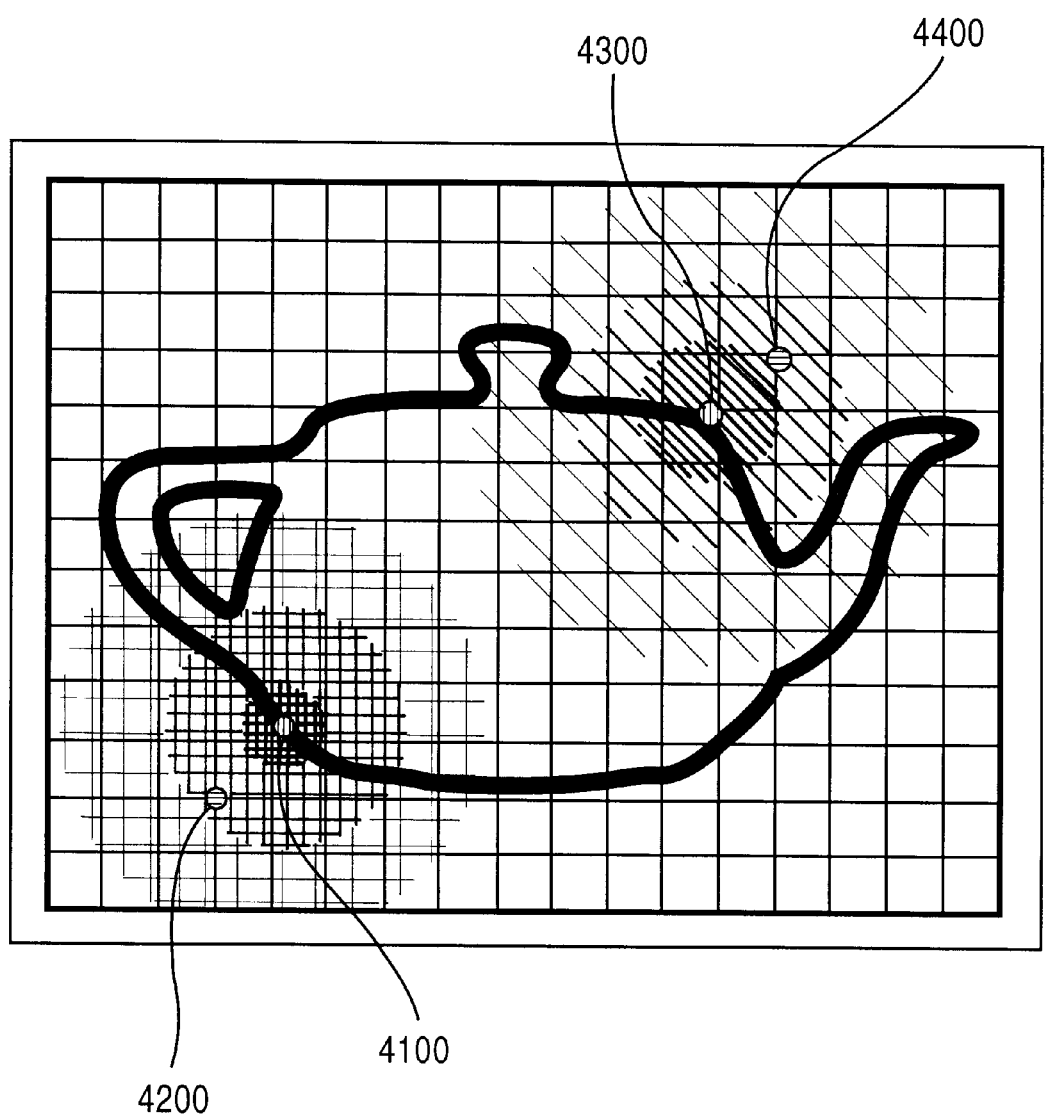
FIG. 4A depicts an undeformed model with two point features and two weighting fields.

FIG. 4A depicts an undeformed model with a first source feature 4100, a first target feature 4200, a second source feature 4300, and a second target feature 4400. A first and second weighting field are shown corresponding to, and centered at, the first source feature 4100 and the second source feature 4300, respectively. The first weighting field is shown with lining for yellow in the accompanying figures and the second weighting field is shown with lining for green. The transparency corresponds to value of the weighting fields as illustrated in FIG. 4A; the weighting fields fall off radially (but at different rates) from 1 at the first source feature 4100 and the second source feature 4300.

Figure 4B:
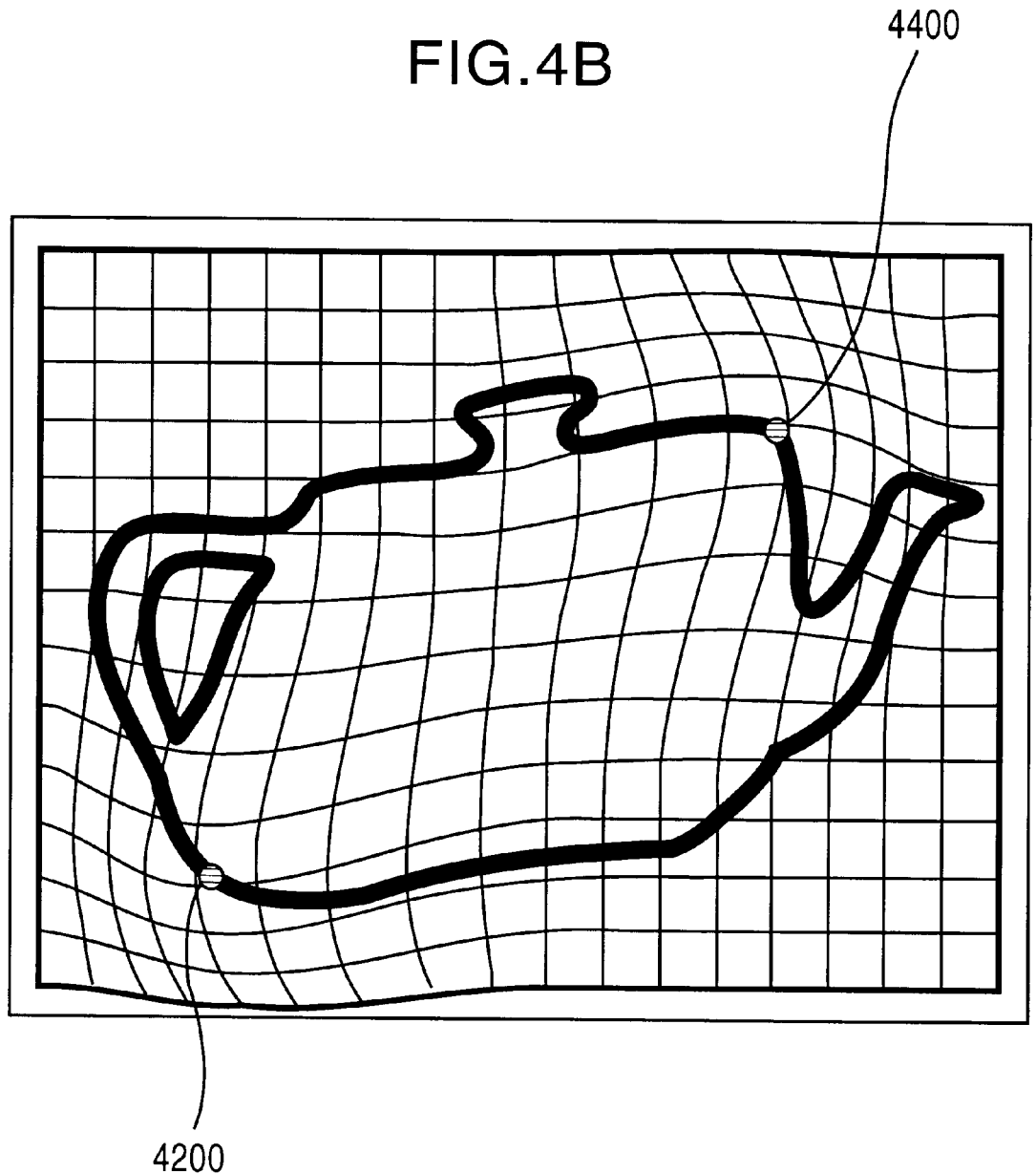
FIG. 4B depicts a deformed model for the undeformed model of FIG. 4A deformed with simple translations weighted by weighting the fields of FIG. 4A.

The effect of the weighting field can be appreciated with reference to FIG. 4B that depicts the first target feature 4200 and the second target feature 4400 in a deformed model. The deformed model corresponds to the simple translation transformation discussed in connection with FIG. 2A, scaled with the strength field discussed in connection with FIG. 3A, and weighted with the weighting fields depicted in FIG. 4A.

ORIENTED POINTS

As one of skill in the art will by now appreciate, the invention encompasses more complex features than the point features of the simple version described up to now. Another illustrative feature is an oriented point, that is a point with local coordinate frames. Notationally, $f_i$ and $f'_i$ represent a source coordinate frame and a target coordinate frame, respectively and one of the set of feature specifications is denoted:

$$F_i=\{f_i,f'_i\}$$

Each of the set of feature specifications defines a transformation that maps the source coordinate frame to the target coordinate frame:

$$T_i = \text{map from } f_i \to f'_i$$

The warp designer may describe $T_i$ directly by specifying how it maps frame origins and basis vectors. In addition, the warp designer may describe the transformation as an ordered composition, for instance of translate, rotate, scale, and shear components. The particular manner in which the transformation is described is not fundamental and is limited only by the ingenuity of the warp designer.

Figure 5A:
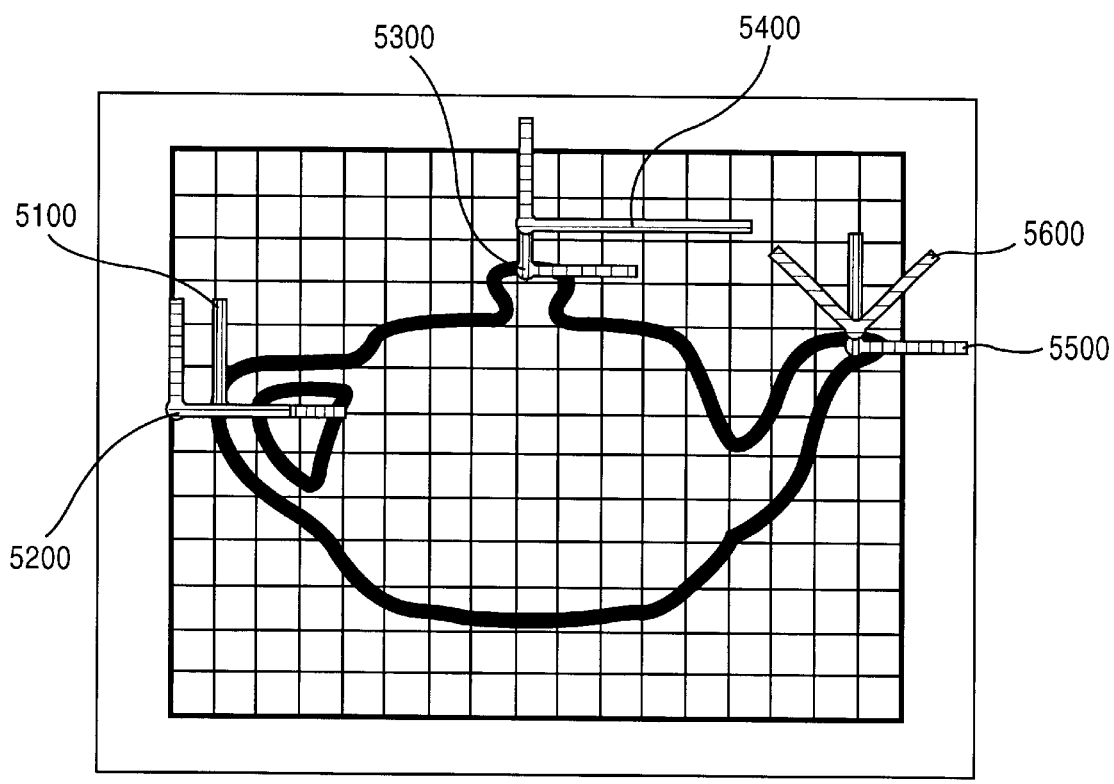
FIG. 5A depicts an undeformed model with three oriented point features.
Figure 5B:
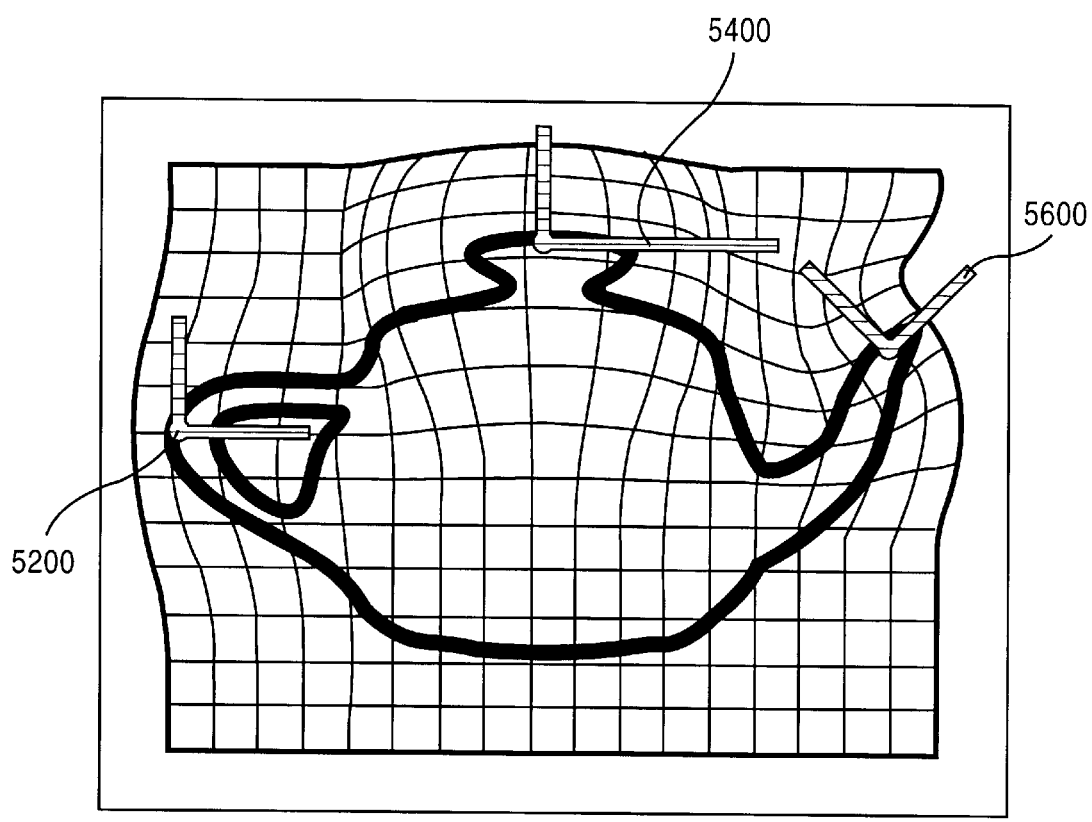
FIG. 5B depicts a deformed model for the undeformed model of FIG. 5A deformed with a translation scaled with the Displacment Method.

FIG. 5A depicts an undeformed model as well as three source oriented point features: a first source oriented point 5100, a second source oriented point 5300 and a third source oriented point 5500. Each of the three source oriented point features is depicted with an accompanying set of basis vectors (shown along the horizontal and vertical axes). FIG. 5A Also depicts three oriented point target features: a first target oriented point 5200, a second target oriented point 5400, and a third target oriented point 5600. FIG. 5B depicts the deformed model. Again, the strength fields and weighting fields are radial fall-offs.

Considering FIG. 5A and FIG. 5B, it will be appreciated that the first source oriented point 5100 maps to the first target oriented point 5200 as a simple translation. In addition, the third source oriented point 5500 maps to the third target oriented point 5600 as a rotation. Finally, the second source oriented point 5300 maps to the second target oriented point 5400 as a translation and a scale.

As described above in connection with point features, strength field $S_i(u)$ scales the deformation of feature specification $F_i$ over the undeformed model. Above, this was computed by scaling the translation $T_i$. However, in other embodiments more general transformations may be used. One may define the multiplication s·T of a transformation T by a scalar s in many ways as one skilled in the art will recognize. Two will be described below with the understanding that one of ordinary skill in the art, having the benefit of this disclosure, will be able to recognize, make, and use may others and that the many others are also within the scope and spirit of the present invention.

A first method of defining the scaled transformation, is to linearly interpolate between the identity transformation I and the transformation T. That is s·T=sT+(1−s)I where T and I are the matrix representations of the transformations T and I, respectively. With this method, the effect of applying s·T to a point P is to multiply the displacement that would have been caused by T, so that (s·T)<P>=P+s(T<P>−P) This is hereinafter referred to as the "Displacement Method".

A second method of defining the scaled transformation is applicable, for instance, when the transformation is defined as a composition (the "Composition method"). For instance if the transformation were defined as an ordered composition of translate, rotate, scale, and shear components, the scaled transformation could be defined as follows: scale each component of T by s and recompose to produce a new transformation, T' and then apply T' to p.

As noted above in the discussion of weighting fields it is desirable to combine the effects of multiple feature specifications at each model point by computing a weighted average of the transformations they imply. In order to do this for our more general transformations, we must not only define the result of the multiplication s·T, but also the result of the addition of transformations. Just as there are many ways of defining the multiplication of a transformation by a scalar, there are many ways to define this addition.

In an illustrative embodiment, matrix addition is used for this addition. Namely, the matrix representations of the transformations are added. If the Displacement Method is used to compute the product of weights and transformations, the computed weighted average is equivalent to a weighted average of the displacements caused by the transformations. The product of the normalized weights $\hat{w}_i(u,M)$ and transformations $(s_i(u,M) \cdot T_i)$ is computed using the displacement method (regardless of method used to compute the product $(s_i(u,M) \cdot T_i)$, and matrix addition is used to compute the sum of the transformations. Matrix addition is not fundamental to carrying on the invention and other techniques could be used.

Equation (4) still defines the deforming function for this formulation, but now interpret $T_i$ as an arbitrary transformation $(s_i(u,M) \cdot T_i)$ using one of the more general methods for multiplying a transformation by a scalar, e.g., the Displacement Method or the Composition Method, and compute the weighted average of transformations, as a weighted average of transformations is a weighted average of the displacements caused by those transformations as outlined above.

CONTINUOUS FEATURES

Up to this point the features shown in the figures have been discrete: points or oriented points. Aspects of the invention apply to continuous features including, for instance curves and surfaces, as well. For purposes of exposition, assume that a source curve feature, $C_i(v)$, and a target curve feature, $C'_i(v)$, in a feature specification are parameterized over a domain $V_i = [0,1]$. A feature specification is then denoted:

$$F_i = \{C_i(v), C'_i(v)\}$$

and represents continuous quantities parameterized on the domain $V_i$. The deformation caused by the transformation corresponding to $F_i$ is now a parameterized transform $T_i(v)$: a function that returns a transformation when evaluated for any $v \in V_i$; the strength field and the weighting field are similarly parameterized on $V_i$: $S_i(u,v), W_i(u,v)$ respectively.

The deforming function is computed as before as a weighted average of a (now infinite) set of scaled transformations. With a collection of transformation continuums (one for each feature specification) the weighted average becomes a summation of integrals as shown in Equation 5:

$$D(u) = \sum_{i=1}^{N} \int_{v \in V_i} \hat{W}_i(v, u, M) \cdot (S_i(v, u, M) \cdot T_i(v)) dv \qquad (5)$$

where $\hat{W}_i(v, u, M) =$ $$\begin{cases} \dfrac{W_i(v, u, M)}{\sum_{j=1}^{n} \int_{v_j \in V} W_j(v, u, M)} & \text{if } W_j(v, u, M) \neq 0 \text{ for some } j \\ 0 & \text{if } \int_{v_j \in V} W_j(v, u, M) = 0 \text{ for all } j \end{cases}$$

In some instances, the $V_i$ in formula 5 are not continuous domains and are rather discrete collection. When discrete collections, the integrals in formula 5 reduce to summation and formula 5 becomes a double summation:

$$D(u) = \sum_{i=1}^{N} \sum_{v_j \in V_i} \hat{W}_i(v_j, u, M) \cdot (S_i(v_j, u, M) \cdot T_i(v_j)) \quad (6)$$

Figure 6A:
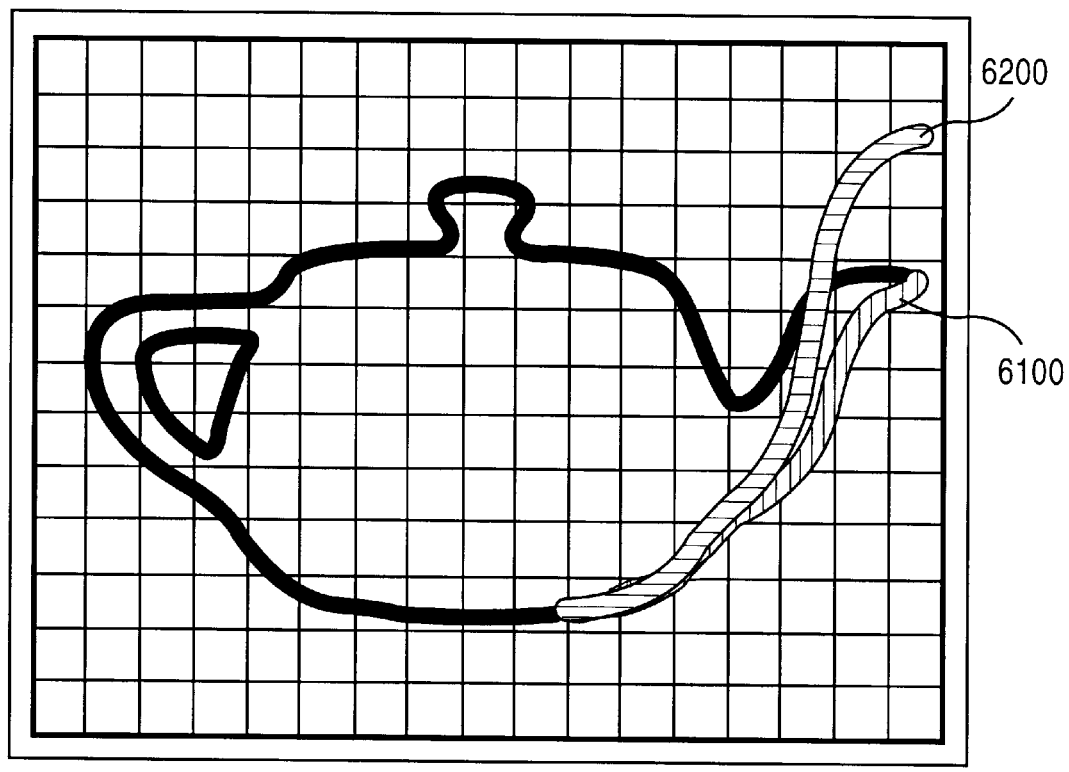
FIG. 6A depicts an undeformed model with continuous source and target curve features.
Figure 6B:
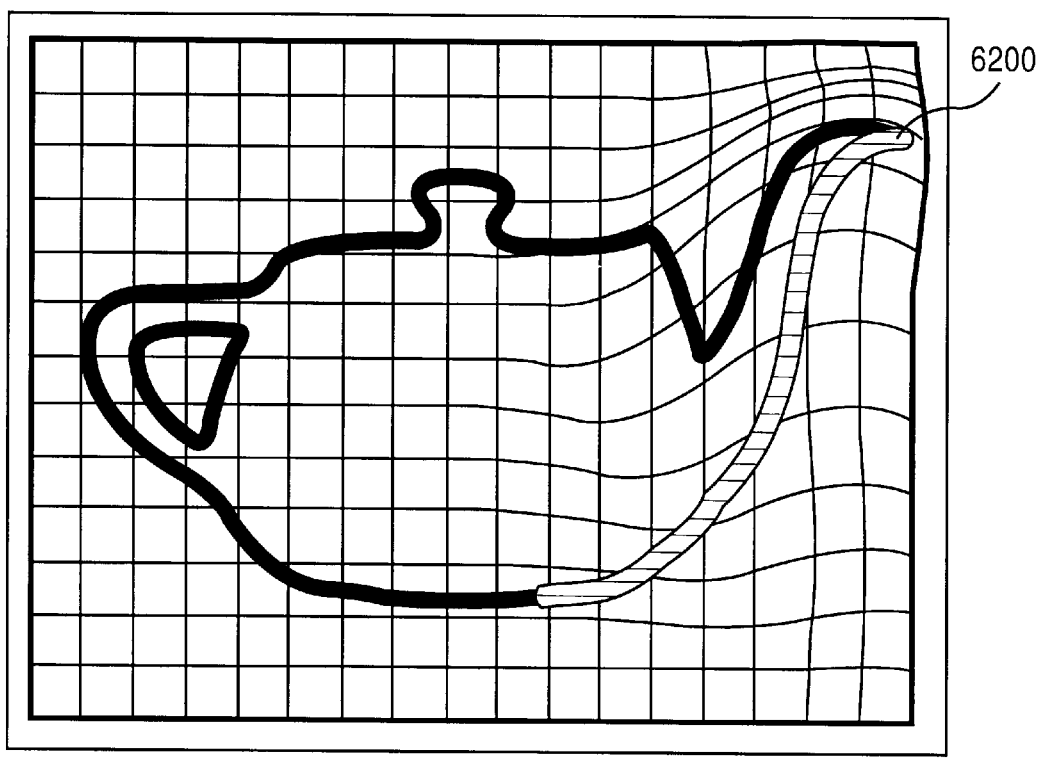
FIG. 6B depicts a deformed model for the undeformed model of FIG. 6A.

FIG. 6A and FIG. 6B illustrate a deformation with a continuous feature. FIG. 6A depicts a continuous source feature 6100 and a continous target feature 6200. A transformation, parameterized on a continuous domain, V, uses the composition method. More particularly, $T_i(v) = T \cdot R \cdot S$ where:

$$T = C'_i(v) - C_i(v)$$

R is the smallest rotation that takes the vector $$\frac{dC_i(v)}{dv} \text{ to } \frac{dC'_i(v)}{dv},$$

and S is a uniform scale of magnitude $x_i$ centered at the point $C_i(v)$.

The strength fields and weighting fields are as described below in connection with Equations 9a–9f.

The resulting deformed model is shown in FIG. 6B where the continous target feature 6200 is shown.

A warp designer may use various combinations of discrete and continuous features in any particular model deformation application. In a typical practical embodiment, the warp designer will desire that plural features be used and that at least one of the plural features is continuous.

FIG. 7A depicts a flow diagram of a method for computing geometric warps and deformations in accordance with an illustrative embodiment. In a typical practical implementation selections of model representation and user interface aspects would be addressed. These form no part of the invention, however, and may be carried on in any of several suitable conventional manners as one skilled in the art will apprehend. Process flow initiates at a 'start' terminal 7100 and continues where a construction function 7250 receives a set of feature specifications or parameter set 7200. A warp designer may create the set of feature specifications or parameter set 7200 and they could be any combination of continuous or discrete features or parameters. The particular features in the set of feature specifications or parameter set 7200 are not fundamental and one skilled in the art may suitably choose select them based on the needs of the situation. The warp designer also preferably defines the construction function 7250 which provides as its output a set of parameterized transformations 7300, a set of strength fields 7350, and a set of weighting fields 7400.

Next, a 'continuous warp computation' process 7650 uses Equation 5 to compute a deforming function 7750 for computing the warp with Equation 1. The 'continuous warp computation' process 7650 takes as its inputs, the set of parameterized transformations 7300, the set of strength fields 7350, and the set of weighting fields 7400 from the construction function 7250 as well as an undeformed model 7150. Conveniently, the warp designer specifies the representation of the undeformed model 7150. The 'continuous feature computation' process 7650 then uses conventional numerical methods to compute the integrals in Equation 5 when evaluating the deforming function 7750. The undeformed model 7150 is passed to the deforming function 7750 in accordance with Equation 1 which is evaluated at u and applied to M(u) to create a deformed model 7850 that is returned.

Figure 7B:
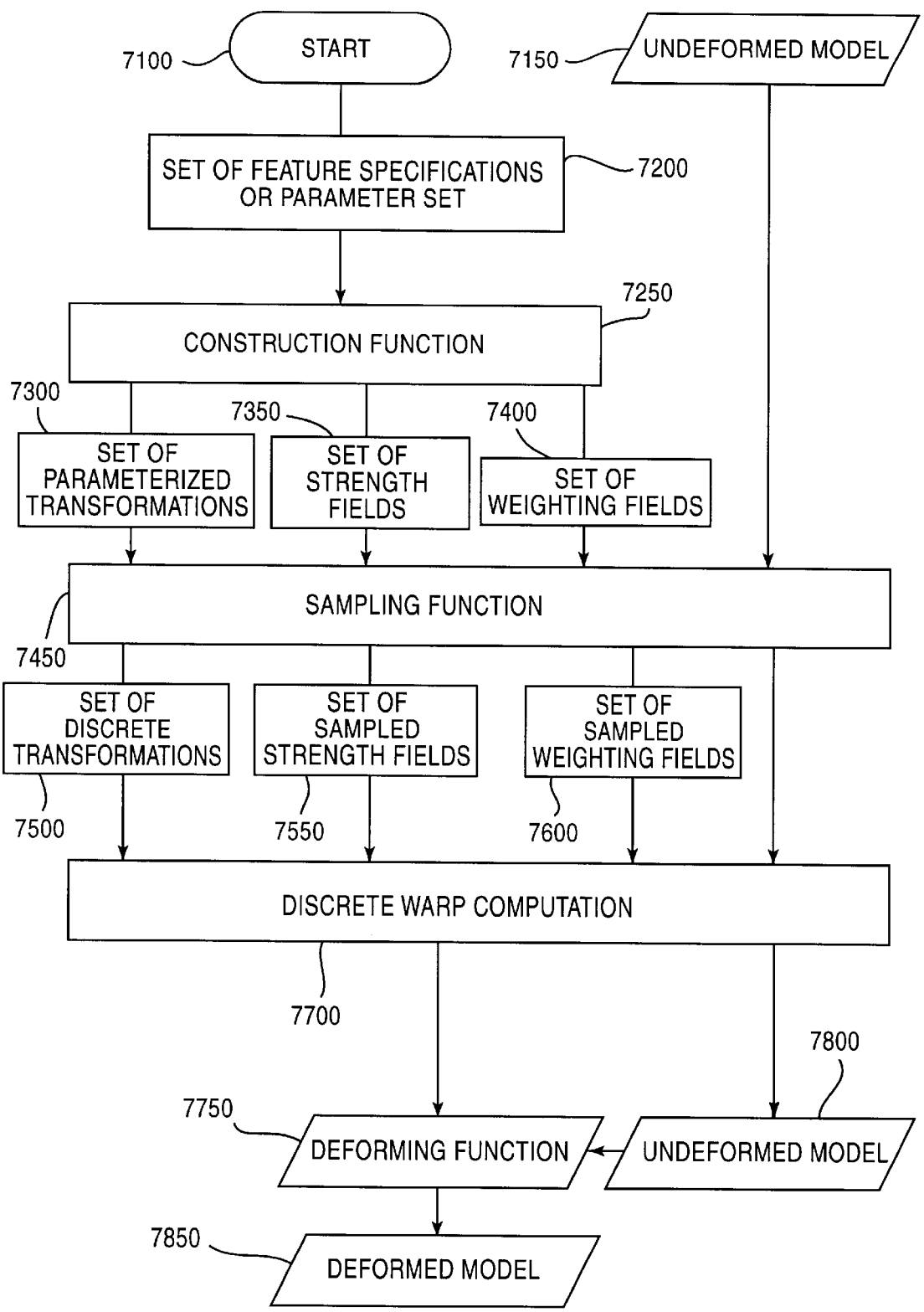
FIG. 7B depicts a flow diagram of a method for computing feature based warps with discretization of continuous features in accordance with an illustrative embodiment.

In other embodiments, the integrals in Equation 5 are not directly computed. FIG. 7B depicts of flow diagram of method for geometric warps and deformations in accordance with such an illustrative embodiment. Process flow initiates as in FIG. 7A, and the 'start' terminal 7100, the undeformed model 7150, the set of feature specifications or parameter set 7200, and the construction function 7250 correspond to those discussed in connection with FIG. 7A. However, in this embodiment any of the set of parameterized transformations 7300, set of strenght fields 7350, and set of weighting fields 7400 that correspond to continuous features are sampled by a sampling function 7450.

Conveniently, the construction function 7250 expresses geometric deformations in the manner provided above. However, the construction function 7250 could also be of other types to provide for non-geometrically-based warps. For instance, the construction function 7250 could be used to solve for transformations, strength fields, and weighting fields that satisfy particular constraints. One appliction could be to define an image warp that minimizes an energy function; another could be a freeform deformation that satisfied direct manipulation constraints. Still others could result, more generally, from the solution to a constrained or unconstrained optimization. An illustrative implementation could involve a warp designer specifying each of n transformations strength field and weighing fields as a vector with m scalar elements (where m is a discrete number of model points, i.e. one value per point). Assembling these n m-vectors into an n by m matrix provides an interpretation where each row corresponds to a transformation. The matrix then can be viewed as a matrix of coefficients of a system of equations that can be solved for field or transformation values. Another type of construction could involve physical simulation. One illustrative application could involve a physics-based deformation where the model is coarsely sampled and strength and weighing fields used to interpolate between the samples.

Independent of construction function, the warp designer preferably specifies a sampling algorithm used by the sampling function 7450. No particular sampling algorithm is fundamental to carrying on the invention. The best sampling algorithm depends on the needs of the warp designer and the model representation. In some instances uniform sampling could be used, as could adaptive methods such as quad trees or irregular sampling. The sampling function 7450 receives the set of parameterized transformations 7300, the set of strength fields 7350, the set of weighting fields 7400 and the undeformed model 7150 and uses the sampling algorithm to output a set of discretized transformations 7500, a set of sampled strength fields 7550, and a set of sampled weighting fields 7600. The output quantities are defined on a domain of model points U.

These discretized quantities are passed to a 'discretized warp computation' process 7700 that uses Equation 6 to compute the deforming function 7750. As discussed in connection with FIG. 7A, the deforming function 7750 is applied to the undeformed model 7150 to return the deformed model 7850 using Equation 1.

Figure 7C:
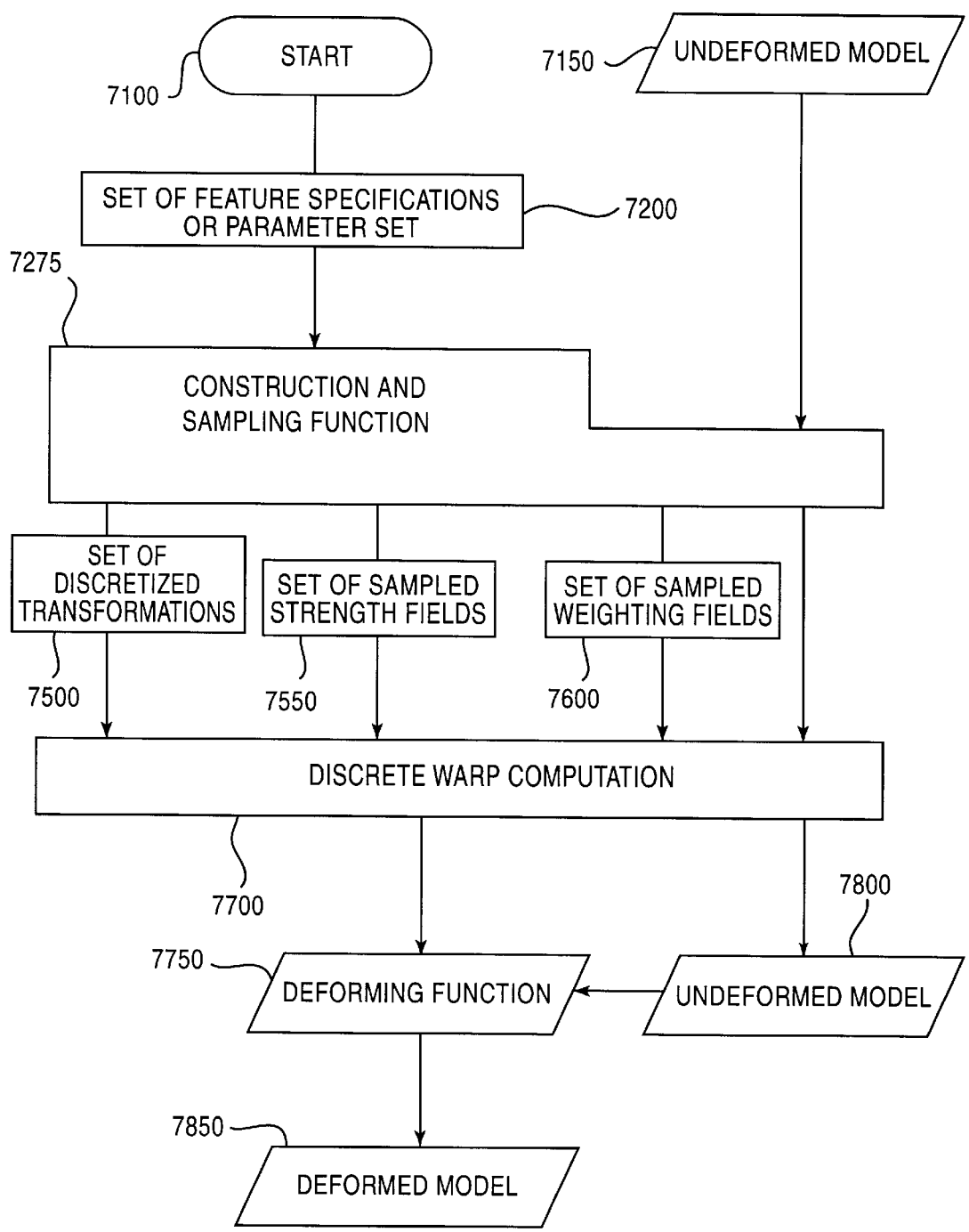
FIG. 7C depicts a flow diagram of a method for computing feature based warps with discretization of continuous quantities combined with a construction function in accordance with an illustrative embodiment.

Programmatically, it is frequently convenient to merge the sampling function 7450 and the construction function 7250. FIG. 7C depicts a flow diagram of an illustrative embodiment where this has been done. A combined construction and sampling function 7275 receives the set of feature specifications or parameter set 7200 and the undeformed model 7150 and returns as output the set of discretized transformations 7500, the set of sampled strength fields 7550, and the set of sampled weighting fields 7600. These are used as discussed in connection with FIG. 7B to compute and return the deformed model 7850.

Figure 8:
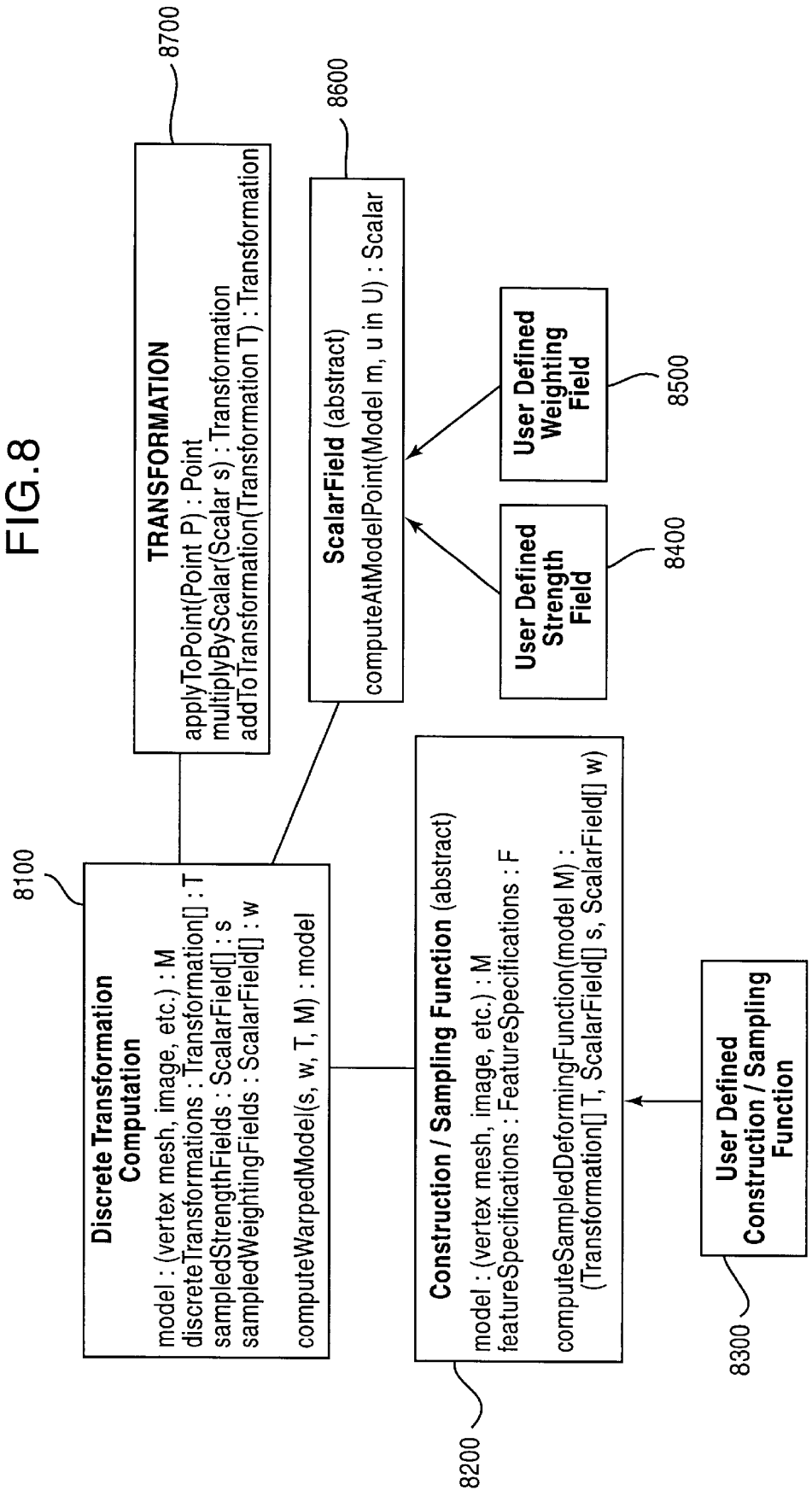
FIG. 8 depicts a class diagram of an implemetation in accordance with an illustative embodiment.

FIG. 8 depicts a class diagram of an implementation in accordance with the embodiment illustrated in FIG. 7C. The class diagram represents elements of a class library preferably implemented in C++. A discrete transformation computation class 8100 performs the deformation computations using Equation 6. The warp designer derives their construction/sampling function 8300 from an abstract base class that represents a construction sampling function 8200. In addition to specifying a transformation class 8700, the warp designer writes functions that generate strength fields 8400 and weighting fields 8500 that inheret from an abstract scalar field base class 8600.

The techniques previously described for geometric warps and deformations provide a powerful and flexible general framework for designing and creating warps and deformations. The result of several widely-used warping and deforming techniques may be obtained in a new and improved manner using our techniques.

One frequently-desired warping result is the free form deformation of a 2 or 3-D graphical object. In one existing technique—that of Sederberg and Parry in *Free-form deformation of solid geometric models*, Computer Graphics (*SIGGRAPH '86 Proceedings*), vol. 20, pages 151–160 (August 1986)—a uniform parallelepiped lattice is established over the space where the graphical object is embedded and control points of representation curves established in the lattice. To achieve the results of the warp, the lattice control points are manipulated and the space is correspondingly deformed.

A similar warping result may be obtained with the present new techniques, and these techniques provide additional warping capability not found in conventional free form deformation techniques. In one version, the model M(u) in a freeform deformation ("FFD") is any point-valued set of data. Other embodiments use, for instance, polygonal, solid, or parametric models. A 3-D grid of (l+1)×(m+1)×(n+1) control points located in a local coordinate system imposed on a parallelepiped region acts as a set of features. For geometric clarity trivariate indices, ijk, are used although, in practice it is preferred to map the indexing of the control points to a univariate index; any of several well-known transforms could be used. The local coordinate system has an origin, O, and three basis vectors, X, Y, and Z. The location of the ijk$^{th}$ control point $P_{ijk}$ in the lattice for the undeformed model is O+$\frac{i}{l}$X+$\frac{j}{m}$Y+$\frac{k}{n}$Z for $0 \leq i \leq l$, $0 \leq j \leq m$, $0 \leq k \leq n$,. A set of transformations is established as simple translations T: $P'_{ijk} - P_{ijk}$. A set of strength fields is unity for all model points, and a set of weighting fields is generated using Bernstein polynomials:

$$B_i^n(t) = \frac{n!}{i!(n-i)!} t^i (1-t)^{n-i},$$

i=1, . . . , n. In summary:

$$F_{ijk} = \{P_{ijk}, P'_{ijk}\} \quad (7a)$$

$$T_{ijk} = P'_{ijk} - P_{ijk} \quad (7b)$$

$$S_{ijk} = 1 \forall u \quad (7c)$$

$$W_{ijk} = B_j^l(M_x(u)) B_j^m(M_y(u)) B_k^n(M_z(u)) \quad (7d)$$

where $M_x(u)$, $M_y(u)$, and $M_z(u)$ are the coordinates of M(u) in the local coordinate system (O, X, Y, Z). The set of scaled transformations is derived using the Displacement Method.

Figure 9A:
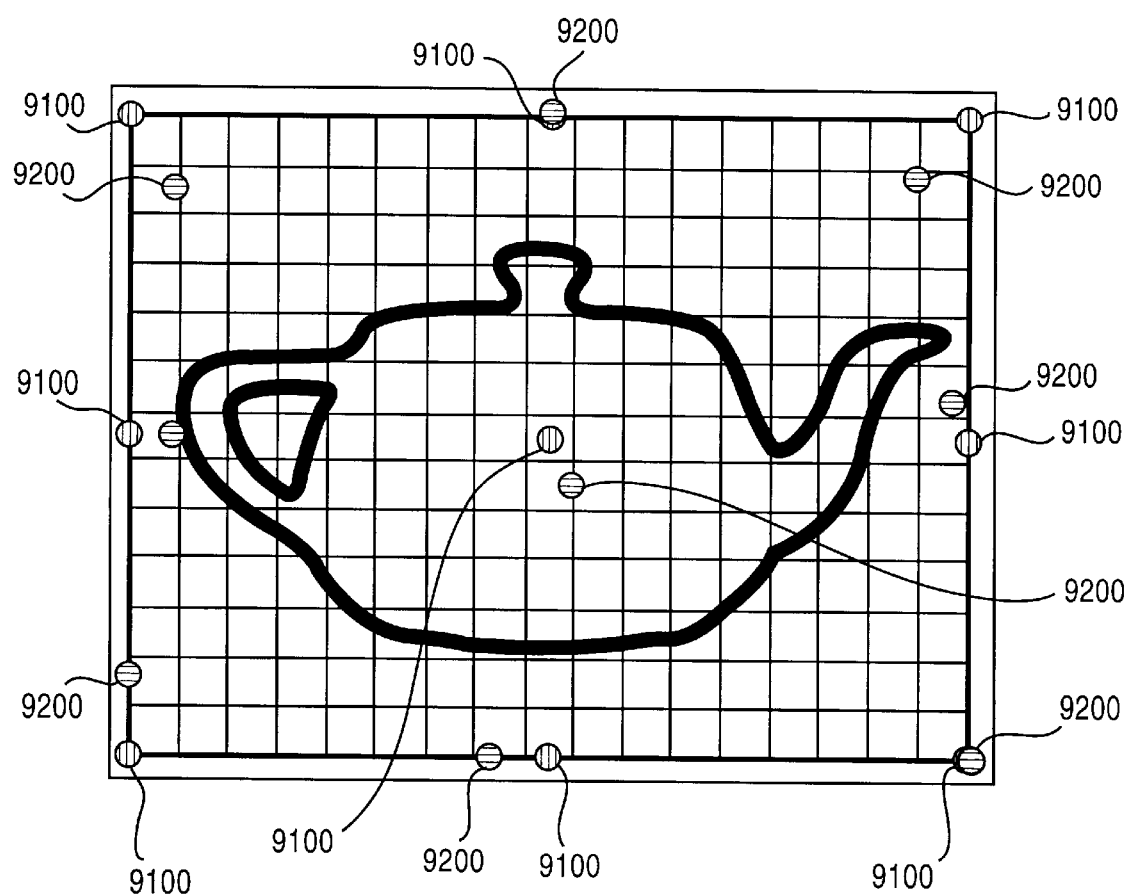
FIG. 9A depicts an undeformed model with a lattice of source and target point features.
Figure 9B:
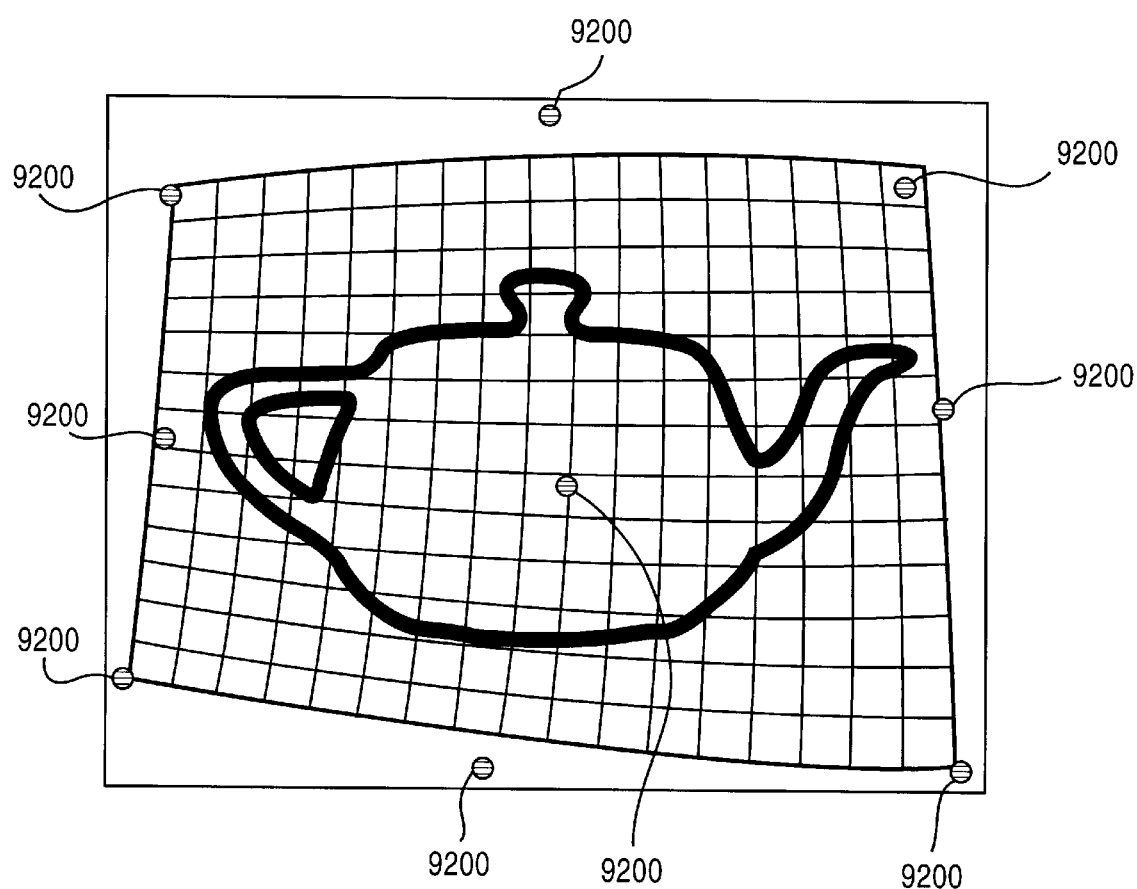
FIG. 9B depicts a deformed model for the undeformed model of FIG. 9A.

Illustrative results of such a deformation can seen with reference to FIG. 9A and FIG. 9B. FIG. 9A illustrates an undeformed model for deformation with a FFD and also depicts a set of source features 9100 and a set of target features 9200. Each of the set of source features 9100 are transformed to the nearest of the set of target features 9200. FIG. 9B shows the deformed model.

One of skill in the art having the benefit of this disclosure will quickly appreciate applicability of the above-described embodiment to numerous variations of conventional FFD techniques. For instance, trivariate b-spline polynomials could be used in place of Bernestein polynomials for the set of weighting fields to obtain local control; layered applications of successively higher resolution lattices could be used; lattices of arbitrary topology could be used. Further, a direct manipulation interface could receive user input and a solution for the corresponding FFD specification could be obtained therefrom. See Ron MacCracken and Kenneth Joy, Free-From deformation with lattices of arbitrary topology, *SIGGRAPH 96 Conference Proceedings*, Annual Conference Series, pages 181–188, ACM SIGGRAPH, Addison-Weseley, August 1996. In this latter instance, feature specifications are defined by the direct-manipulation constraints derived from user input. These may be mapped to lattice control point transformations for the FFD.

Figure 10A:
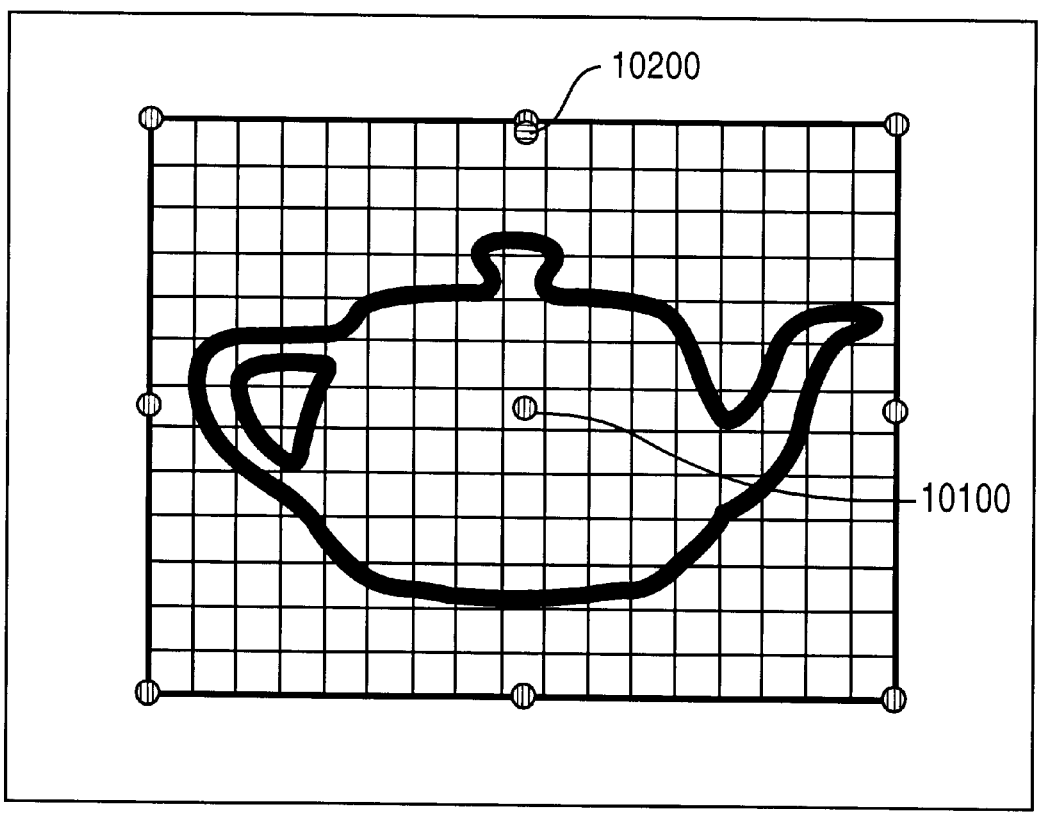
FIG. 10A depicts an undeformed model for deformation with a conventional free-form deformation technique.
Figure 10B:
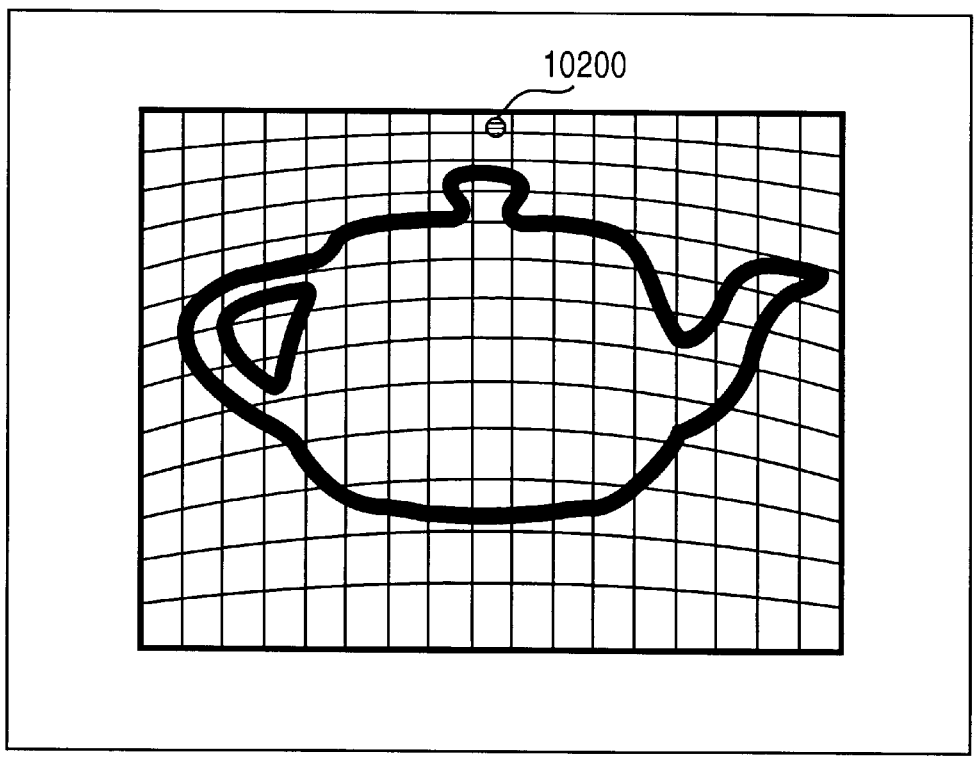
FIG. 10B depicts a deformed model for the undeformed model of FIG. 10A.

While results conventionally associated with FFD may be obtained with the above-described illustrative embodiment, some variations can also obtain results that are unobtainable with conventional techniques. For instance, given a fixed-density control lattice, it is not possible with conventional FFD techniques to conveniently create a deformation with a rotational effect centered around a single control point. When using conventional FFD techniques, to obtain the desired result, a higher resolution control lattice must be used at the expense of increased computational cost and/or user intervention. Referring to FIG. 10A, a source feature 10100 and a target feature 10200 are shown. Warping the source feature 10100 to the target feature 10200 creates the deformed model of FIG. 10B. However, conventional FFD techniques do not provide a means for producing a local rotation, for instance centered at the source feature 10100.

A solution to this problem can be provided with our techniques by substituting more complex features for the simple point features of conventional FFD techniques. In one illustrative variation, oriented points are used. In this variant, the warp designer manipulates the deformation by adjusting a lattice of local coordinate frames each with an origin and basis vectors. The warp is altered so that the feature specifications include source and target coordinate frames in lieu of source and target points. The transformations now take source coordinate frames to target coordinate frames. See, e.g., dicussion below in connection with Equation 8b which may be used).

Figure 11A:
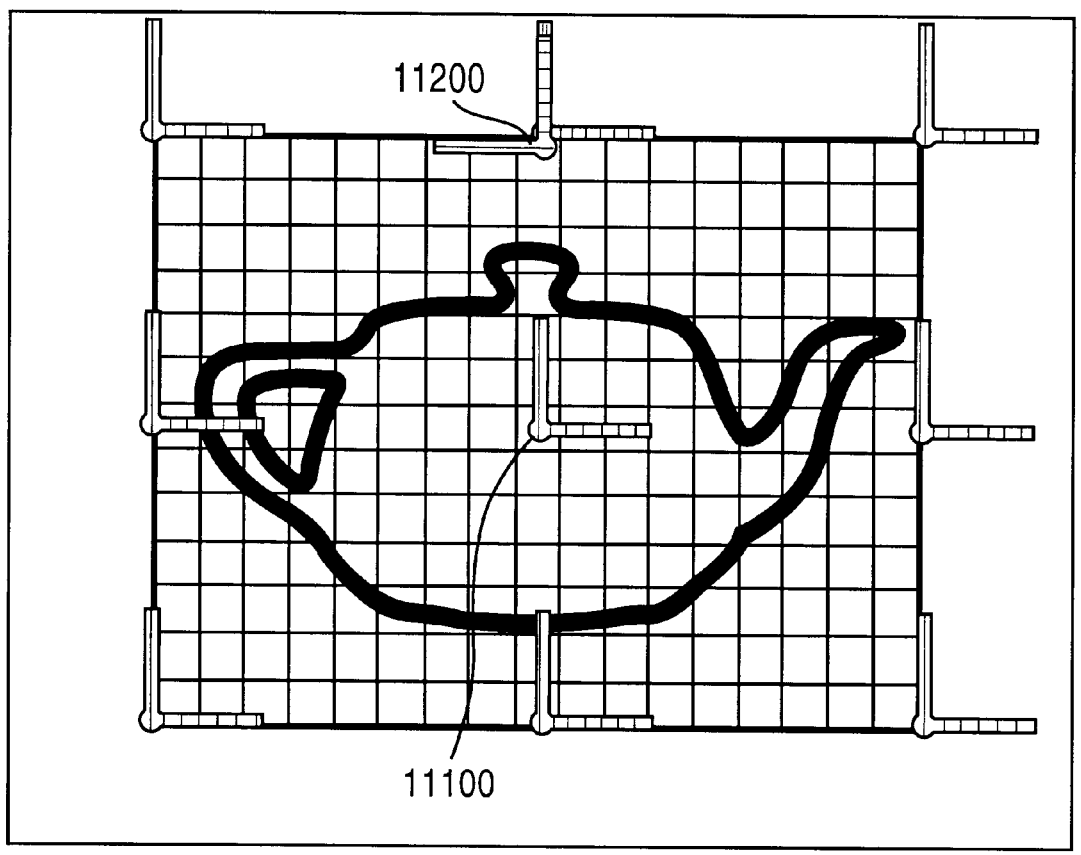
FIG. 11A depicts an undeformed model in a variant of Free-form Deformation using coordinate frames to produce a local rotational effect.
Figure 11B:
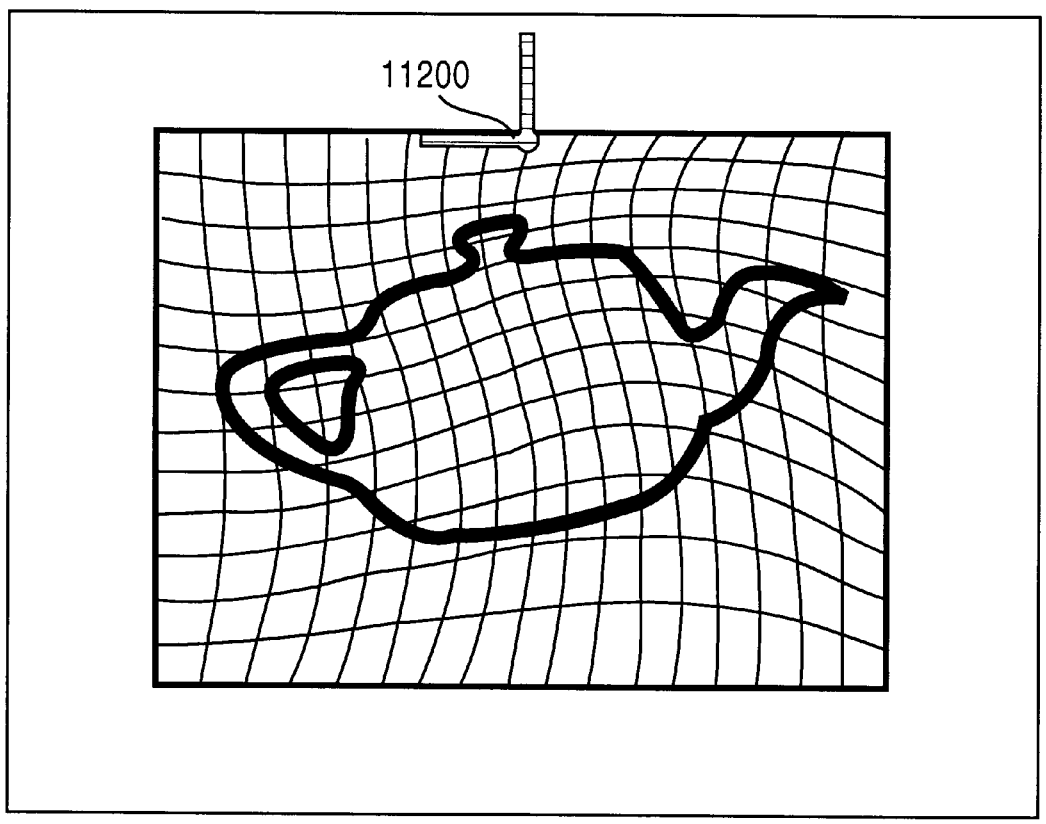
FIG. 11B depicts a deformed model for the undeformed model of FIG. 11A.

In accordance with this variant, use of oriented points to obtain a local rotation is shown in FIG. 11A and FIG. 11B. FIG. 11A illustrates an oriented point source features 11100 and an oriented point target features 11200. FIG. 11B shows only the set of oriented point target features 11200 in the deformed model. Comparison of FIG. 11A and FIG. 11B illustrates a rotational effect from rotating the central frame of the lattice, the set of oriented point source features 11100.

Another frequently-desired warping result is the image warp. In one existing technique, that of Beier and Neely in *Feature-based image metamorphosis*, Computer Graphics (*SIGGRAPH '92 Proceedings*), vol. 26, pages 35–42 (July 1992), a 2-D image space is used for a cross-dissolve. Directed line segments are selected as features and the image warp is used to align the two images at the ends of the cross-dissolve.

A similar warping result may be obtained with the present new techniques and these techniques provide additional warping capability not found in conventional image warp techniques. In one illustrative embodiment, the warp acts as an inverse mapping—operating on pixels of the deformed model. U is defined as the pixel coordinates of the destination image (the undeformed model) and M(u)=u. With inverse mapping, the feature specifications are source and target line segments in the destination and source images, respectively. Each of a set of feature specifications is described as a pair of line segments, $L_i$ and $L'_i$ having endpoints $(P_i, Q_i)$ and $(P'_i, Q'_i)$ along with scalar parameters $a_i$, $b_i$, $p_i$ (described below). Each of a set of transformations is a map from $f_i$ to $f'_i$ where f is a 2-D coordinate frame with origin $P_i$, and x-basis vector equal to $Q_i-P_i$ and a y-basis vector equal to the normalized vector orthogonal to $Q_i-P_i$ and similarly for f'. To ensure that a rotation or scale of a single line segment produces a corresponding rotation or scale of the image, each of a set of strength fields is set to unity. Each of a set of weighting fields are designed to fall-off with distance, and to give longer line segments greater influence. In summary:

$$F_i = \{L_i, L'_i, a_i, b_i, p_i\} \tag{8a}$$

$$T_i = \text{map from } f_i \to f'_i \tag{8b}$$

$$S_i(u) = 1 \,\forall\, u \tag{8c}$$

$$W_i(u) = \left(\frac{length^{p_i}}{a_i + dist}\right)^{b_i} \tag{8d}$$

where length is the length of the line segment $L_i$ and dist is the minimum distance from the pixel coordinate M(u) to the line $L_i$.

Figure 12A:
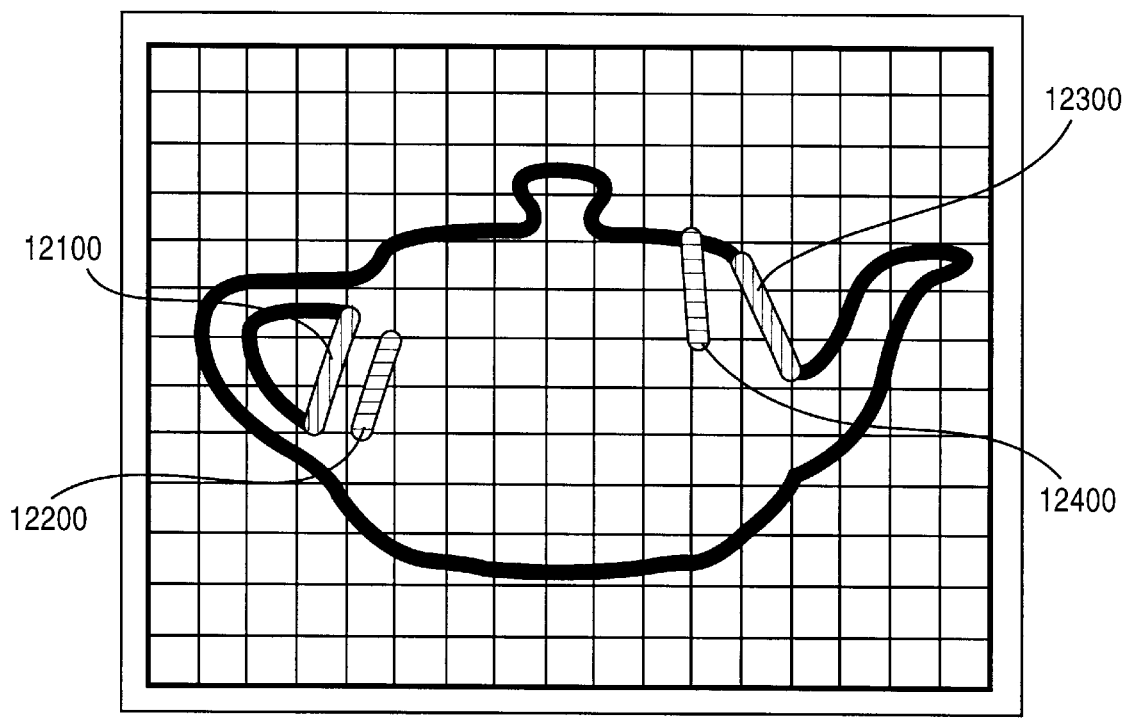
FIG. 12A depicts an undeformed model with line segment source and target features in a warp producing an image warp result.
Figure 12B:
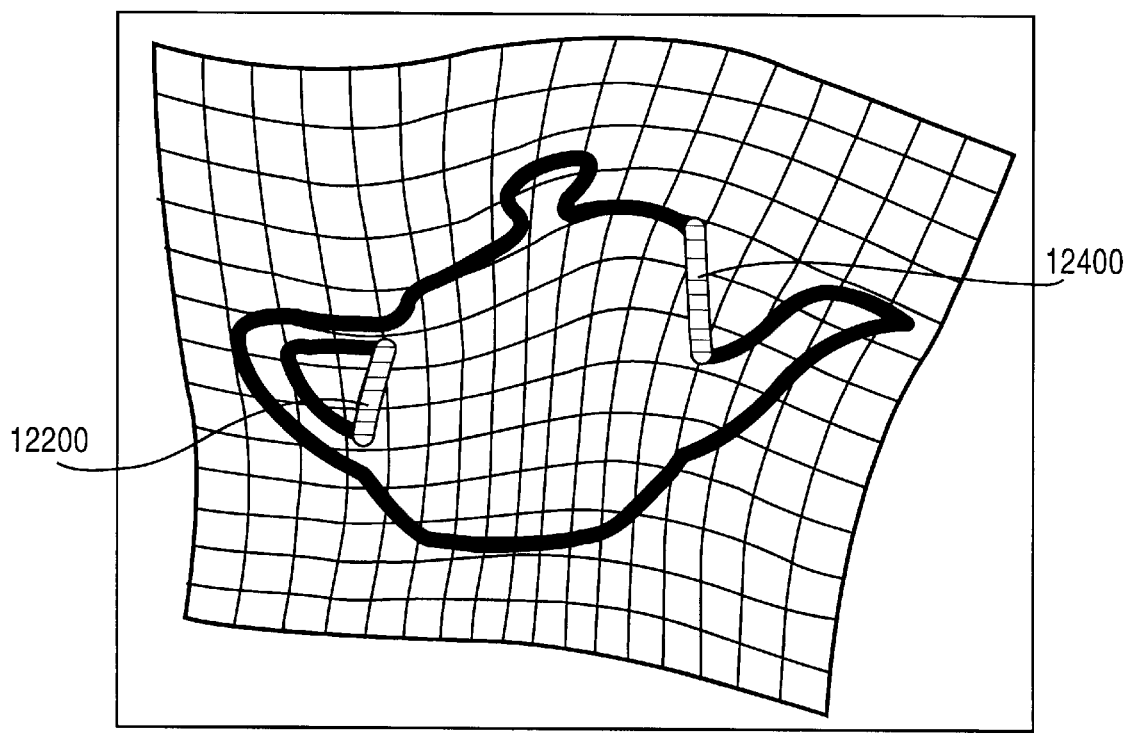
FIG. 12B depicts a deformed model for the undeformed model of FIG. 12A.

FIG. 12A depicts an undeformed model for an image warp with line-segment features. The deformation maps a first source feature 12100 to a first target feature 12200 and a second source feature 12300 to a second target feature 12400. FIG. 12B shows the deformed model.

Conventional 2-D image warping techniques have been extended to the 3-D volume domain. See Apostolos Lerios et al., Feature-Based volume metamorphosis, in *SIGGRAPH 95 Conference Proceedings*, pages 449–456 ACM SIGGRAPH, Addison-Weseley, August 1995. In a variation of the embodiment described above, a 3-D volume is warped rather than a 2-D planar image. In this instance, the features may be points, line segments, rectangles, and/or boxes. These become feature specifications that constrain, zero, one, two, or three of the basis vectors of the source and destination coordinate frames in 3-D. Unconstrained basis vectors are chosen so as not to deform the model in their direction. See Beier and Neely.

While results conventionally associated with image warping may be obtained with the above-described illustrative embodiment, versions of the invention can also obtain results that are unobtainable with conventional techniques. For instance, when two line-segment features "squeeze" the image, the resulting deformed image can exhibit spatial buckling artifacts where the 2-D plane folds back upon itself.

This buckling behavior may be understood as a failure in conventional techniques to consider global deformation effects. For instance, Beier & Neely assume that the transformation for a line-segment feature should not deform the image in the direction perpendicular to the line-segment. For a single line-segment, this assumption is reasonable and results in the expected image transformation. However, for multiple line-segments, this assumption can lead to nearby transformations that conflict dramatically enough to cause buckling artifacts such as those shown in FIG. 13B. Taking global deformation effects into consideration can prevent these artifacts.

A principle applicable for solving this problem is for the basis vector along the feature to be transformed in accordance with the feature specification while the other basis vector remains unconstrained. Correa et al., Texture mapping for cell animation, *SIGGRAPH 98 Conference Proceedings*, p. 435–446, Addison-Weseley July, 1998, describe a technique developed in the domain of 3-D curve-based warping. With this technique, instead of selecting a null transformation to apply to the unconstrained basis vector, they compute a target vector based on the effect of other transformations in the warp.

An illustrative variant of the invention uses similar approach is used to compute the target value of the vector perpendicular to each line segment in the source coordinate frame. In this instance, feature specifications correspond to transformations as follows. Each of the set of feature specifications is as described above:

$$F_i = \{L_i, L'_i, a_i, b_i, p_i\} \tag{8a}$$

Where $L_i$ and $L'_i$ are directed line segments defined by their endpoints as described above. To compute the set of transformations T=$\{T_i\}$, we let the transformation for $F_i$ be the transformation that maps 2-D source coordinate frames:

$$T_i = \text{map from } f_i \to f'_i \tag{8b}$$

f has origin $P_i$, x-basis vector $Q_i-P_i$, and y-basis equal to the normalized vector $N_i$ orthogonal to $L_i$. However, f' has origin $P'_i$, x-basis $Q'_i-P'_i$ and y-basis given by:

$$\sum_j [\hat{W}_{ij}(R_j\langle N_i \rangle)] \tag{8e}$$

where $W_{ij} = \left(\dfrac{length^{p_j}}{(a_j + dist)(a_j + (Q_i - P_i) \cdot (Q_j - P_j))}\right)^{b_j}$ and $\hat{W}_{ij} = \dfrac{W_{ij}}{\sum_{k=1}^{n} W_{ik}}$ where dist is the minimum distance between the line segments $L_i$ and $L'_i$, and $R_j$ is the rotation that takes $L_j$ to $L'_j$. This corrects the transformation by setting the unconstrained target vector to be a weighted average of the target vectors implied by all line segments. The second term in the denominator of $w_{ij}$ gives preference to those line segments that are initially perpendicular to $L_i$ as those line segments whose direction is closest to $N_i$. The strength and weighting fields are preferably in accordance with Equations 8c and 8d, respectively.

Figure 13B:
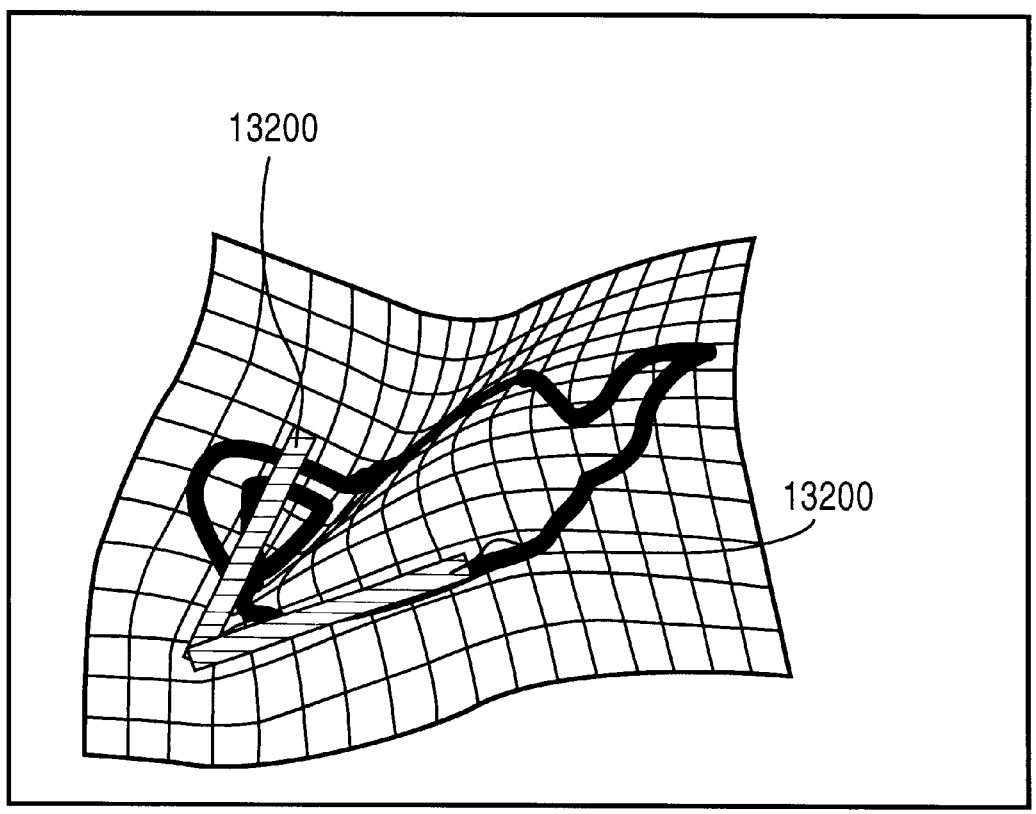
FIG. 13B depicts a deformed model for the undeformed model of FIG. 13A showing spatial buckling caused by the competing features.
Figure 13C:
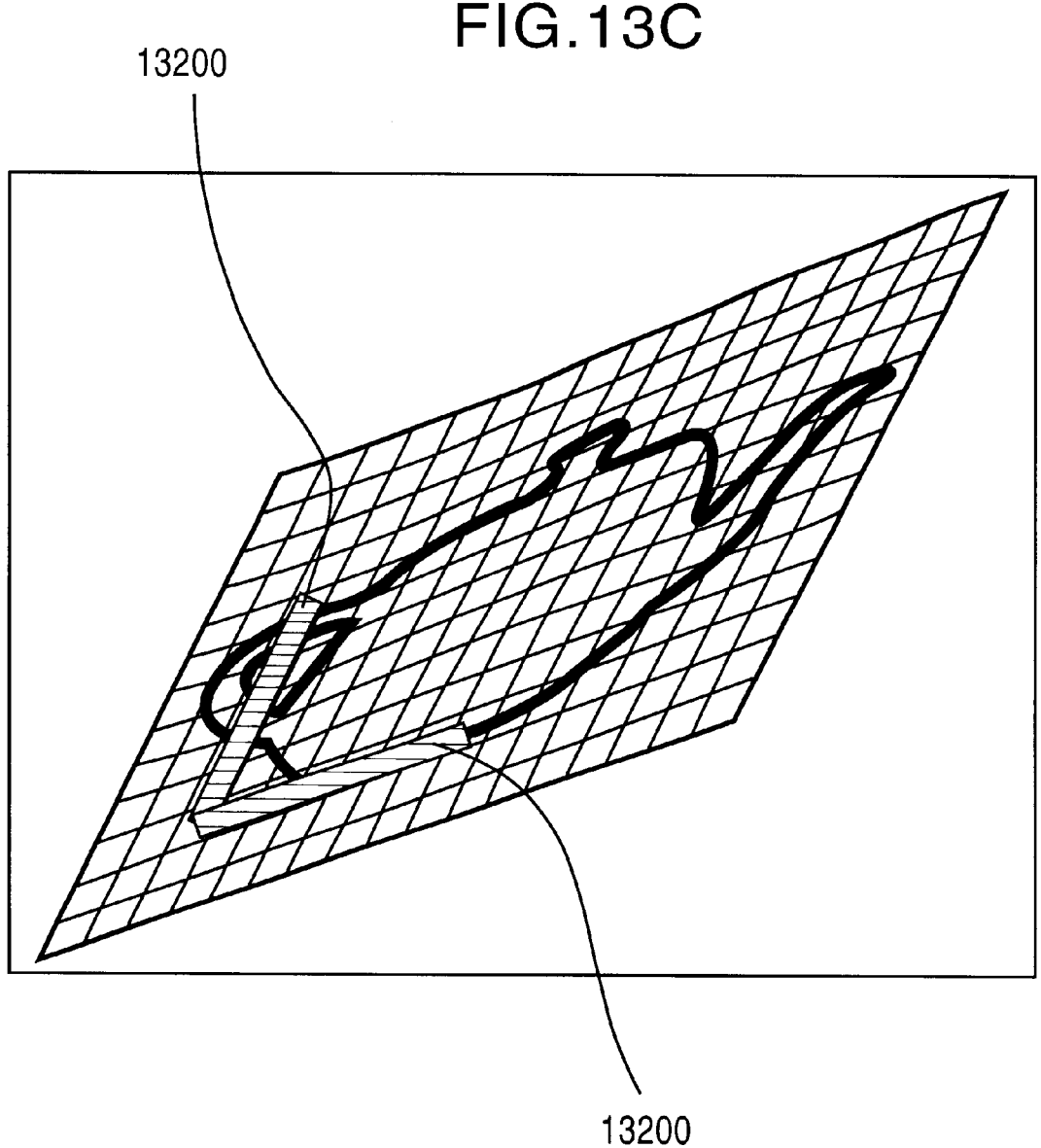
FIG. 13C depicts a deformed model for the undeformed model of FIG. 13A where global effects have been considered to eliminate spatial buckling of FIG. 13B

FIG. 13A and FIG. 13C depict a result obtained with this embodiment. FIG. 13A shows a first source feature 13100 and a first target feature 13200. The deformation of the first source feature 13100 to the first target feature 13200 is illustrative of a shear, however the transformation "squeezes" the model between the source feature and the target feature coordinate frames. FIG. 13B shows the results with conventional Beier and Neely image warping techniques: the competing features result in potentially undesirable spatial buckling artifacts. FIG. 13C shows a model deformed in accordance with this illustrative embodiment. It can be appreciated that the deformed model of FIG. 13C considers global effects to compute the target value of the vector perpendicular to each line figure in the source coordinate frame. The result is the expected shear shown in FIG. 13C.

Other desirable deformations may be defined by geometric parameters. In one variation of the present invention, deformations are so defined and vary in a geometrically meaningful way including, for instance, along an axis. In this variation, for each model point, a single transformation is selected and the deformation computed by applying this transformation to the model point. One skilled in the art will readily appreciate the flexibility and power the present invention adds to previous geometric deformation techniques. For instance, Barr, *Global and local deformations of solid primitives*, Computer Graphics (*SIGGRAPH '84 Proceedings*) vol. 18, pages 21–30, describes a family of parameter-based warps now known as "Barr deformations". While Barr's work is significant, a warp designer may obtain additional flexibility with the present invention. Barr applies each selected transformation to its corresponding model point with full effect. By contrast, features of the present invention allows the warp designer to modulate the effect across a model through coordinated selection of strength fields. Further, Barr selects only one transformation for each model point; this does not allow for the blending of multiple transformations. By contrast, features of the present invention provides for such blending. Still further, the present invention allows the warp designer to conveniently both modulate and blend transformations of a model. By lifting these restrictions found in prior work through the combination including strength and weighting fields, the present invention provides a more powerful and flexible tool for warp designers.

A taper can illustrate this variation; one skilled in the art having the benefit of this disclosure will appreciate may others. The parameter set for a taper deformation contains a single user-defined scalar-valued function. Manipulation of this function controls the deformation. The function has an intuitive geometric interpretation: its input is a value along, e.g., the z-axis, and its output is the amount by which the deformation will scale the model in the direction orthogonal to the z-axis. Denoting P the parameter set, notationally this variation may be represented as:

$$P = \{f(t)\}$$
$$T_i(v) = \text{scale by } (f(v), f(v), 1)$$
$$S_i(u) = 1 \forall u$$
$$W_i(v, u) = \begin{cases} 1 & \text{if } (M(u) - O) \cdot \vec{z} = v \\ 0 & \text{otherwise} \end{cases}$$

Methods for scaling the effect of the transformation include both the Displacement method and the Composition method. Other desirable warping operations including, for instance, twisting, and bending of graphical objects (and combinations thereof) could also be used.

Yet another desirable warping capability is the manipulation of surface geometry of a 3-D object for modeling and animation. One conventional technique, known as "Wires" is described by Singh and Fiume, *Wires: A Geometric Deformation Technique, SIGGRAPH '98 Conference Proceedings*, Annual Conference Series, pg. 405–414. ACM SIGGRAPH, Addison-Weselely, July 1998. A similar warping result may be obtained with the present new techniques, and these techniques provide additional warping capability not found in with the "Wires" technique. In this instance, with technique, an undeformed model is represented as a set of control points that define the surface of an object. That is, U is the set of indices $\{1, 2, \ldots, l\}$, where l is the number of control points, and M(u) is the control point with index u.

The features for the warp are source and destination curves, and their related scalar parameters. A feature specification represents each wire:

$$F_i = \{C_i, C'_i, f_i, r_i, x_i, m_i\}$$

where $C_i$ is the source or "reference" curve, $C'_i$ is the target or "wire" curve, $f_i$ is a falloff function and $r_i$, $x_i$, and $m_i$ are user-defined parameters that will be described below. Preferably the falloff function takes $R^+ \to [0,1]$, is monotonically decreasing and at least $C^1$ continuous, with $f_i(0)=1$, $f_i(t)=0 \forall t \geq 1$, and $f'(1)=0$. The wire and reference curves are assumed to be parameterized on the domain $V=[0,1]$ without loss of generality.

A feature specification, $F_i$, is mapped to a transformation, $T_i(v)$ also parameterized on V. This mapping uses the Composition Method, more particularly, $$T_i(v) = T \circ R \circ S \tag{9b}$$

where:

$$T = C'_i(v) - C_i(v)$$

R is the smallest rotation that takes the vector $$\frac{dC_i(v)}{dv} \text{ to } \frac{dC'_i(v)}{dv}$$

S is a uniform scale of magnitude $s_i$ centered at the point $C_i(v)$ and $r_i$ represents a rate of decrease on the strength field. A suitable strength field for a given feature specification conveniently decreases from 1 to 0 as the distance from M(u) to $C_i(v)$ varies from 0 to $r_i$. A preferred version is:

$$S_i(v, u) = f_i\left(\frac{\|M(u) - C_i(v)\|}{r_i}\right) \tag{9c}$$

A bounding region for the strength field may also be defined by adding an additional feature. Letting $D_i(t)$ be a region-bounding or "domain" curve for a wire, i, $D_i(t)$ is added to the feature specification along with a user-selected scalar parameter, $\delta_i$: $F_i = \{C_i, C'_i, f_i, r_i, m_i, s_i\}$. Letting $D_i^u$ be the point on $D_i$ nearest M(u), then the strength field for $F_i$ is:

$$S_i(v, u) = \begin{cases} f_i\left(\dfrac{\|M(u) - C_i(v)\|}{\|D_i^{M(u)} - C_i(v)\|}\right) & \text{if } \alpha \geq \delta_i \\ f_i\left(\dfrac{\|M(u) - C_i(v)\|}{\text{Interp}(\alpha)}\right) & \text{if } 0 < \alpha < \delta_i \\ f_i\left(\dfrac{\|M(u) - C_i(v)\|}{r_i}\right) & \text{if } \alpha \leq 0 \end{cases} \tag{9d}$$

where $\alpha$ is $(D_i^{M(u)} - C_i(v)) \cdot (M(u) - C_i(v))$ and Interp varies from $r_i$ to $\|D_i^{M(u)} - C_i(v)\|$ as $\alpha$ varies from 0 to $\delta$.

The set of weighting fields corresponding to the set of feature specifications is selected to warp each model point, M(u) based on the parameterized transformation value at the nearest location on the reference curve; if points are equidistant, preferably the one with the smaller parameter value is selected. For feature specification, $F_i$, the weighting field depends on how much the parameterized transformation $T_i(v)$ displaces the point $M(u)$:

$$W_i(v, u) = \begin{cases} 0 & \text{if } \exists c < v \text{ s.t. } \|M(u) - C_i(c)\| < \|M(u) - C_i(v)\| \\ \|\langle S_i(v, u, M) \cdot T_i(v)\rangle\langle M(u)\rangle - M(u)\|^{m_i} & \text{otherwise} \end{cases} \quad (9e)$$

where $m_i$ determines the relative effect of wires that cause large versus small displacement.

In some instances, the warp designer desires that a curve be marked as an "anchor." To accommodate this aspect, a Boolean parameter and a user-specified scalar parameter, $k_i$ are added to $F_i$. When a curve is an anchor curve, non-zero values of $W_i(v,u)$ are suitably provided by:

$$W_i(v, u) = \left( f_i \left( \frac{\|M(u) - C_i(v)\|}{r_i} \right) \right)^{k_i} \quad (9f)$$

The embodiments just described used the Composition Method for determining the set of scaled transformations. In other embodiments, the Displacement Method could be used. If the Displacement Method were used, results similar to those described in Lazarus et al., Axial deformations: an intuitive deformation technique, Computer-Aided Design, 26(8):607–613, August 1994, could be obtained. In addition, the present technique can be used to carry on curve based warps for cel animation and produce results similar to those described, for instance in Correa et al.

Still further, in certain cases "Wires"—type deformations can result in buckling and tearing artifacts. This occurs when a given wire's reference curve is shaped so that it is equidistant from a set of points in the model (the "Medial Set") and different parts of the curve specify competing deformations of the Medial Set. Such artifacts are easily understood and remedied with some versions of the invention.

Recall, above, that weighting fields for wires were discontinuous, containing singularities to ensure that only the nearest point on a curve contributes to the deformation of a model point (see Equation 9e). The resulting warp, which is a function of these fields, will also contain discontinuities. Removing discontinuities in the weighting fields, successfully removes the discontinuities in the warp itself.

In one version of the invention, in order to remove such discontinuities, the weighting fields for an ordinary wire are taken as:

$$W_i(v,u) = \|T_i(v) < M(u), S_i(v,u) > -M(u)\|^{m_i} \quad (9g)$$

and if the curve is tagged as an "anchor" the weighting field is taken as:

$$W_i(v, u) = \left( f_i \left( \frac{\|M(u) - C_i(v)\|}{r_i} \right) \right)^{k_i} \quad (9h)$$

Figure 14A:
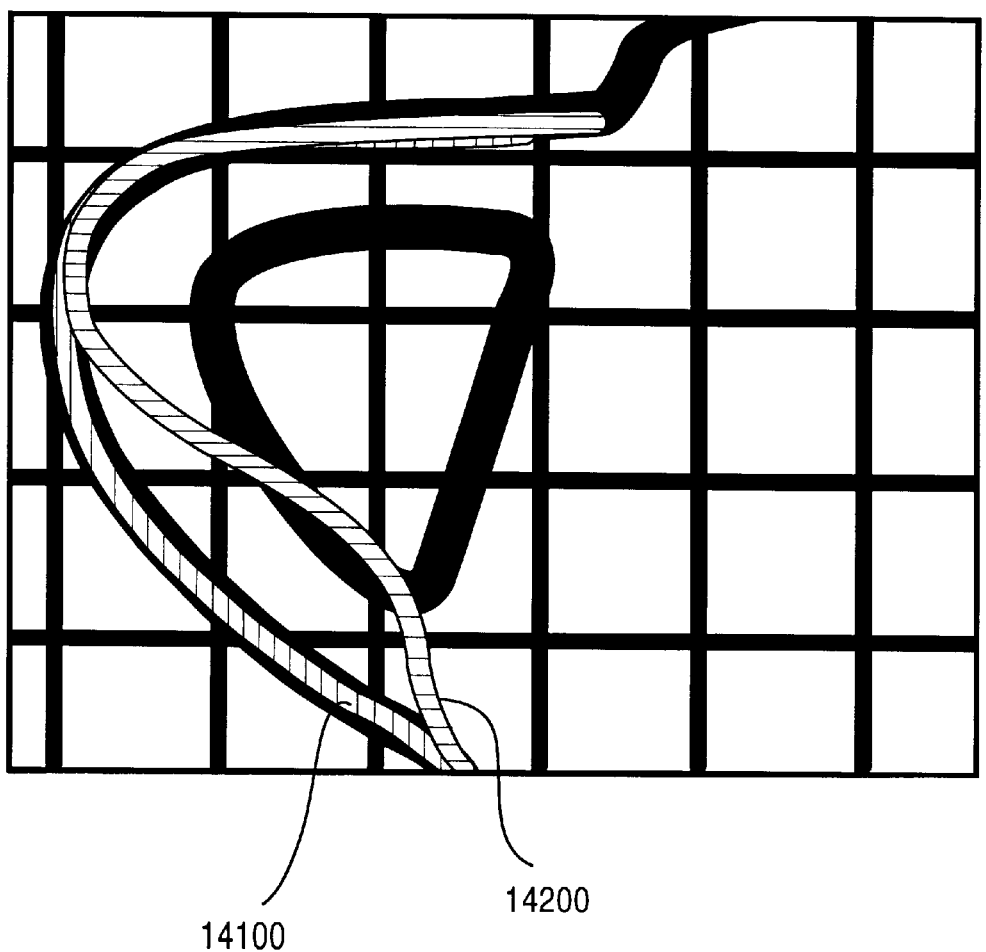
FIG. 14A depicts an undeformed model with curve source and target features of a wires-type deformation.
Figure 14B:
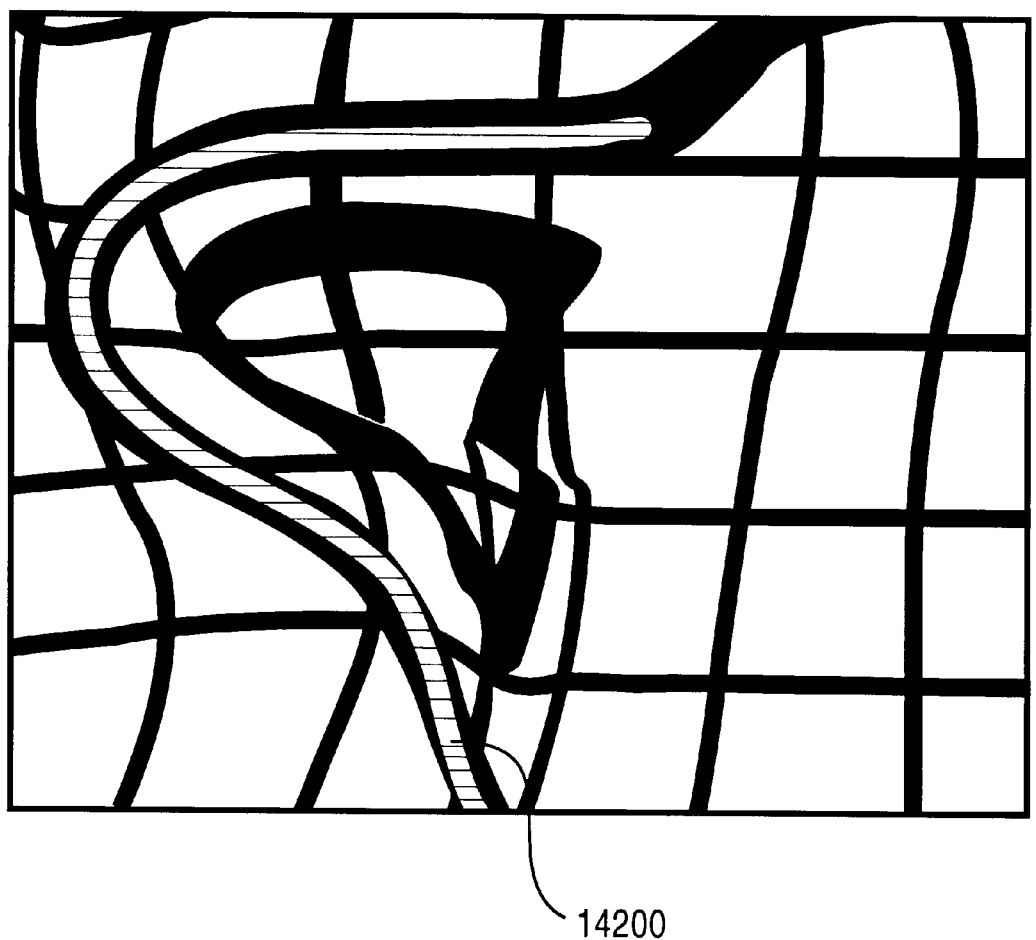
FIG. 14B depicts a deformed model for the undeformed model of FIG. 14A showing spatial buckling artifacts encountered using conventional methods to achieve a wires-type deformation.

The parameters $k_i$ and $m_i$ are as previously described. The advantages obtainable with such an embodiment of the present invention can be understood with reference to FIG. 14A–FIG. 14C. FIG. 14A. depicts a source feature 14100 and a target feature 14200 in an undeformed model. A Medial Set exists a set of points in the undeformed model equidistant from the upper and lower portions of the target feature 14200. With conventional wires-type deformation techniques, singularities in the weighting fields ensure that only the nearest point on the curve contributes to deformation of the model. As the Medial Set falls along a locus with non-unique nearest points, the deformation of the lower portion of the target feature 14200 creates a spatial buckling artifact in the deformed model shown in FIG. 14B.

Figure 14C:
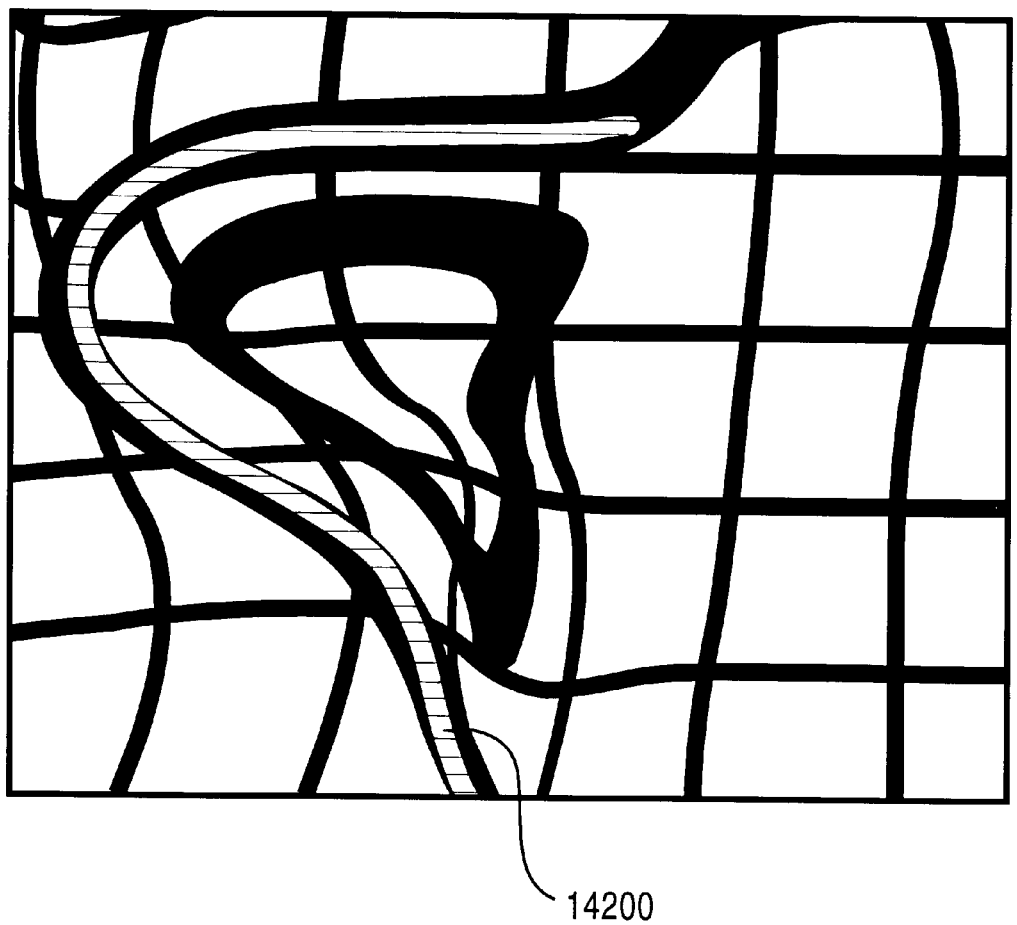
FIG. 14C depicts a deformed model for the undeformed model of FIG. 14A lacking spatial buckling artifacts obtainable in accordance with an illustrative embodiment.

Using the weighting fields in Equation 9g above, the discontinuities can be removed. The method now approximates an integral taken along the curve, rather than considering only a single sample on the curve. This incurs an added computational cost: every transformation sample along each wire curve now contributes to the deformation of each model point. Thus, rather than sampling the curve exactly once for every model point as in the original method, one conveniently integrates along the curve or, in preferred embodiments, approximate the integral by sampling. The deformed model in FIG. 14C is obtained with uniform sampling along the curve. However, the deformed model in FIG. 14C illustrates how the warp of this embodiment, eliminates buckling artifacts caused by the discontinuities present with conventional wires-type warps.

Another illustrative aspect of the invention provides a mesh warp. In this instance, a fine surface model is deformable through the manipulation of a coarse surface mesh.

Letting $M(u)$ be a set of control vertices that define the fine surface model, indexed by $u \in U = \{1, \ldots, 1\}$. A set of feature specifications is taken as vertices of a coarse deformation mesh assumed to be in close proximity to the surface. Each of the set of feature specifications encodes a vertex point's position and its incident edges. That is, for vertex i in the mesh, a feature specification is:

$$F_i = \{P_i, E_i, P'_i, E'_i\} \quad (10a)$$

where $P_i$ and $P'_i$ are the source and target position of vertex i and where $E_i$ and $E'_i$ are the sets of edges incident on vertex i in the source and target meshes, respectively. Each edge $E_{ij} \in E_i$ is represented as the vector from $P_i$ to its adjacent vertex, and likewise for $E'_i$. $E_i$ typically has the same number of elements as $E'_i$, i.e. the target mesh has the same topology as the source mesh.

Feature specifications have transformation compositions:

$$T_i = A \circ T \quad (10b)$$

where $T = P'_i - P_i$ and A maps the source edge set to $E_i$ to the target edge set $E'_i$. Typically, more than three edges are incident on a vertex, i, so A cannot be computed to map $E_i$ to $E'_i$ exactly. Preferably, A is then chosen as a 3×3 matrix that best maps $E_i$ to $E'_i$ in the least squares sense. In this instance A may be selected as $A = E^+E'$ where E is an m×3 matrix having the vectors of $E_i$ as its rows, and E' an m×3 matrix having the vectors of $E'_i$ as it rows and $E^+$ is the pseudoinverse of E. Preferably the Displacement Method is used to scale the set of transformations.

In this instance, it is desirable that a rigid transformation applied to the entire mesh to result in the same rigid transformation of the surface. One way of achieving this is to for a strength field to be set to unity:

$$S_i(u) = 1 \forall i, u \quad (10c)$$

Here, it is also desirable that a weighting field should be relatively large near the source feature, $P_i$. In addition, the weighting field is preferably zero at he end of each edge $E_{ij}$; otherwise the transformation, $T_i$ will compete with another transformation $T_j$ created by the other vertex incident on $E_{ij}$. One suitable formula for the weighting fields is:

$$W_i(u) = f_{\alpha\beta}\left(\frac{\|M(u) - P_i\|}{\|E_{im}\|}\right)\left(\Pi_j f_{\gamma\mu}\left(\frac{(M(u) - P_i) \cdot E_{ij}}{E_{ij} \cdot E_{ij}}\right)\right) \quad (10d)$$

where $f_{ab}(t)$ is a function that is 1 for $t \leq a$, 0 for $t \geq b$, and is an interpolating cubic in between. $E_{im}$ denotes the vector in $E_i$ of maximum length, and $\alpha$, $\beta$, $\gamma$, and $\mu$ are scalar parameters that control the size of the maximum and non-zero regions of $W_i(u)$, respectively. This specification of the weighting fields satisfies the desired properties and yields weighting fields that fill fuzzy polyhedral zones within the mesh. Steps of a method for manipulating a coarse mesh in order to deform a fine surface model can be better understood with reference to the following illustrative applications.

In cloth dynamics simulation, unwanted object intersections sometimes occur due to limitations and simplifications in the simulating technique. Frequently, rather than revisiting the simulation, it would be desirable to perform a slight ad hoc deformation on the simulated cloth to eliminate the intersection. Using our mesh warp, a low resolution mesh may be created from vertices of the cloth, the low resolution mesh may be manipulated to adjust the complex cloth mesh, for instance by manipulation of the vertices, and the corrected simulated cloth created from the adjusted low resolution mesh.

Figure 15A:
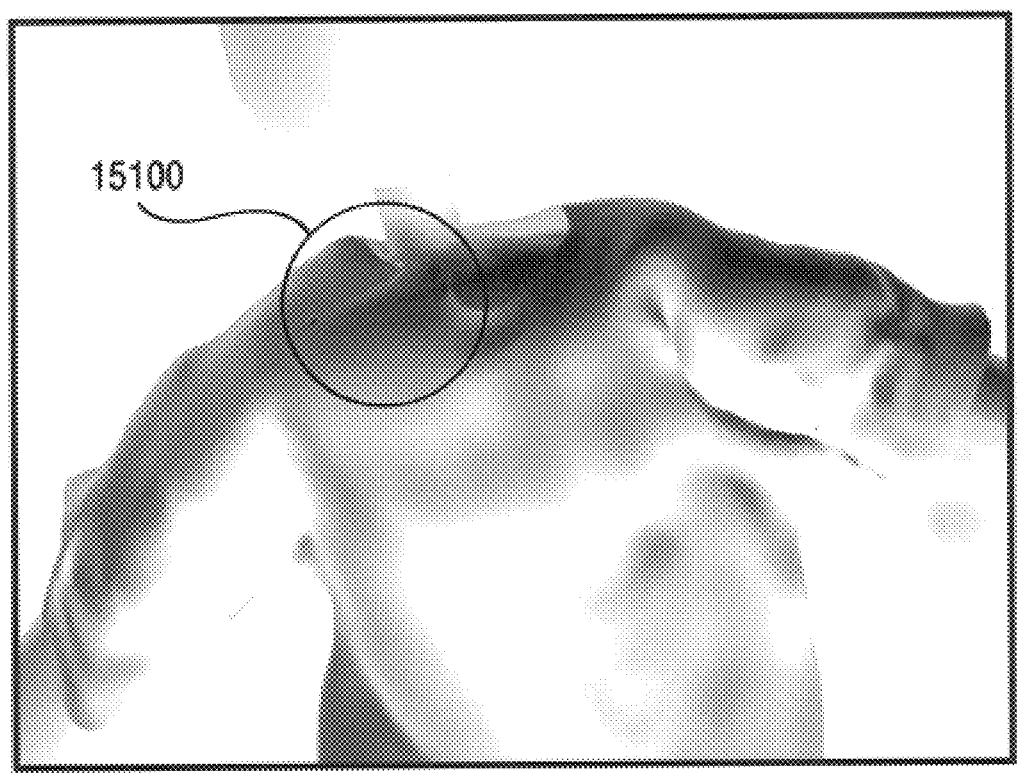
FIG. 15A depicts an undeformed model of simulated cloth and an unwanted object intersection amenable to correction with an illustrative embodiment.
Figure 15B:
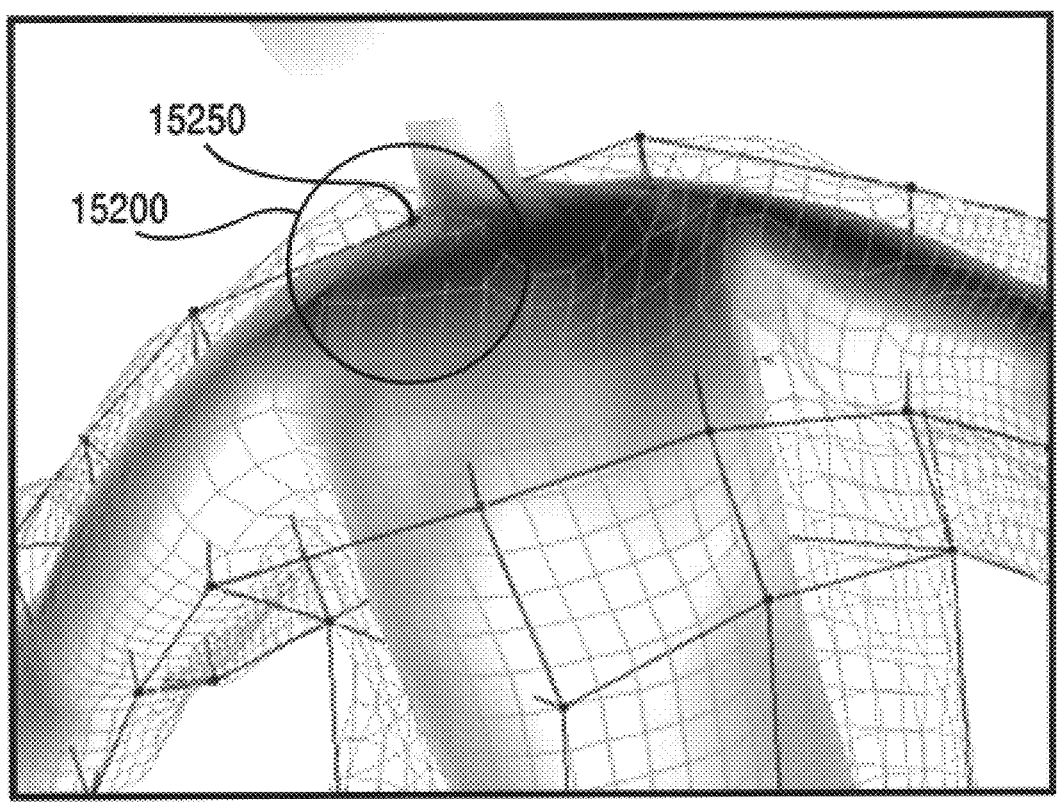
FIG. 15B depicts a low resolution mesh imposed on the simulated cloth of of FIG. 15A.
Figure 15C:
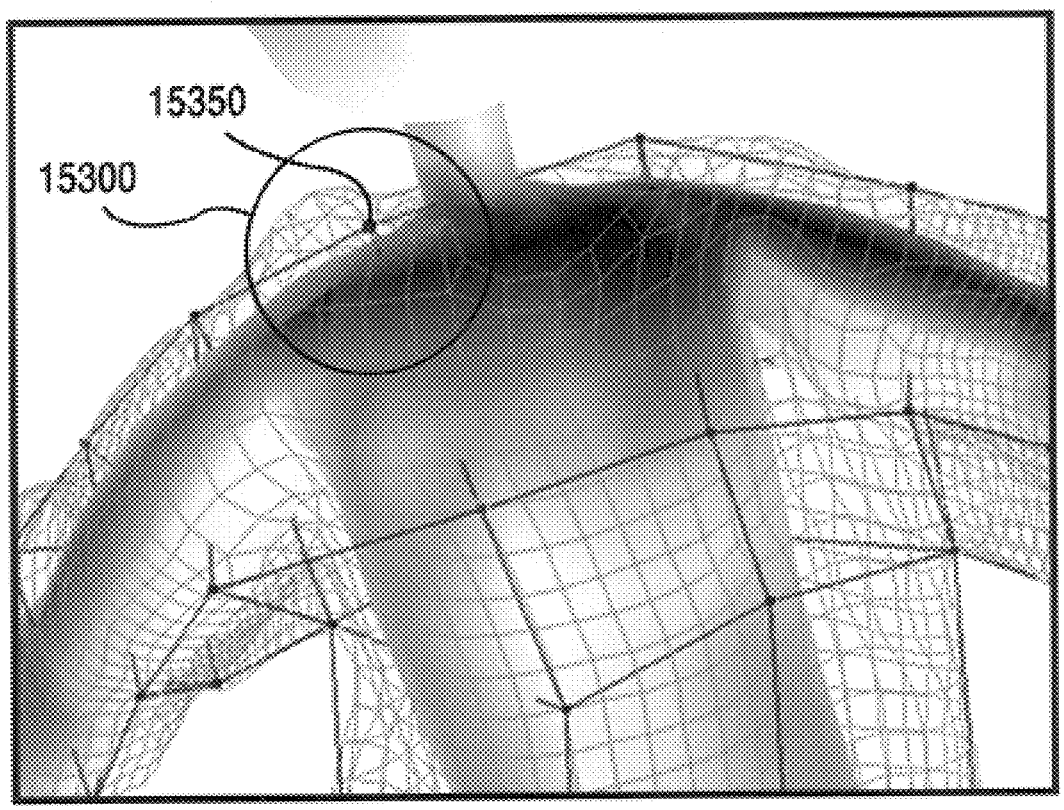
FIG. 15C depicts the adjustment of the low resolution mesh of FIG. 15B to correct the simulated cloth's intersection with the object.
Figure 15D:
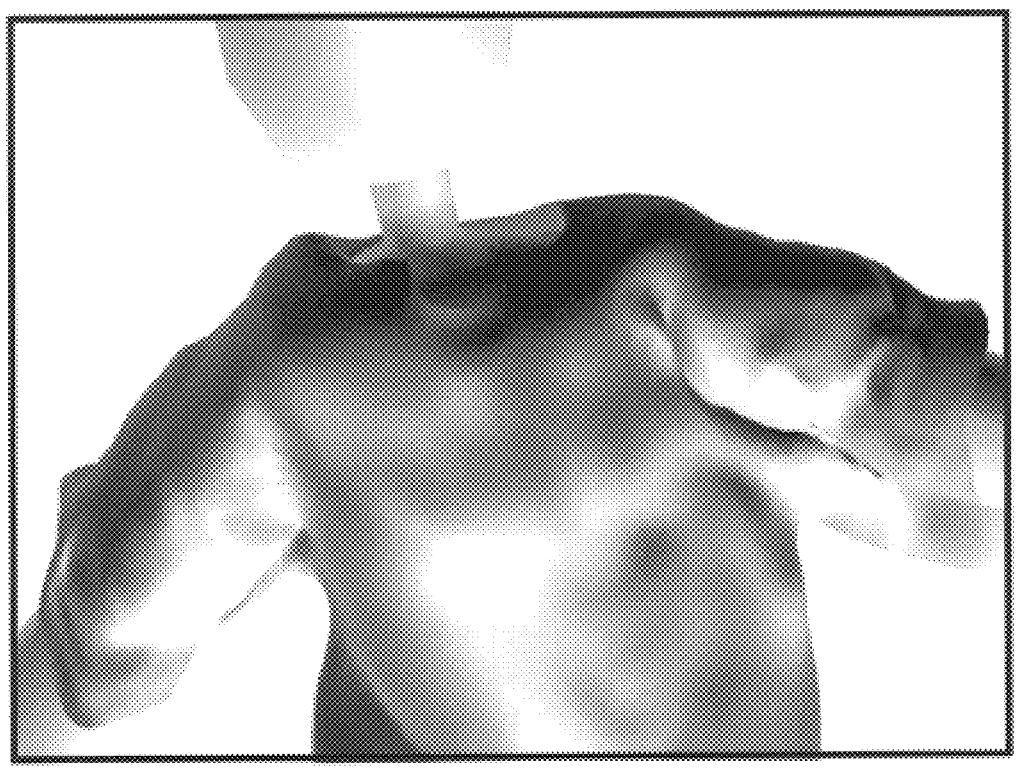
FIG. 15D depicts a deformed model for the undeformed model of FIG. 15A showing the corrected simulated cloth.

FIG. 15A depicts an undeformed model with simulated cloth and an unwanted object intersection. A region of simulated cloth intersection 15100 is particularly identified. In FIG. 15B, a low resolution vertex mesh of the simulated cloth of FIG. 15A is shown. A low resolution mesh intersection region 15200 corresponding to the region of simulated cloth intersection 15100 in the surface mesh of FIG. 15A is identified. Within it is a control vertex in the undeformed mesh 15250. The warp designer can manipulate the control vertex in the undeformed mesh 15250 to eliminate the low resolution mesh intersection region 15200. FIG. 15C depicts this correction having been made in the low resolution mesh. A low resolution mesh correction 15300 is shown corresponding to the low resolution mesh intersection region 15200. The control vertex in the deformed mesh 15350 is shown and it can be seen that it has been moved and that the coarse mesh no longer intersects the object in the low resolution mesh correction 15300. FIG. 15D depicts a deformed surface model for the undeformed model of FIG. 15A showing the corrected simulated cloth.

Frequently, warp designers desire to create a variation of a complex surface model while still retaining the same basic shape of the surface. Simple transformation mechanisms are useful for this sort of control. However, they may not provide the level of flexibility the warp designer requires. In such instances, an approximate low resolution version of the high resolution surface can be used to deform the surface while maintaining the same basic shape of the surface. Using our mesh warp, a low resolution mesh may be created from vertices of the surface model, the low resolution mesh may be manipulated to create a variation in the low resolution mesh, for instance by manipulation of the vertices, and a variation in the surface model created from the variation in the low resolution mesh.

Figure 16A:
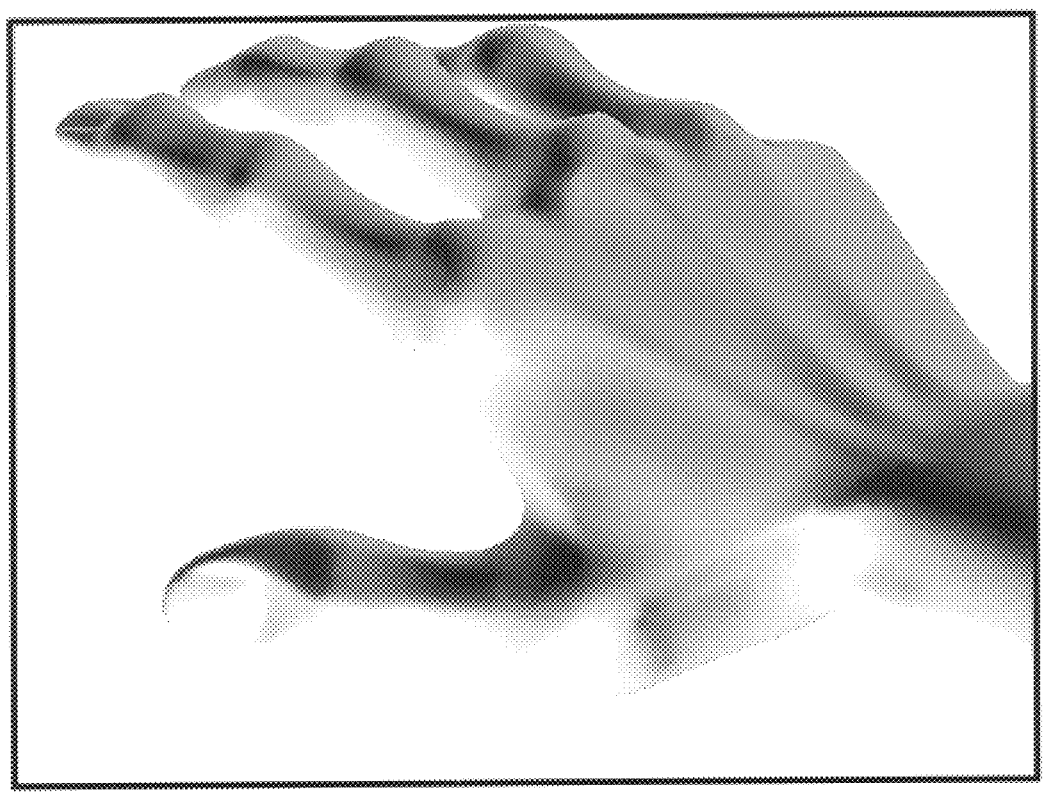
FIG. 16A depicts an original surface in an undeformed model.
Figure 16B:
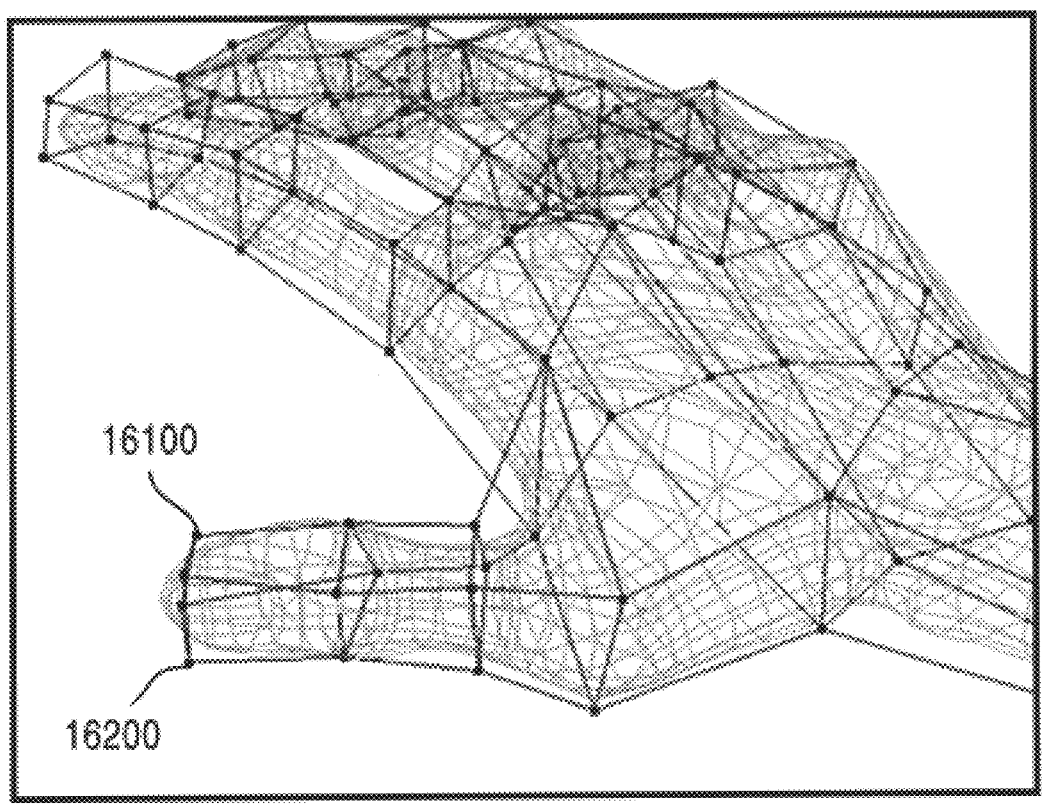
FIG. 16B depicts a low resolution mesh imposed on the original surface of FIG. 16A.
Figure 16C:
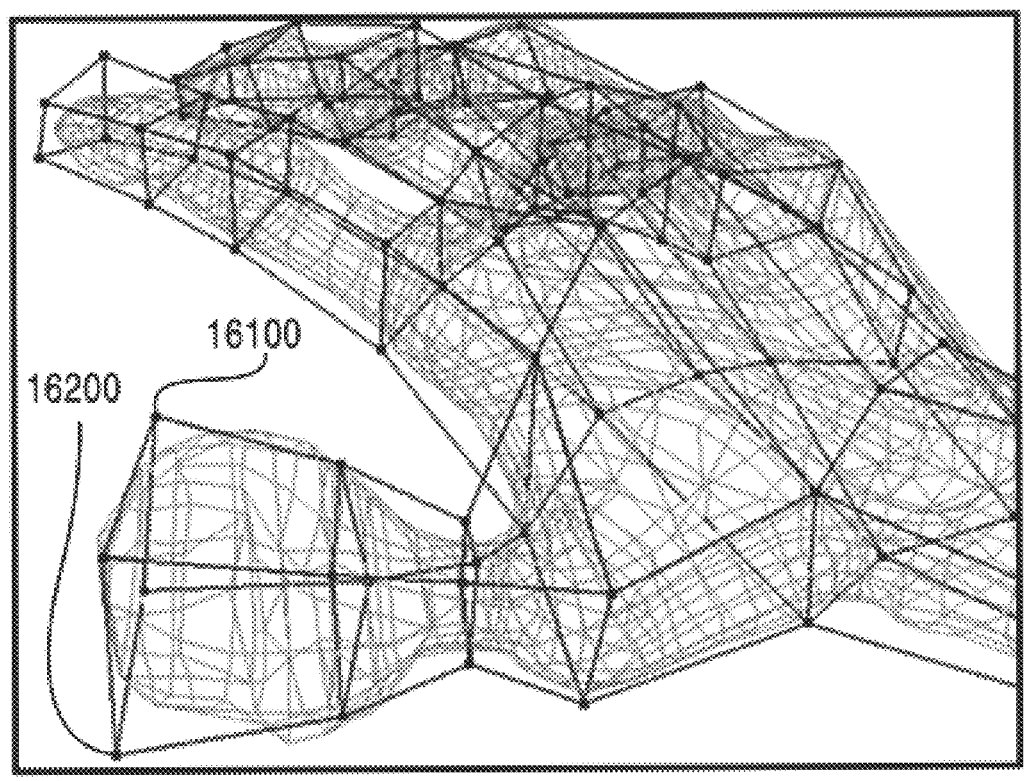
FIG. 16C depicts the adjustment of the low resolution mesh of FIG. 16B to create a variation in the low resolution mesh.
Figure 16D:
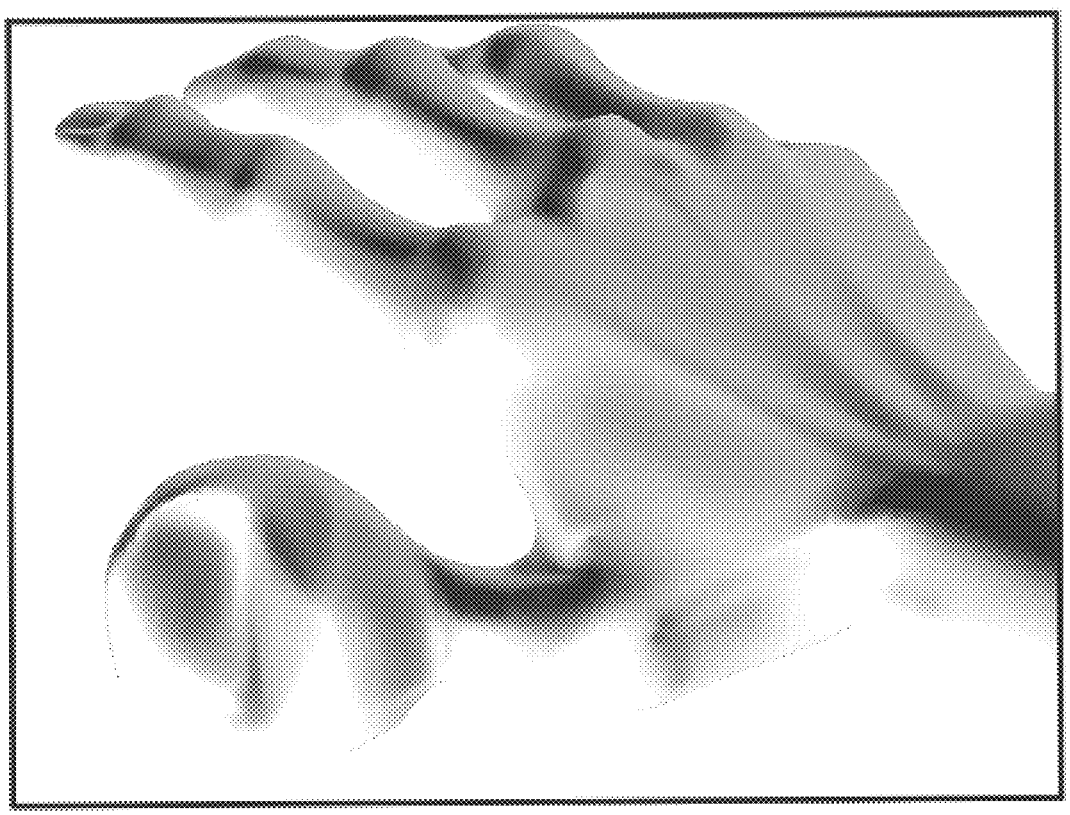
FIG. 16D depicts a deformed model for the undeformed model of FIG. 16A showing the variation in the surface model.

FIG. 16A depicts an original surface in an undeformed model. Assume the desired variation in the undeformed model was to enlarge a portion of the thumb. A low resolution mesh could be imposed on the surface of FIG. 16A; this is shown in FIG. 16B. The low resolution mesh comprises a plurality of control vertices, two illustrative ones of which are a first control vertex 16100 and a second control vertex 16200. The warp designer may adjust the control vertices to create a variation in the low resolution mesh. FIG. 16C depicts the adjustment of the low resolution mesh. The changed relative positions of the first control vertex 16100 and the second control vertex 16200 illustrate adjustment of the low resolution mesh. From the adjusted low resolution mesh, a deformed model with a variation of the surface model is created as shown in FIG. 16D.

To further illustrate our mesh warp, the following points are noted about a preferred embodiment: First, our warp allows deformation meshes of arbitrary topology and genus to be used. Secondly, unlike many conventional methods that use meshes to control a deformation, our warp is interpolating: a point located at a vertex position in the original mesh is deformed to the vertex position in the target mesh. Thirdly, our warp is defined spatially. This means that to create a deformation on an object, the only requirement is that the deformation mesh be located near the object to be deformed. This makes constructing a deformation mesh particularly easy: the vertices of the deformation mesh can be, for instance, any subset of the vertices of an original mesh, or some entirely new enclosing mesh. Still further, since the weighting field for a mesh vertex falls to 0 roughly outside the polyhedral cells the vertex bounds, moving a single point in the deformation mesh has localized effect in the warp.

Still another illustrative embodiment of the invention provides mechanism to deform a first surface by mapping regions of the first surface to regions of a second surface (hereinafter "Surface Region Warp").

In one illustrative version of a Surface Region warp, M(u) is taken as control vertices that define the first surface, indexed by $u \in U = \{1, \ldots, m\}$. A set of strength fields for the warp will be surface regions: surfaces or parts of surfaces. A convenient way to describe a surface region is as a parameterized function Surf(v), that returns a (point, normal) tuple for a given location on the surface. While in principle, the surface region is a continuum, preferably a finite array of surface samples are used and $v \in V = \{1, \ldots, n\}$ is the array index. The position of a given sample Surf(v) is denoted Surf(v).pos and the normal Surf(v).norm. Feature specifications for this warp are:

$$F_i = \{\text{Surf}_i, \text{Surf}'_i, \alpha_i, \beta_i, r_i, e_i\} \quad (11a)$$

Where Surf is a source surface region, Surf' is a target surface region, and $\alpha_i$, $\beta_i$, $r_i$, and $e_i$ are scalar parameters described below. For each of a set of feature specifications, $F_i$, we preferably create a set of sampled transformations $T_i(v)$ by $$T_i(v) = R \circ T \quad (11b)$$

where $T = \text{Surf}_i(v).\text{pos} - \text{Surf}'_i(v).\text{pos}$ maps the source surface sample position to the target surface sample position and R is the smallest rotation that takes $\text{Surf}_i(v).\text{norm}$ to $\text{Surf}'_i(v).\text{norm}$. Preferably the Displacement Method is used to scale the effect of each transformation.

Highly customized strength fields and weighting fields may be created by the warp designer responsive to, for instance, the structure and/or topology surface in the undeformed model. Absent this type of customization, simple strength fields and weighting fields may be conveniently selected. For instance, a strength field could be selected so that the effect of the deformation is localized around the source surface; one could be:

$$S_i(v,u) = f_{\alpha_i \beta_i}(\|M(u) - \text{Surf}_i(v).\text{pos}\|) \tag{11c}$$

where $f_{ab}(t)$ is a C-1 continuous cubic function such $f_{ab}(t)=1$ for $t \leq a$ and $f_{ab}(t)=0$ for $t \geq b$. Also, $\alpha_i$ determines the extent where the deformation is full, and $\beta_i$ where the deformation is zero.

The weighting fields conveniently fall off as a distance from at model point to a position of a source surface sample increases. Further, the weighting fields fall off with the strength fields as the relative influence of a single sample is preferably zero when its absolute effect is zero. One suitable weighting field could be:

$$W_i(v, u) = S_i(v, u) \left( \frac{1}{\varepsilon + \left( \frac{\|M(u) - \text{Surf}_i(v).\text{pos}\|}{r_i} \right)^{e_i}} \right) \tag{11d}$$

where $\varepsilon$ is a small scalar value use to avoid division by zero, and $r_i$ and $e_i$ control the weighting field's range and falloff rate, respectively.

An illustrative application of the Surface Region Warp is to deform a first surface in an animation when it is contacted by a second surface. The second surface might, for instance, cause a dent in the first surface, or might stick to the first surface and stretch it out of shape. The previously-described Surface Region Warp can be used to control the deformation based on proximity of the first and second surfaces.

Figure 17A:
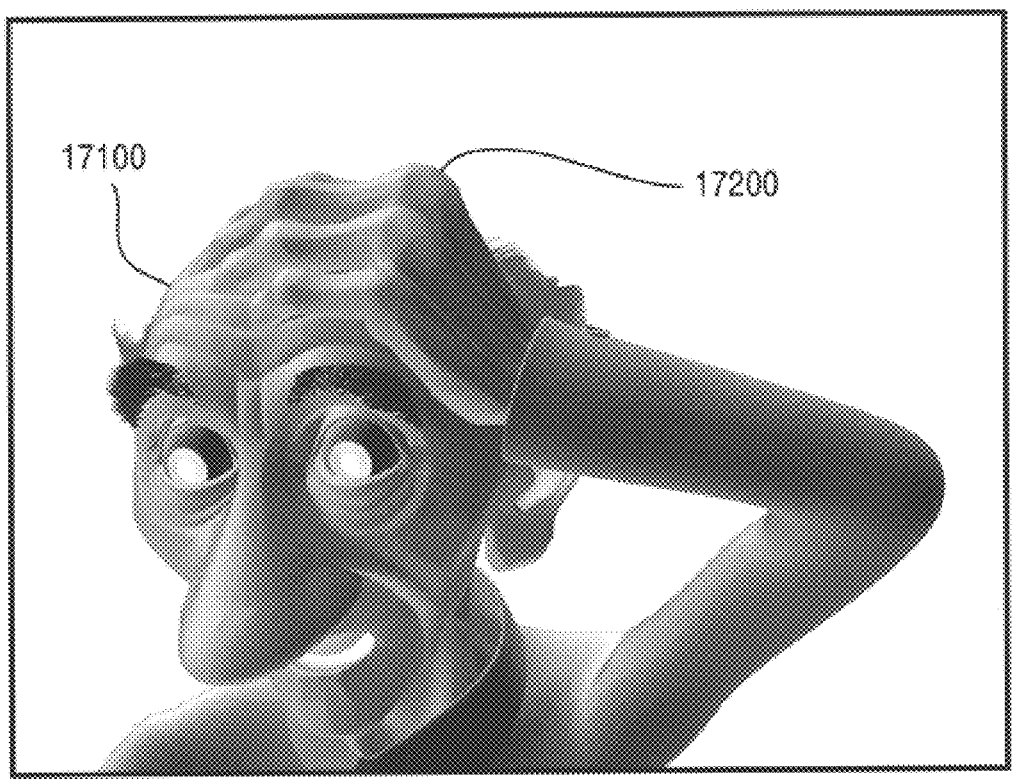
FIG. 17A depicts an undeformed model with a second surface interpenetrating a first surface.
Figure 17B:
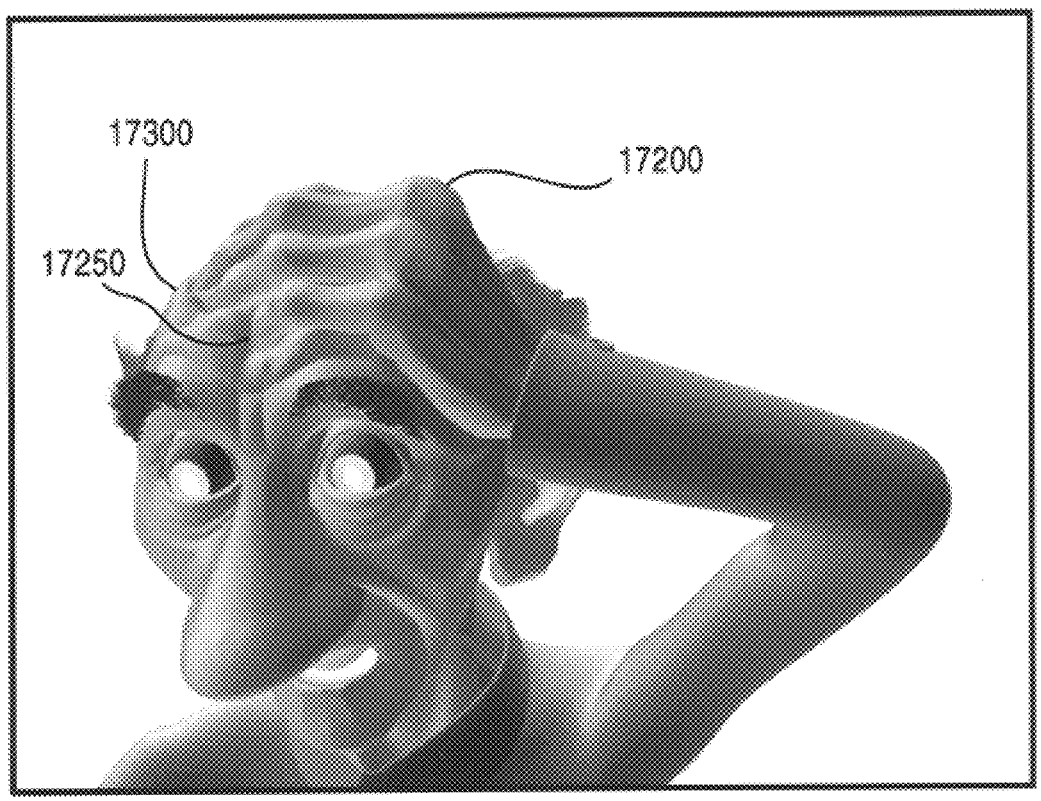
FIG. 17B a deformed model of FIG. 17A with the first surface deformed to match the second surface.
Figure 17C:
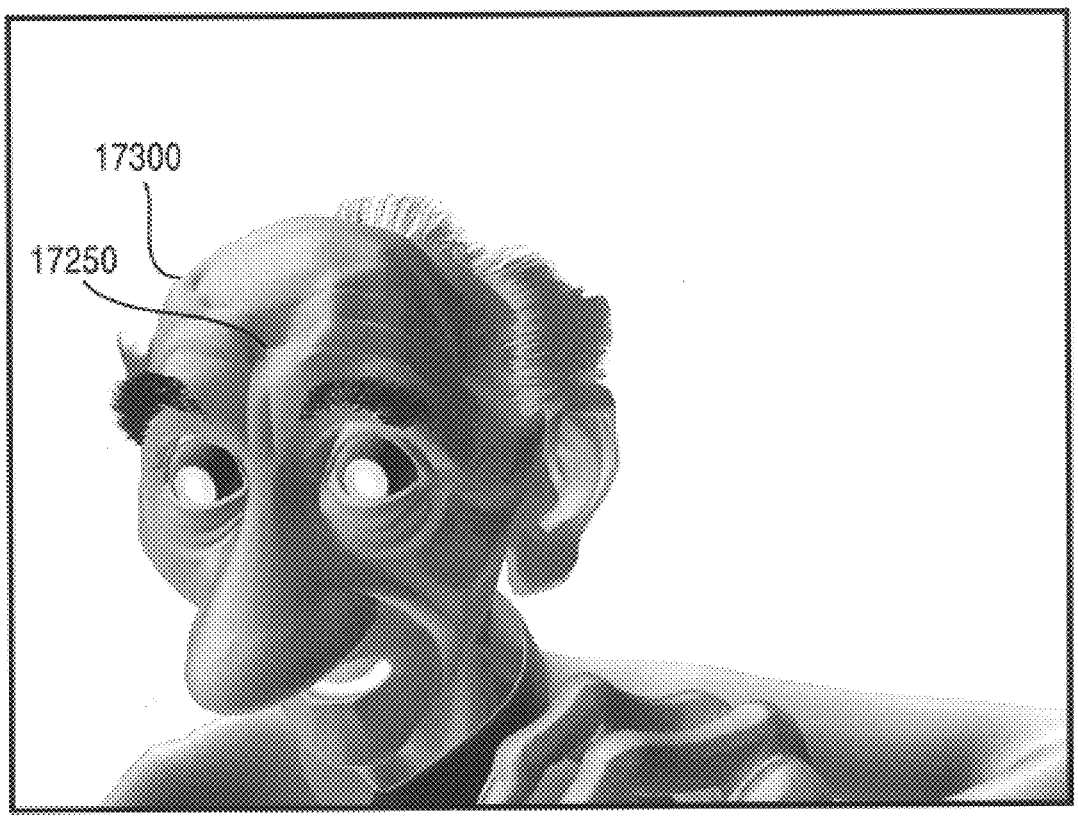
FIG. 17C depicts another view of the deformed model of FIG. 17B where the first surface has been deformed to match the second surface.

FIG. 17A depicts an undeformed model with a second surface 17200 (the character's hand) contacting a first surface 17100 (the character's head). In such a situation, the animator or warp designer may desire for the second surface 17200 to leave an impression or dent in the first surface 17100 or to stretch the first surface 17100 when the second surface 17200 is pulled away in the animation. FIG. 17B depicts a deformed model with the first surface 17100 deformed to match the second surface 17200. An indentation 17250 is visible. FIG. 17C depicts another view of the deformed model of FIG. 17B. In FIG. 17C, with the character's hand removed, it can more easily be seen that the first surface 17100 has been deformed to match the second surface 17200. The indentation 17250 is visible and it will be appreciated that each finger of the character's hand left an indentation in the character's head.

Figure 17D:
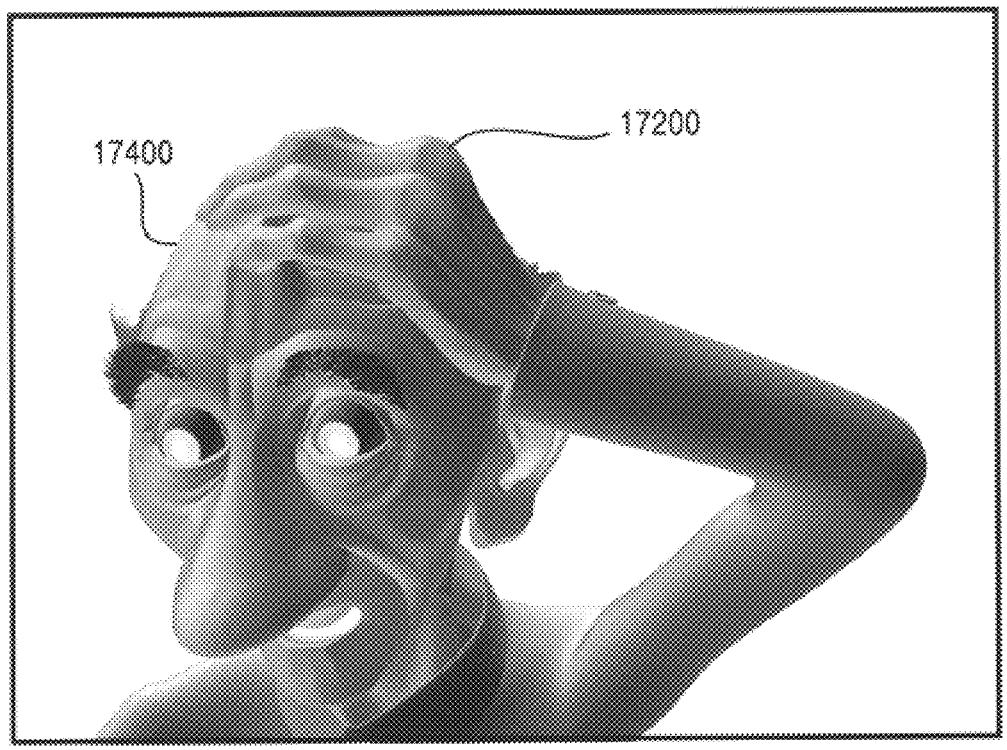
FIG. 17D depicts another deformed model for the undeformed model of FIG. 17A showing a different effect of the second surface contacting the first surface.

A different effect is shown in FIG. 17D. There, a first surface deformed by contact with the second surface 17400 is visible. This figure illustrates stretching of the character's head by contact with the character's hand.

To further understand our Surface Region Warp, the following points are noted about a preferred embodiment: First, the Surface Region Warp is an interpolating warp that takes source surface regions to target surface regions. Second, it is independent of the representation of the surface regions, so that surfaces of any type may be used to define the surface regions. Third our Surface Region Warp allows any representation to be used for the model as well. Fourth, our warp is simple to develop and yields goods results in a wide variety of cases. Finally notice that, strictly peaking, the new warp no longer exactly maps source curves to target curves. However, in practice it still visually interpolates the feature curves.

WARP COMMUTATIVITY

It may be desirable for warps to commute, that is for the result of their composition to be invariant as to ordering. If warps commute, for instance in interactive modeling and animation, then the warp designer could be guaranteed that order of operations did not matter and thus achieve more predictable behavior, overall.

Warps performed in accordance with the present invention can be guaranteed to commute if two conditions are met. Notationally, two warps A & B with deforming functions $D_A(u)$ and $D_B(u)$, can be said to commute if and only if for all u:

$$D_B(u, D_A<M>) = D_A(u, D_B<M>)$$

The two conditions are (1) neither $D_A(u)$ nor $D_B(u)$ behave different if $D_B(u)$ or $D_A(u)$, respectively, is previously applied to the model M; and (2) the order of application of $D_A(u)$ and $D_B(u)$ does not matter to the final result.

Condition (1) can be satisfied by ensuring that the set of transformations, set of strength fields, and set of weighting fields for each warp do not change if the other warp is applied first. Condition (2) can be satisfied by ensuring that all weighted averages of warp A's transformations commute with all weighted averages of warp B's transformations.

Instead of computing the strength filed and weighing values on the warped model M', transformations may be pre-computed and field values on the original model M and use these to define the warp. In this instance, the only requirement is that parameterized transformation values commute. This condition is satisfied by many instances. Notably a weighed average of translations is a translation and all translations commute. Thus, if all transformation values in two warps are translations, then pre-computation of their transformations on the original model guarantees commutativity the transformations. If two warps compute weighted averages of transformations as weighted averages of the translations caused by those translations, then pre-computation similarly guarantees commutativity of the warps.

INTERPOLATION AND APPROXIMATION

In the case of feature-based warps, a noteworthy property is whether the warp is interpolating or approximating. An interpolating warp maps model points located on source features to corresponding locations on target features. Approximating warps, on the other hand, do not necessarily map model points from source feature positions to their target positions. Frequently, approximating warps are smoother than interpolating warps and can provide a more-intuitive user interface.

As previously described, parameterized transformations may be constructed so that each point on a source feature corresponds to a single transformation value that maps the point on the source feature to a corresponding point on the target feature.

Under appropriate conditions, a feature-based warp is interpolating. Assuming a model point M(u) has the same position as some point on a source feature and that $T_i(v)$ is the transformation value associated for that point, then a feature based warp will be interpolating if, for all such points, the following conditions are met:

$T_i(v)$ takes the point on the source feature to its corresponding point on the target feature $s_i(v,u)=1$ $w_i(v,u) \neq 0$ $w_i(x,u)=0 \forall x \in V_i, x \neq v$; and $w_j(y,u)=0 \forall i \neq j, y \in V_j$.

As these conditions may be more stringent than desirable in practice, conveniently, a feature based warp may be visually or approximately interpolating. A warp may achieve this when a feature's transformation acts with essentially full strength and dominates the weighting contributions of other transformations. More formally:

$T_i(v)$ takes the point on the source feature to its corresponding point on the target feature $s_i(v,u) \approx 1$ $w_i(v,u) \neq 0$ $w_i(v,u) >> w_i(x,u) \forall v, x \in V_i, x \neq v$; and $w_i(v,u) >> w_j(v,u) \forall i \neq j, y \in V_j$.

WARP INVERSION

A warp designer may desire to find a warp's inverse, or, more generally determine if a particular warp is invertible. Yet another aspect of the present invention is the computation of a warp that has an inverse. Any warp that has an inverse may have that inverse computed in accordance with the present invention.

As noted above, one may understand the deformed model as resulting from the application of a transformation valued deforming function, $D(u,M)$, to the undeformed model. Applying the inverse transformation—$(D(u,M))^{-1}$—inverts the deformation caused by this deforming function; Notationally, the inverse of the deforming function $\Delta(u,M)$ is given by:

$$D^{-1}(u,M) = (D(u,M))^{-1} \forall u \in U.$$

This, alone, may not be instructive to the warp designer who, rather, may desire that computation of the inverse warp compute the parameterized transformations, strength fields, and to weighting fields for the inverse warp than just the final transformations. Unfortunately, this is not possible for all warps. However, yet another aspect of the present invention involves the computation of these parameterized transformations, strength fields, and weighting fields for the inverse warp.

In accordance with this aspect, a warp is inverted by inverting its parameterized transformations, strength fields, and weighting fields. This will correctly compute the inverse warp where strength fields and weighting fields for the inverse warp evaluate to the same values on both the undeformed model and the deformed model. Notationally, an inverse warp may be constructed by using parameterized transformations $T_i^{-1}(v)$, strength fields, and weighting fields in instances where the following conditions are satisfied:

$$w_i(v,u,M) = w_i(v,u,D<M>) \forall i \in \{1, \ldots, n\}, v \in V_i$$

If $w_i(v,u,M) \neq w_i(v,u,D<M>) \forall i \in \{1, \ldots, n\}, v \in V_i$ then $s_i(v,u,M) = s_i(v, u, D<M>)$ Two points should be appreciated. First, this form is particularly beneficial for feature-based warps as it is natural for the warp designer to invert a feature based warp by swapping its source and target features and compute a new warp. In a feature based warp, swapping the features has the effect of inverting the warp's parameterized transformations. For this approach to correctly generate the inverse warp, i.e., for the conditions above to be satisfied, the set of strength fields, and the set of weighting fields should evaluate to the same values on both the undeformed model and the deformed model.

There is no, a priori, reason for this to be conveniently arrangeable in many warps. However, in yet another aspect of the present invention this restriction may be removed. In accordance with this aspect, the set of strength fields values and the set of weighting fields values are precomputed on the undeformed model and stored. When, later, computation of the inverse warp is desired, the precomptued values are retrieved and used to compute the inverse warp.

Second, $D(u,M)$ may not have an inverse at all, e.g. a projection, and in this instance, could not be computed.

VARYING WARPS OVER TIME

Many desirable applications of warping in morphing and animation involve controlling the evolution of a warp over time. Yet another aspect of the present invention involves aspects for controlling the evolution of a warp over time.

In one variation, conveniently applicable to morphing, the warp designer smoothly varies a deformation from zero to full effect. One version of this involves interpolating between an identity transformation, I, and the deforming function $D(u,M)$ that warps the undeformed model to the fully deformed model. A single parameter, s, may be used to control the transformation:

$$W(s) = (s \cdot I + (1-s)) \cdot D(u,M)) <M(u)>$$

It will be appreciated that with this technique, the parameter s may be chosen to smoothly vary over time.

In a similar vein, interpolation may be taken between the identity transformation and each of the scaled transformations $T_i(v)$. This provides the advantage that each parameterized transformation value can be controlled independently. In some embodiments employing this technique, a morph is scheduled so that different parts of the model morph at different rates.

Yet another approach is to scale the strength fields animated by the morph parameters varying from zero (no deformation) to 1 (full deformation). When the Displacement Method is used to scale transformations by scalar values, this approach is similar to interpolating between $T_i(v)$ and the identity transformation. When the Composition Method is used, this approach provides more intuitive geometric scheduling as the parameters defining the transformation will be scaled rather than the displacements caused by the transformations.

Some embodiments could use still another approach for creating time-varying warps. In this approach—applicable to feature-based warps—the target features are animated smoothly from source position to target position and the same warping techniques (now with animated features) is used at each morph time-step. It will be appreciated that in this way a smooth transition can be achieved between the undeformed and deformed models.

One skilled in the art having the benefit of this disclosure will appreciated that features of the invention may be used to create deformations varying overtime through varying, for instance, strength fields, weighting fields, parameterized transformations, or features themselves. Temporal variations of deformations will generally be smooth if variations of the parmeterized transformations, strength fields, and weighting fields are smooth. If the number of discrete transformations changes from time-step to time-step, care should be taken to blend in/out the added/removed transformations with weighting fields of smoothness of the warp is desired. Otherwise, the resulting warp may not be smooth.

By the same token, temporal discontinuities in strength fields of weighting fields can introduce temporal discontinuities in the deforming function. Continuous temporal warp behavior can be obtained from continuous behavior of warp parameters if small changes in the parameters of the warp produce small changes in the strength fields and weighting fields generated from these parameters.

Although the present invention has been described in terms of features illustrative embodiments, one skilled in the art will understand that various modifications and alterations may be made without departing from the scope of the invention. Accordingly, the scope of the invention is not to be limited to the particular embodiments discussed herein, but should be defined only by the allowed claims and equivalents thereof.

What is claimed is:

1. A computer-implemented method for generating graphical warps or deformations through transformation of an undeformed model to a deformed model, said computer-implemented method comprising:

receiving said undeformed model and a set of feature specifications each of said set of feature specifications comprising a source feature, a target feature, and related deformation parameters;

receiving a set of transformations corresponding to said set of feature specifications and for mapping said source feature to said target feature in each of said set of feature specifications;

receiving a set of strength fields corresponding to said set of feature specifications and defined over said undeformed model for scaling the magnitude of each of said set of transformations, establishing a set of scaled transformations;

receiving a set of weighting fields corresponding to said set of feature specifications and defined over said undeformed model for determining the relative influence of said set of scaled transformations;

computing a sum of said set of scaled transformations weighted by said set of weighting fields, for deforming said undeformed model to generate said deformed model; and returning said deformed model.

2. The computer-implemented method according to claim 1 wherein at least one of said set of feature specifications is continuous and has corresponding parameterized strength field, transformation, and weighting field, and further comprising:

receiving a sampling function for discretizing said parameterized transformation and sampling said strength field and said weighting field;

computing a discretized transformation, a sampled strength field, and a sampled weighting field with said sampling function; and wherein said step of computing a sum of said set of scaled transformations employs said discretized transformation, said sampled strength field, and said sampled weighting field.

3. The computer-implemented method according to claim 2 wherein said set of feature specifications, said set of transformations, said set of strength fields, said set of weighting fields, and said sampling function are received by a combined function that computes said discretized transformation, said sampled strength field, and said sampled weighting field.

4. The computer-implemented method according to claim 1 wherein:

said set of feature specifications comprises a plurality of line segment features;

said set of transformations corresponding to said plurality of line segment features map source coordinate frames to target coordinate frames; and said set of weighting fields corresponding said plurality of line segment features fall off with distance.

5. The computer-implemented method according to claim 4 wherein:

said set of weighting fields give influence to line segment features in said plurality of line segment features in relation to their length.

6. The computer-implemented method according to claim 4 wherein:

said source coordinate frames comprise a constrained basis vector and an unconstrained basis vector and wherein said unconstrained basis vector is selected responsive to a weighted sum of the vectors perpendicular to the constrained basis vector for each of said target coordinate frames.

7. The computer-implemented method according to claim 1 wherein:

said set of feature specifications comprises control points in an at least two dimensional lattice; said at least two dimensional lattice having an associated local coordinate system;

said set of weighting fields corresponding to said control points comprise Bernstein polynomials with arguments comprising points of said undeformed model represented in said local coordinate system.

8. The computer-implemented method according to claim 1 wherein:

said set of feature specifications comprises an oriented point in an least two dimensional lattice; said at least two dimensional lattice having an associated local coordinate system;

the transformation in said set of transformations corresponding to said oriented maps a source coordinate frame to a target coordinate frames; and said set of weighting fields corresponding to said oriented points comprise Bernstein polynomials with arguments comprising points of said undeformed model represented in said local coordinate system.

9. The computer-implemented method according to claim 1 wherein:

said set of transformations comprises a geometrically parameterized transformation.

10. The computer-implemented method according to claim 9 wherein:

said set of transformations comprises plural geometrically parameterized transformations; and said set of strength fields modulate said plural geometrically parameterized transformations.

11. The computer-implemented method according to claim 10 wherein:

said set of weighting fields blend said plural geometrically parameterized transformations.

12. The computer-implemented method according to claim 1 wherein:

at least one of said set of feature specifications comprises a source curve and a target curve;

corresponding members of said set of transformations comprise a composition of a translation from points along said source curve to points along said target curve, a rotation taking the tangent at said points along said source curve to the tangent at said points along said target curve, and a scale centered at said points along said source curve;

corresponding members of said set of strength fields comprise a falloff function having a domain and a range and monotonically decreasing over said range, and wherein over at least a portion of said domain arguments of said falloff function comprise a distance between points of said undeformed model and point along said source curve and a rate of falloff for said distance;

corresponding members of said set of weighting fields comprise a scaled displacement function having a domain and a range, wherein for at least a portion of said domain said scaled displacement function comprises a power of the displacement of elements of said undeformed model by said corresponding members of said set of transformations.

13. The computer-implemented method according to claim 12 wherein said scaled displacement function comprises a power of the displacement of elements of said undeformed model by said corresponding members of said set of transformations for the entirety of said domain.

14. The computer-implemented method according to claim 1 wherein:

said undeformed model comprises control vertices of a fine surface model; and at least one of said set of feature specifications comprise:
  a source position and a target position of one or more vertices of a coarse deformation mesh configured for deformation of said fine surface model, and
  a set of edges incident on said one or more vertices.

15. The computer-implemented method according to claim 14 wherein:

corresponding members of said set of transformations comprise a composition of:
  a translation mapping said source position to said target position, and
  at least an approximation of a mapping of said set of edges in said undeformed model to said deformed model.

16. The computer-implemented method according to claim 15 wherein:

corresponding members of said set of weighting fields comprise a falloff function, said falloff function substantially zero at a distal end of each of said set edges incident on said one or more vertices, and said falloff function substantially at its maximum value for arguments proximate to said source positions of said control vertices.

17. The computer-implemented method according to claim 1 wherein:

said undeformed model comprises control vertices of a surface for deformation, wherein source and target features are parameterized as a function that returns a tuple comprising a point and a vector normal to said point;

at least one of said set of feature specifications comprises a source region and a target region;

corresponding members of said set of transformations comprise a composition of:
  a translation mapping points on said source region to points on said target region, and
  a rotation taking said vector normal to said points on said source region to said vector normal to said points on said target region of said surface.

18. The computer-implemented method according to claim 17 wherein corresponding members of said set of strength fields localize the effect of said set of transformations around said source surface region.

19. The computer-implemented method according to claim 18 wherein:

corresponding members of said set of weighting fields decrease monotonically with corresponding members of said set of strength fields and wherein said set of weighting fields decrease responsive to:
  a distance between control vertices of said surface for deformation and said point on said surface, and
  a range for limiting the region of said weighting field, and
  a rate for controlling the rate of decrease of said weighting field.

20. The computer-implemented method according to claim 1 wherein:

one of said set of feature specifications act with substantially full strength across said undeformed model and corresponding the member of said set of weighting fields dominates weighting contributions of other members of said set of weighting fields.

* * * * *